(12) United States Patent
McKiel

(10) Patent No.: US 12,539,663 B2
(45) Date of Patent: Feb. 3, 2026

(54) SURFACE GRAPHICS FOR EXTRUSION ADDITIVE MANUFACTURING

(71) Applicant: Frank McKiel, Colorado Springs, CO (US)

(72) Inventor: Frank McKiel, Colorado Springs, CO (US)

(*) Notice: Subject to any disclaimer, the term of this patent is extended or adjusted under 35 U.S.C. 154(b) by 265 days.

(21) Appl. No.: 18/540,561

(22) Filed: Dec. 14, 2023

(65) Prior Publication Data

US 2024/0109244 A1    Apr. 4, 2024

Related U.S. Application Data

(60) Continuation-in-part of application No. 18/314,582, filed on May 9, 2023, now abandoned, which is a continuation of application No. 17/645,743, filed on Dec. 22, 2021, now Pat. No. 11,685,109, which is a continuation of application No. 17/322,716, filed on May 17, 2021, now abandoned, which is a division of application No. 15/358,588, filed on Nov. 22, 2016, now Pat. No. 11,059,217.

(51) Int. Cl.
| | |
|---|---|
| B29C 64/118 | (2017.01) |
| B29K 105/00 | (2006.01) |
| B33Y 10/00 | (2015.01) |
| B33Y 30/00 | (2015.01) |
| B33Y 50/02 | (2015.01) |

(52) U.S. Cl.
CPC .... *B29C 64/118* (2017.08); *B29K 2105/0067* (2013.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2013/0189435 A1* | 7/2013 | Mackie | B33Y 30/00 427/256 |
| 2014/0291893 A1* | 10/2014 | Hopkins | B29C 48/92 264/308 |

* cited by examiner

*Primary Examiner* — Mohammad M Ameen

(57) ABSTRACT

In the formation of a solid object by progressively depositing extruded materials accordance with a data model for shape of the object, a mechanism is disclosed for combining shape-related data with one or more sets of graphics data to produce alternative perimeter toolpaths that, when followed by an extrusion deposition system, both build the modeled shape and render the pattern content of the graphics data on an outer surface of the object. The disclosed teachings provide ways for a user to select a shape model from a first source and a surface graphic effect from a different second source and readily create a solid object having the arbitrarily chosen graphic content applied. In accordance with some embodiments, the shape-determined toolpaths may be directly combined with graphics data without returning to a shape modeling environment or requiring recalculation by a slicing engine.

19 Claims, 34 Drawing Sheets

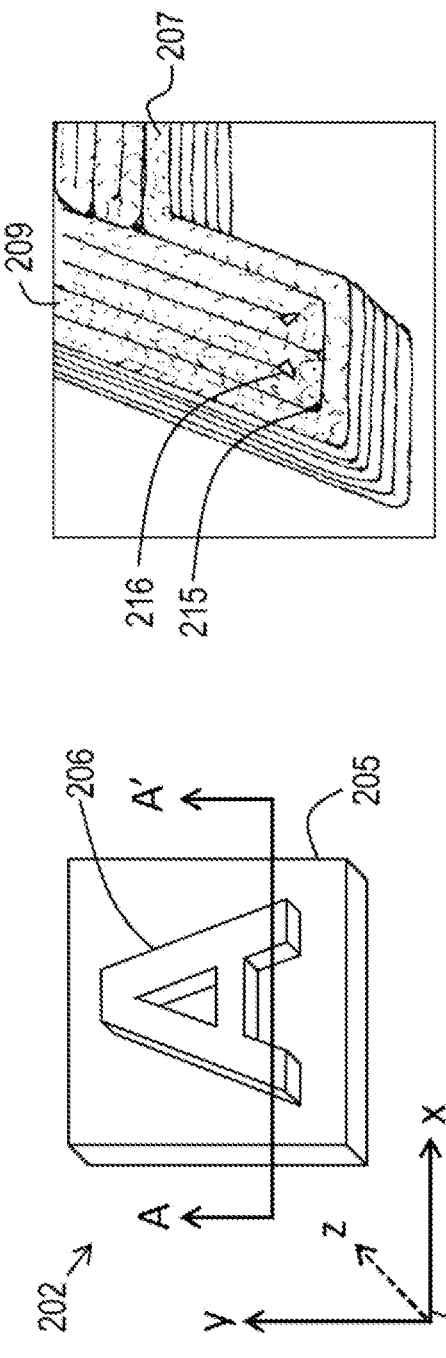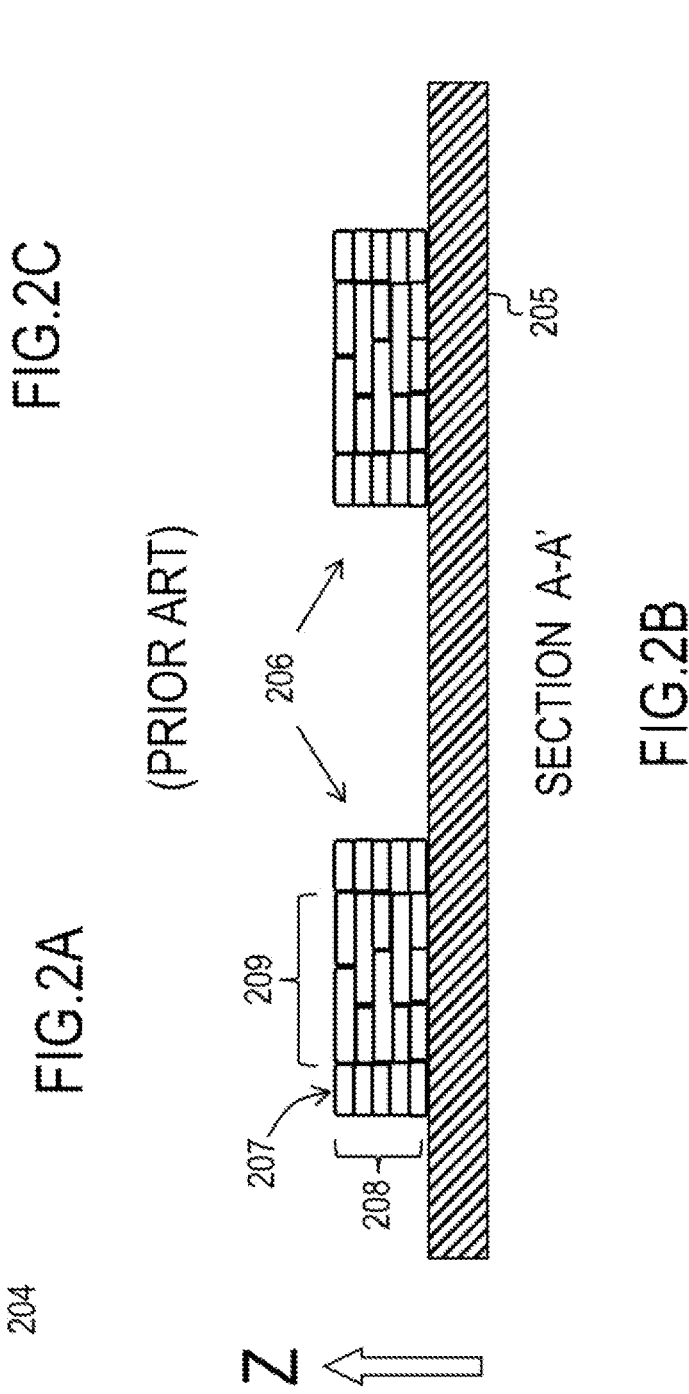
FIG. 2A
FIG. 2B  SECTION A-A' (PRIOR ART)
FIG. 2C

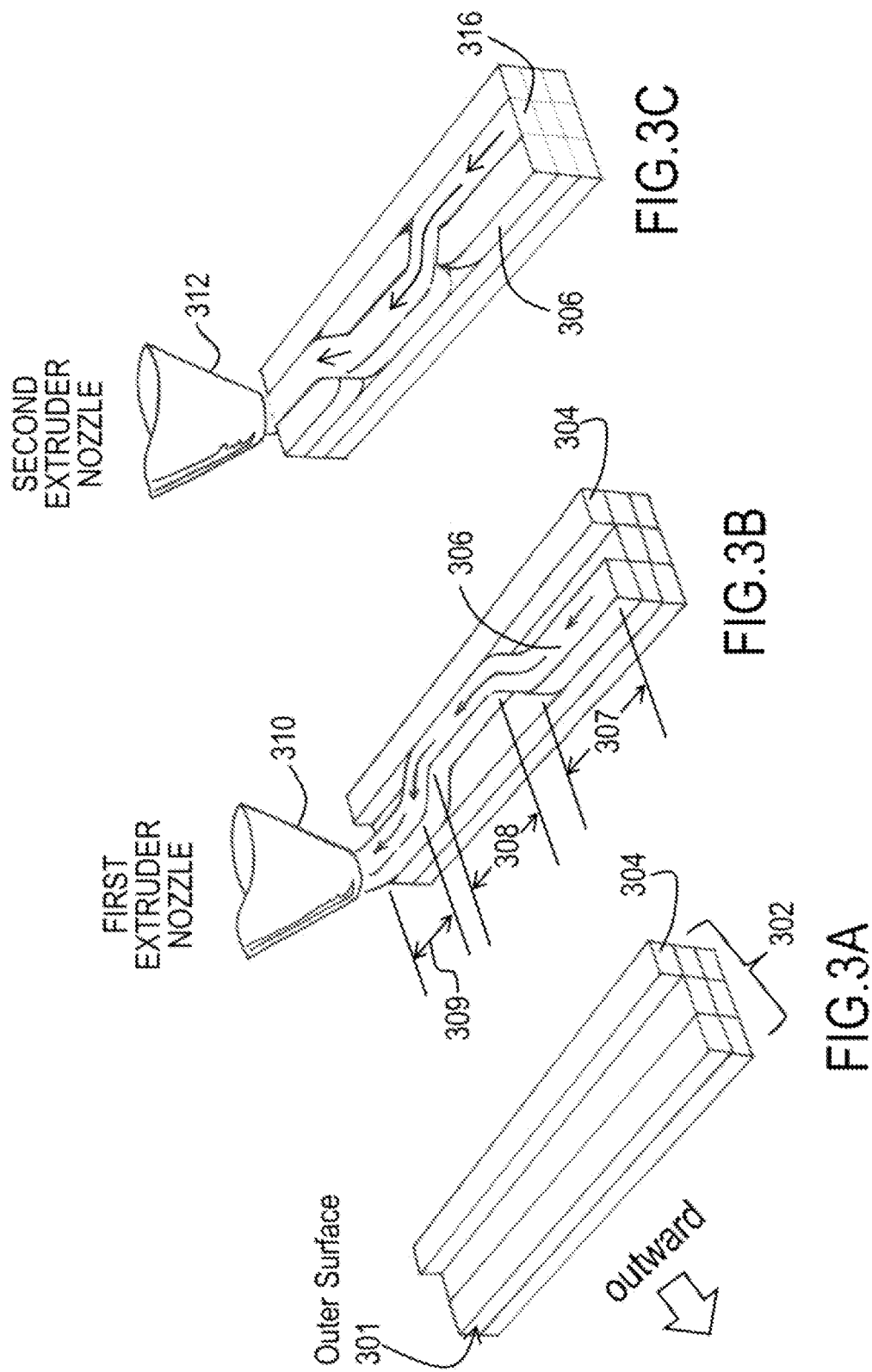

SECTION B-B'

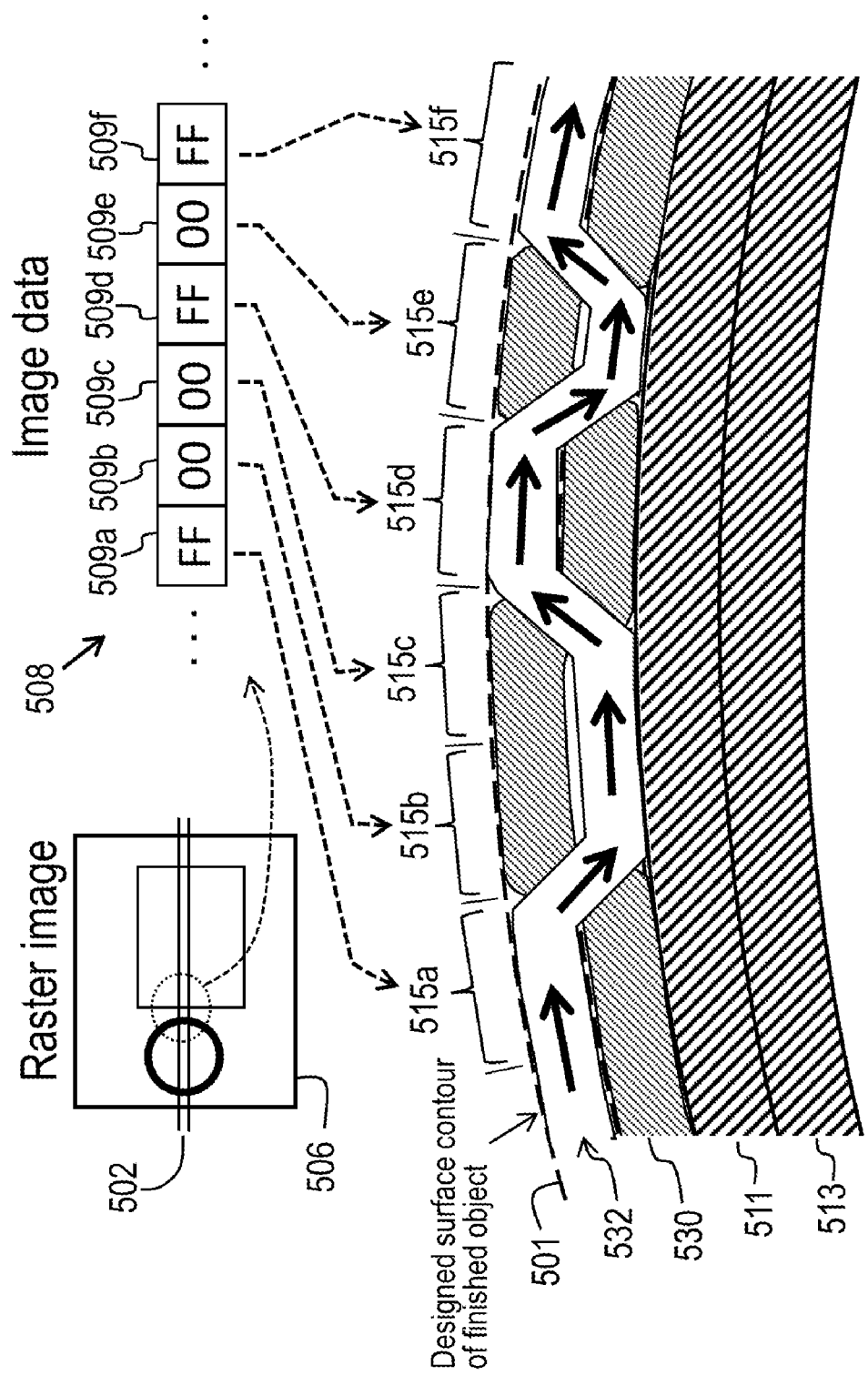

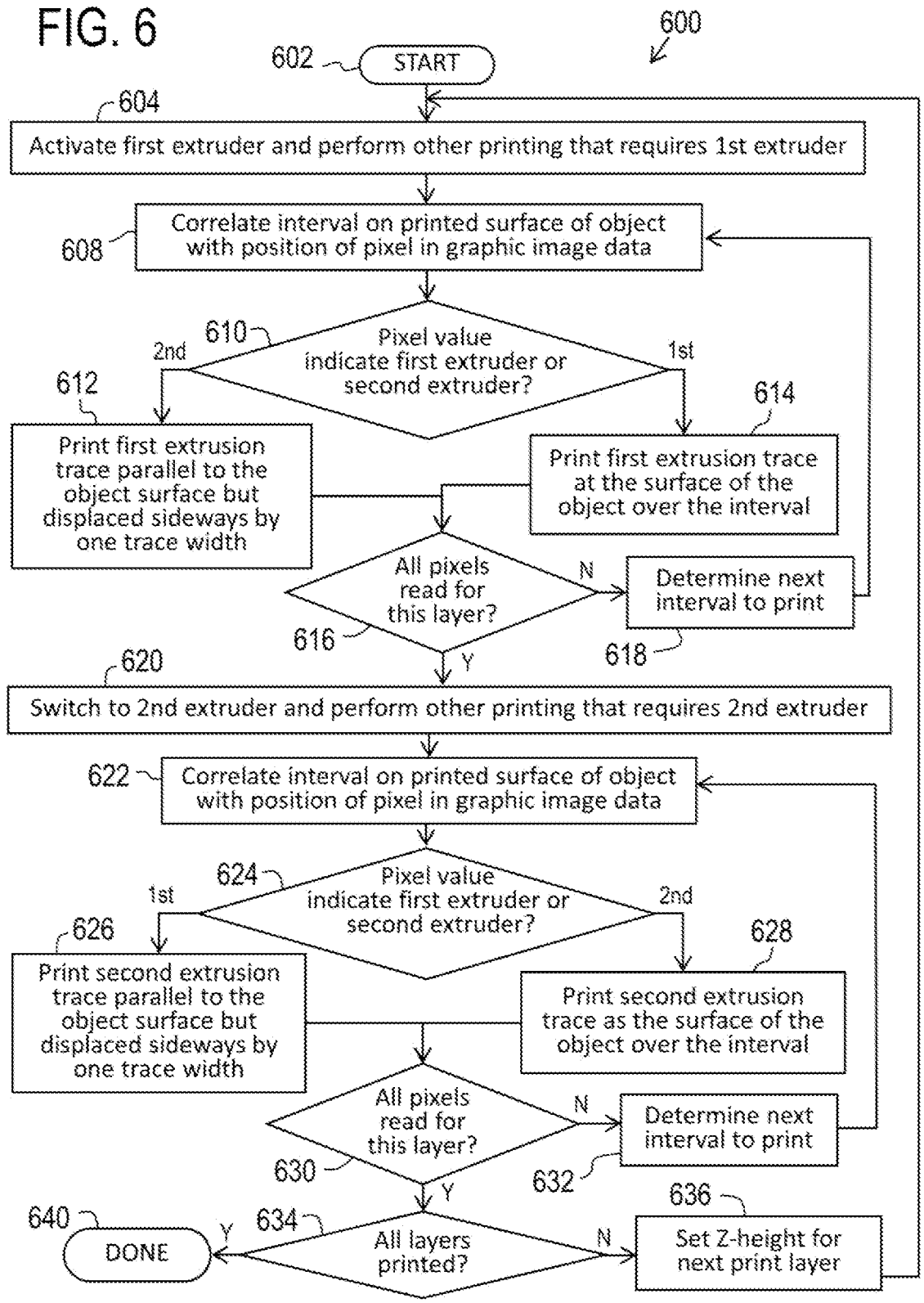

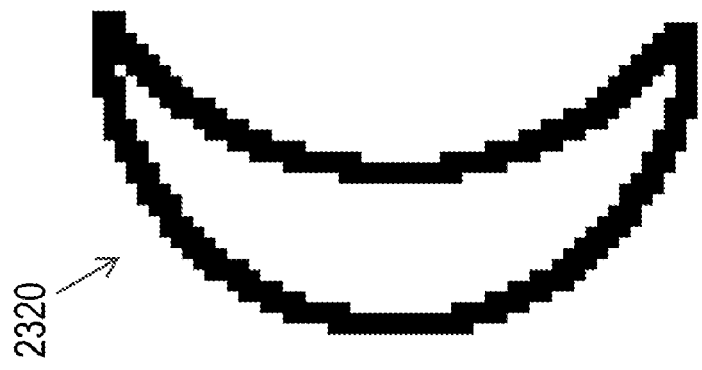
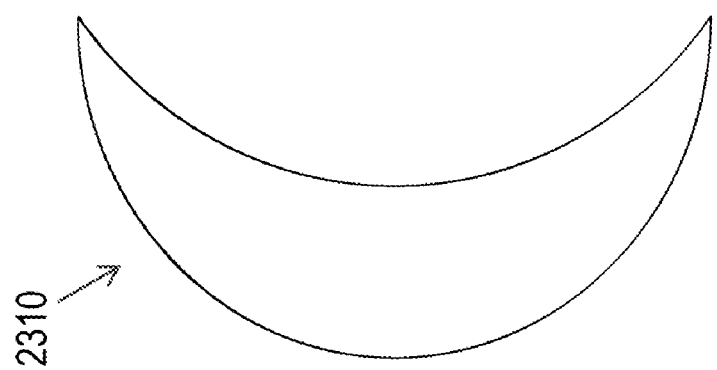
FIG. 23

SURFACE GRAPHICS FOR EXTRUSION ADDITIVE MANUFACTURING

RELATED APPLICATIONS

The present application is a continuation-in-part of U.S. patent application Ser. No. 18/314,582, filed May 9, 2023, which is a continuation of U.S. patent application Ser. No. 17/645,743, now issued as U.S. Pat. No. 11,685,109, which is a continuation of U.S. patent application Ser. No. 17/322,716, now abandoned, which is a divisional of U.S. patent application Ser. No. 15/358,588, now issued as U.S. Pat. No. 11,059,217, which claims the benefit under 35 U.S.C. 119(e) of provisional application No. 62/258,974 filed on Nov. 23, 2015, all of which are incorporated by reference herein.

TECHNICAL FIELD

The present disclosure pertains to additive manufacturing by extrusion deposition and, more particularly, to incorporating surface graphics during an additive build process.

BACKGROUND

In the field of three-dimensional printing (3D printing), solid objects are formed by additive processes such as the cumulative fusing of powdered materials or polymerization of liquid monomers. Printed objects are generally constructed layer-by-layer by causing solidification to occur in a particular pattern as each layer is formed. Another popular additive process, known as fused filament fabrication, involves melting and extruding a filament of an already solid material, such as a thermoplastic, and bringing it into contact with a gradually enlarging workpiece formed from previous melt deposition. The most common materials used for 3D printing are ABS (acrylonitrile-butadiene-styrene) and PLA (polylactic acid), although other thermoplastics, resins, solutions, slurries and even food materials have been used.

In typical fused filament systems, a thermoplastic filament of about 1 mm to 3 mm in diameter is forcefully driven into one port of a small heating block and melted plastic is forced out of a small nozzle coupled to a second port of the heater. The nozzle opening may be, for example, 0.5 mm in diameter. As plastic flows out of the nozzle, the motion of the nozzle relative to a substrate or so-called 'build plate' is mechanically effected using computer-controlled motors. Heated plastic from the nozzle comes into contact with the build plate, or with a specific spot on previously deposited plastic forming a composite workpiece, where it adheres and then cools and hardens. By depositing extruded material, initially to a bare build plate and then to a workpiece that is progressively formed thereon, a finished object having specific dimensions and contours may be formed.

As used herein, the term 'molten' is loosely applied to any state of a material when it is heated or otherwise softened and is of sufficiently low viscosity to flow through a small nozzle under pressure. It is recognized that for some materials a more precise terminology, such as a 'plastic' or 'amorphous' state, may be more commonly used and the term 'molten' is intended to encompass these situations.

Through careful control of the nozzle under software control, objects of a wide variety of shapes and complexity can be can progressively formed depending on the instructions set forth in the software or scripted directions that control the motors. In many typical systems, the driving of the filament into the heater block is also motor-driven in coordination with the X-Y-Z motion of the nozzle relative to the workpiece or build surface. Motor-controlled extrusion assures a specific rate of deposition and a uniform profile of the extrudate as it contacts and deforms against the existing workpiece. Furthermore, the extruder drive motor allows for relieving pressure and momentarily ceasing extrusion, as is desirable for some objects being constructed.

Some 3D printers that operate in the fashion just described are capable of 'dual extrusion'. By using two complete sets of nozzles, heating blocks and drive motors, the twin extruders can alternately deposit two different materials, or two different colors of the same material, in the course of constructing a given workpiece. (Higher numbers of extruders can be implemented but, at present, these add considerable expense and complexity.) In dual extrusion, the two nozzles are generally attached to a common carriage and move in concert, driven by the same motion stage. Only one extruder is actively emitting material and contacting the workpiece at any given time. The inactive nozzle remains on 'standby', meaning that it is kept at or near extruding temperature and maintains some molten material inside the heater block ready to be pressed out. Changing from one extruder to another involves activating a first extruder and placing a second one on standby, and vice-versa.

One technique used to change an extruder from a pressurized, actively-extruding state to a standby state is to retract the filament that goes into the heater. This is done by driving the corresponding extrusion feed motor in the reverse direction compared to the normal, forward-feeding direction. When the same extruder is to later resume its output of molten material, the feed motor must advance the filament and again build pressure to force plastic out of the nozzle. This action of the feed motor as the sole means of controlling extrusion from a nozzle creates a number of complications. For example, when an extruder is transitioned from a standby state to an active state, there is a delay before molten plastic is flowing out of the nozzle at an established rate. Consequently, a recently activated extruder cannot be immediately applied to a workpiece with the expectation that steady flow will have been achieved.

This delay occurs partly because retracting the filament to idle the extruder can cause a void or pocket to be formed inside the chamber of the heating block as air is drawn in through the nozzle. During the transition to an active state, this void must be again replaced with molten material and then additional feed is required before the chamber pressure stabilizes at a desired level and discharge rate. The changing thermal load and possibility of localized hot spots within the heating chamber further contribute to variability in discharge when extrusion is resumed from standby. Where dual extruders are used, designers often provide a practical structure, such as a separate wall, tower or 'on ramp' progressively constructed alongside the actual workpiece, where a recently energized extruder can build pressure and discharge some extrudate on a disposable side piece just before moving to the actual workpiece. Failure to establish steady flow before contacting a workpiece results in voids, unpredictable weaknesses and surface aberrations in the finished structure. Unfortunately, the need to achieve steady extrusion just as the nozzle engages the workpiece also creates extraneous threads of plastic or traces that protrude from the workpiece and often must be removed from the finished object after printing.

After a nozzle has been in use, the act of abruptly ceasing extrusion from the nozzle gives rise to another complication. The process of retracting the filament from the inlet to the heating block relieves pressure feeding the nozzle, but this pressure can rebuild as the heating block temperature may rise and plastic expansion can occur. The heating block temperature is thermostatically controlled but can nevertheless rise when the thermal load of constantly adding 'cold' filament during extrusion is suddenly halted. Furthermore, molten plastic lining the walls of the heating block and nozzle continues to slowly flow under gravity and drip out of the nozzle at a very slow rate. This problem is exacerbated by the tendency for some extrusion materials to chemically change or loose viscosity if held at the melt temperature for a prolonged time. The melted material within an idled nozzle can gradually become less viscous and begin to dribble out at an inopportune time, especially as the idled nozzle hovers over the workpiece in tandem with the other, actively-extruding nozzle. To combat this effect, some designers of 3D printing software provide for simultaneous building of a so-called 'ooze shield' or 'touch-off zone' that a standby nozzle can occasionally strike against and wipe off any dribbling material that happens to be hanging from the nozzle. Failure to address this issue can result in strings or blobs of one extrudate being connected to, or folded into, the workpiece in an unpredictable and undesirable fashion. This is especially noticeable when dual extruders are used to print in dramatically contrasting colors. Another solution to this issue involves shutoff valves or the like to more positively assure cutoff of extrusion flow. Nevertheless, due to delay in pressurization and the risk of fine plastic strings formed by pulling away from a workpiece, it is still desirable to minimize the number of extruder switch-overs executed per layer of the build.

Compared to subtractive processes (sawing, drilling, milling, turning, stamping, etc.), the additive processes of 3D printing are generally very slow, especially when rendering high-resolution or highly detailed workpieces. Traditional processes tend to use raw material less efficiently and processing time increases with complexity, but simple operations on even large objects (such as milling and boring engine blocks) can be accomplished fairly rapidly. In contrast, additive processes efficiently place material specifically where it is needed but processing times are dramatically affected by workpiece volume rather than workpiece complexity.) An additively built workpiece often requires hundreds of thin layers of printing. Any step that adds delay at each layer is multiplied many-fold. For an average 3D printed object ranging in size from palm-sized to brick-sized objects, build times can range from 20 minutes to a full day or more. Because of the delays involved and the need to mitigate unwanted effects when changing from one extruder to another, it is desirable to minimize switching between extruders while making a given 3D printed object.

This consideration makes intricate patterns of two or more colors overwhelmingly difficult to achieve in common filament-fusing 3D printers. When two-color designs are used, these generally apply to printing coarse features or to layers of different colors rather than having fine (such as 1 mm sized) features of different colors closely interleaved on a common surface, for example. In the conventional practice for controlling such 3D printers, labels, markings, insignia or decorative patterns that are roughly flush with an object's outer surface are difficult to render without extensive extruder switching and the attendant delays and extraneous stringing of material.

There is a need to enable continuously-extruding additive manufacturing machines, such as fused filament printers, to render surface appearance features, such as graphics, lettering or decorative finishing as part of printing a 3D object in a manner that is efficient in terms of time and material and does not undermine the quality, strength or appearance of the finished object.

BRIEF DESCRIPTION OF THE DRAWINGS

Various exemplary embodiments are illustrated by way of example, and not by way of limitation, in the figures of the accompanying drawings, in which like reference numerals refer to similar elements and in which:

FIGS. 2A-2C are pictorials showing how a graphic feature is typically rendered on a printed object in accordance with prior art practices; FIGS. 3A-3C portray a sequence of depositing material in a particular pattern in accordance with the present teachings;

FIGS. 5A-5C diagram the manner in which pattern data is interpreted to affect the surface appearance rendered during 3D printing according to an exemplary embodiment of the present teachings;

FIG. 6 is a flowchart depicting an example process by which graphic pattern data may be converted into motion control commands for a 3D printer in accordance with an exemplary embodiment of the present teachings;

FIG. 23 is a sketch showing an original smoothly-curved graphic alongside a low-resolution rendering of the same graphic;

DETAILED DESCRIPTION

Figure 1:
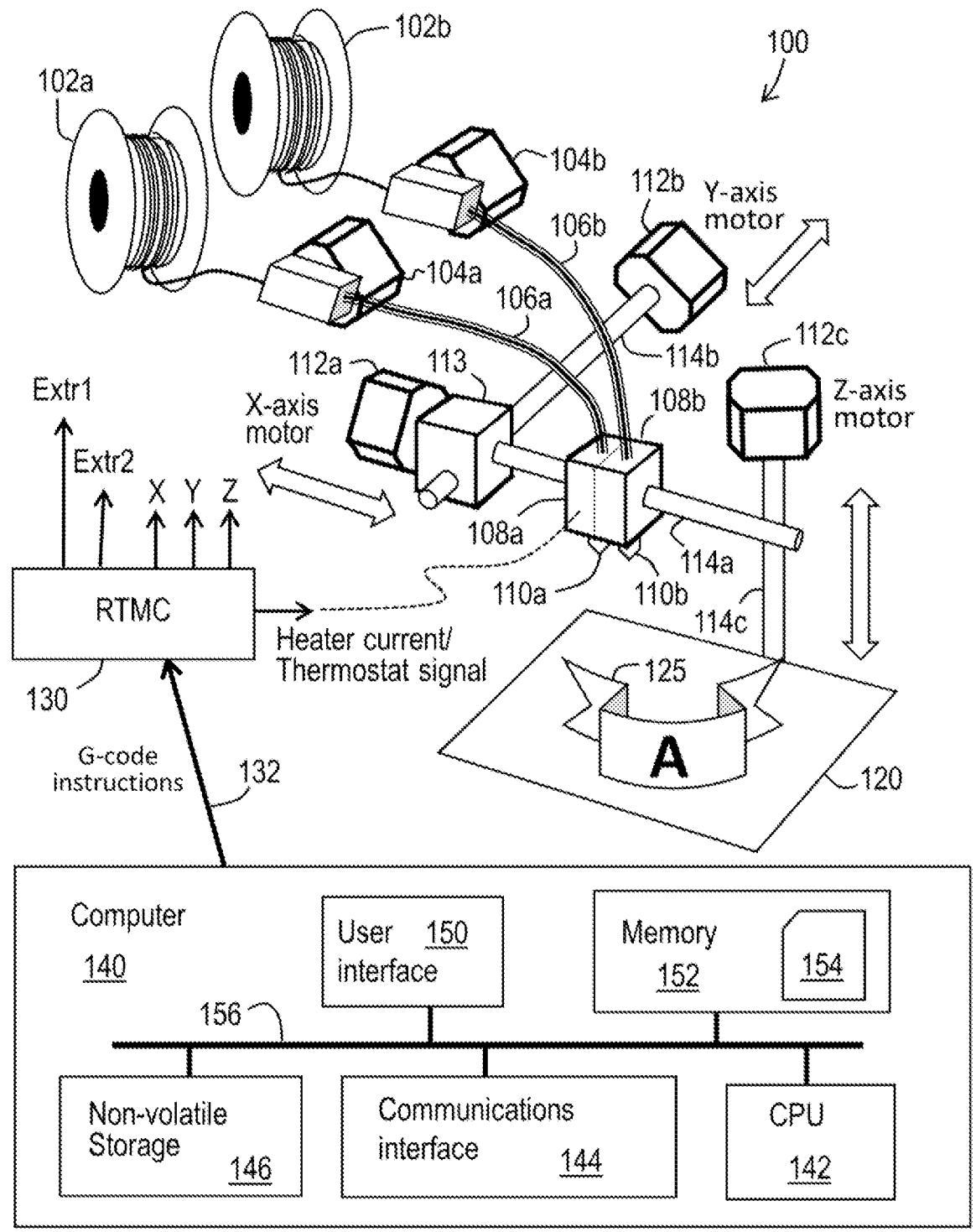
FIG. 1 is a pictorial describing the components in a typical fused filament 3D printing system as a context within which the present teachings may be applied.

A preferred method and apparatus for achieving a patterned surface feature on a 3D printed object are described. In the following description, for the purposes of explanation, numerous specific details are set forth in order to provide a thorough understanding of the preferred embodiments of the invention. It is apparent, however, that the preferred embodiments may be practiced without these specific details or with alternative, equivalent arrangements. In other instances, well-known structures and devices are shown in block diagram form in order to avoid unnecessarily obscuring the preferred embodiments of the invention.

Although various exemplary embodiments are described with respect to forming a pattern of contrasting colors on the surface of an object, it is contemplated that various exemplary embodiments are also applicable to achieving variable textures, contours, translucencies or material properties across a given surface.

In accordance with a preferred embodiment of the present teachings, a multiple-extrusion filament fusion printer achieves finely interleaved placement of material from different extruders at the surface of an object in an efficient manner, which, in comparison to previously known approaches, results in faster printing, fewer extruder changes and fewer side effects from idled nozzles. Additionally, the present teachings allow for a selected extrusion material, such as an expensive metallic, electrically conductive or thermochromic filament, to be used sparingly in a pattern on the surface of an object.

More particularly, a first extrudate is deposited to roughly parallel an object's surface but the exact path of depositing the extrudate is controlled to occur in a roughly serpentine pattern. At points on the object's surface where a first extrudate is to appear, the nozzle's toolpath follows alongside the designed contour of the object and forms the object's surface. At this point, the extrudate trace may be said to have 'surfaced' with respect to defining the object's outer shape and appearance. At places on the object's surface where a second, subsequently applied extrudate is expected to appear, the first extrudate is laid down slightly away from the object surface, set back inwardly by approximately the width of an extrusion trace. The first extrudate may be described as 'submerged' at these positions along the surface. To complete the object's surface, a second extrudate is then deposited from a second nozzle approximately paralleling the path of the first extrudate, but shifting course in exact complement to the pattern of surfacing and submerging established by the first extrudate. The finished product exhibits a substantially smooth surface having thereon any desired pattern of alternate colors or materials from the two extruders, while also only requiring the printer to execute one or two extruder changes per printed layer.

In contradiction to established practice in this art, the second pass is performed at substantially the same Z-height—the same layer elevation—as the first pass. The conventional wisdom would hold that driving the second nozzle with little to no clearance into a pre-existing trace is inadvisable, has no useful effect and could create squashed or sprayed extrudate, if any at all. In contrast, the present teachings encourage crossing of extruded traces within a single build layer because it is discovered that very brief crossing of one trace over another, even if it results in momentarily blocking an active nozzle, has no detrimental effects and any pressure buildup caused by blocking the nozzle is quickly equalized by reaching an opening or void within milliseconds after being blocked. (In fact, any brief pressure buildup that could occur at low feed rates would only help resume flow when a subsequent void is encountered and aids in void filling even in the opposite direction of nozzle travel.) As will be explained, driving the nozzle into a pre-existing trace also secures bonding between the traces. This effect is especially useful where, due to operating principles described herein, a small isolated blob of one extrudate must adhere to the workpiece despite being cut off, in a sense, from the remainder of the trace or extrusion flow from which it was formed.

It is a feature of these teachings that, as a second nozzle crisscrosses over a trace previously deposited by a first nozzle at the same layer height, fillable voids to accept extrudate are encountered so reliably and repeatably during printing that the second pass nozzle persistently creates substantially the same flush extrudate profile as it would during normal printing on a flat surface.

Creating the finished surface may be simply described as follows: At any given point along the surface of an object, a first extrudate is at the surface and a second extrudate is hidden behind the first. At a different place, where the second extrudate needs to be presented at the surface, the positions of these two extrudates are swapped. (In the case of three or more traces shown below, 'surfaced' versus 'submerged' traces may have to deviate from their nominal paths by a somewhat greater amount.) The present teachings result in a fast, efficient, continuously-flowing technique. All surface points that need to present a given material or color of extrudate are completed in one long trace rather than in a piecemeal fashion.

The selection of which of the two or more extrudates is to be outermost at a given portion of a printed surface may be controlled by an established pattern. This pattern may be specified by an object's designer and may correspond to a 2D graphic pattern such as an image, a logo, a line drawing, text, photographic images, or the like. The pattern may also be algorithmic in nature such that the choice of extrudates to appear at any portion of the surface may be decided by performing a calculation or executing programmed logic. Some patterns that are readily in this latter fashion are spirals, honeycombs, basket weave patterns, checkered patterns, plaid, etc. Additionally, some computations can mimic seemingly random effects on the surface of an object even though the decision of one extrudate versus the other is, in fact, determinate. Even truly random data may be sampled to establish a specific pattern of switched extrudates. For simplicity in the current description, arbitrarily chosen images of the first type mentioned above will be assumed as the source pattern. The algorithmically-derived or sampled patterns may always be converted to a rasterized form that comports with the description below, but might also be calculated 'on the fly' only as each pixel value needs to be evaluated. Either implementation in the motion-determining software is equally suitable for implementing the teachings described herein.

One method of expressing a pattern desired to appear on a surface of an object is through raster image data such as a bitmap file. A bitmap file is usually used to represent image to be displayed or printed, but essentially describes a two-dimensional pattern of pixel values (pattern data) that can be interpreted and rendered in other ways. A convention may be adopted, for example, in which darkened pixels in the bitmap represent points at which a first extrudate is to 'surface', or to indeed form the surface of, a 3D printed object. Lighter pixels may represent points at which a second extrudate, rather than the first extrudate, is to be present at the surface of the object. (Of course, the choice of how a given pixel value corresponds to using one extruded color or another is entirely arbitrary.) Thus, at each point where an extruded material defines the surface of the object, that point will be formed by either the first extrudate or the second extrudate. Wherever one extrudate is at the surface, the other extrudate is obscured or 'submerged', preferably hidden immediately behind (inwardly displaced along a direction normal to the surface) the prominent extrudate trace. The first and second traces are preferably kept in close proximity so that a rapid switching is achievable with minimal tool movement and so that the pattern-depicting composite of the two traces is kept relatively narrow, such as within the combined width of the two traces.

Stated in another way, two tentative nozzle paths are calculated. The first path is designed so that an extruded trace will conform to the designed contour of the object's outer surface. A second path, paralleling the first path, is preferably calculated to be alongside and displaced from the first path by approximately the width of an extruded trace. At any point along the object's surface, one extruded trace will conform to the first path while, in complement, the other extruded trace will conform to the second path. At points where the object surface is to be represented by the second trace rather than the first, actual toolpaths of the respective extruders are transposed between the two possible nozzle paths, essentially swapping places to submerge the formerly prominent trace and to surface the previously hidden trace.

This swapping of trace paths can take place for even a brief interval across the surface being formed. This means that the width of a graphic feature on the surface of the object formed by this swap can be on the order of the width of an extruded trace. For example, where an extrusion flow coming out of a 0.5 mm nozzle flattens as it meets the workpiece, it may result in an extruded trace that is 0.55 mm wide but only 0.2 mm tall. (The Z-direction thickness is determined by the overall per-layer print thickness selected for the build.) Under these conditions, the present technique can achieve minimum 'pixel' widths on the order of 0.6 mm wide. Alternative extrudates can surface and submerge at fairly high spatial frequency and allow text or graphics to appear on the surface of the final object. This technique has the additional advantage of eliminating separate post-printing steps and of creating a pattern that is effectively indelible by being, in a sense, imbedded deeply (at least by one extrusion width) into the object's surface. It is further possible to label surfaces and contours of an object (even interior-facing, concave or irregular surfaces) that would be difficult to reach or print in a conventional manner after the object was printed. It is well known that, even for outwardly accessible surfaces, the fused filament process typically produces a ribbed surface that can be difficult to paint or screen print upon. The presently taught technique avoids the need to address this challenge.

In contrast to traditional injection molding, 3D printing does not require a hardened mold and is particularly suited for producing one-of-a-kind or short run objects. This attribute, in conjunction with the presently introduced technique for controlling the appearance or differentiating the surface of an object, makes it possible to create, for example, personalized bracelets, labels, tags or other items. Software processes operating according to the present teachings can combine 3D object designs and graphic patterns to rapidly create new machine control instructions for building an object that includes the graphic features in its construction.

Figure 9:
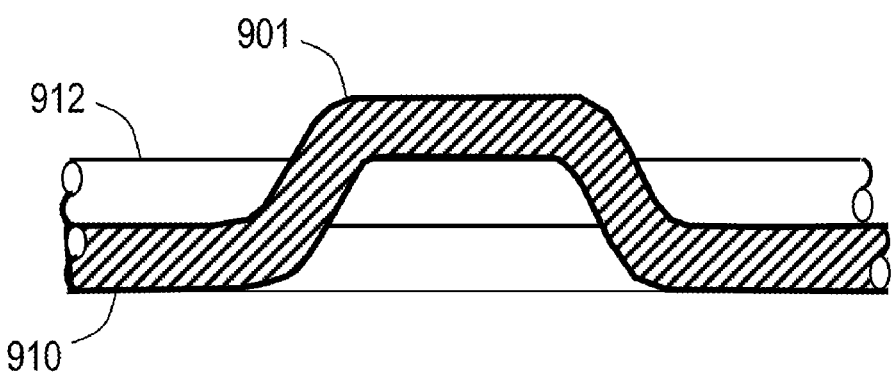
FIG. 9 depicts a variation for producing raised features on the surface of an object in accordance with an exemplary embodiment of the present teachings.

Raised printing may also be achieved by causing one trace to move outward more so than the other trace when it is to surface. For example, one trace may shift outward by the width of two extrusion traces and the other trace may deviate more mildly or not at all. (This effect is depicted in FIG. 9 of the drawings.) This will result in the first trace depicting the graphics in relief, in addition to perhaps depicting a pattern of color change.

A significant advantage of the presently taught approach is the ability to more readily create markings along the more-or-less vertical sides of a workpiece rather than just on the topmost surface. A round or ring-shaped object, such as a vase, bracelet or napkin ring having finely detailed graphics depicted, may be readily formed with minimal extruder changes and minimal formation of extraneous 'strings'. The graphic features may wrap around on all sides of the object, continuously so, if needed, by selectively transposing two or more extrusion traces at each build layer.

FIG. 1 depicts a typical 3D printing system 100. Material for making items is provided in the form of a filament wound on spools 102a and 102b. Filament from spool 102a is fed into a first motor-driven extruder 104a. Likewise, in a dual extruder system, filament from spool 102b is fed into a second motor-driven extruder 104b. Under control of a motion control computer, such as controller 130, extruders 104a and 104b push the filaments through flexible tubes 106a and 106b, respectively. Each filament, driven from some distance away, is forcefully fed into its respective heater block 108a and 108b. Each of the heater blocks comprises a heating element and a temperature sensing element, such as a thermocouple. The temperature of the heating blocks is typically controlled by a temperature controller using, for example, a PID control algorithm. This temperature control functionality may be implemented in controller 130. The current temperature of each heating block is sensed by its respective thermocouple and, if the sensed blocked temperature is too low, electrical current is applied to the heating element for that block.

Integrating the heater control function into controller 130 makes it possible for the heater block temperatures to be programmatically controlled within the same software or script that controls the extruder and nozzle motion motors. During authoring of the machine instructions, control of heater block temperatures is thus made available to the designer of a workpiece being constructed. This setting may be optimized for different materials, flow rates and desired physical characteristics of the finished object.

The output of heater block 106a is at the tip of nozzle 110a. Heater block 106b ejects extrudate from the tip of nozzle 110b. In the configuration shown, both nozzles 110a and 110b move horizontally in tandem as driven by X-axis motor 112a and Y-axis motor 112b acting upon respective lead screws 114a and 114b. (For simplicity, the lead screw threads are not explicitly drawn.) In the arrangement shown in FIG. 1, Y-axis motor 112b turns lead screw 114b to cause a block 113 to move further or closer to the Y-axis motor. X-axis motor 112a and its corresponding lead screw 114a move along with block 113. X-axis motor 112a may also independently turn lead screw 114a to cause the heater blocks 108a and 108b to move in a direction orthogonal to the direction of motion created by X-axis motor 112b. By this arrangement, nozzles 110a and 110b can be moved around in a horizontal plane along two separate axes, essentially covering an entire planar surface.

Z-axis motor 112c may be controlled to turn lead screw 114c so that it can, in turn, control the elevation of a work surface or "build plate" 120 relative to the nozzles 110a, 110b. A workpiece 125, which is an object being constructed progressively by addition of materials from either or both of spools 102a, 102b, is shown on build plate 120, though it should be understood that just before a construction begins the build plate will generally be blank until the extruders deposit the first layer of traces. In the arrangement shown in FIG. 1, a build will be initiated by driving Z-axis motor 112c such that build plate 120 is elevated to a point that nearly brings it in contact with nozzles 110a and 110b. To form the first layer of a workpiece, X-axis motor 112a and Y-axis motor 112b will be controlled to move around just above the build plate while either or both of extruder drives 104a,104b force molten filament to be extruded from the nozzles 110a and 110b. Once an initial layer of material has been deposited in this fashion, then Z-axis motor 112c will generally be directed to turn lead screw 114c slightly so that build plate 120 moves downward and further away from the plane in which nozzles 108a, 108b are moving. At this point, the apparatus is prepared to lay down a second layer of material upon the initial layer that is contacting build plate 120. The remainder of the workpiece is constructed by iteratively lowering the build plate (effectively raising the nozzles relative to the build plate) using Z-axis motor 112c and then coordinating the motion of nozzles 110a,110b to deposit extruded filament under the control of X-axis motor 112a, Y-axis motor 112b, and either or both of extruder drives 104a and 104b. This process is repeated until all layers have been deposited and the workpiece is completely formed.

For clarity and simplicity, FIG. 1 is mainly a conceptual drawing and excludes many gantries, support structures or framework and other details such as pulleys, belts, wires, linear and rotary bearings, thrust bearings, etc. It should be understood that, while FIG. 1 depicts one possible arrangement for control motors to move nozzles about in a controlled fashion with respect to build plate 120, a wide variety of possible designs are possible and commonly implemented. Other configurations are known where nozzles move in X, Y and Z axes over a stationary build plate. Some devices use three separate arms that may each vary in length to effectively triangulate a position for a nozzle at any given moment. All of these techniques are well-known and equivalent for the purposes of the current teachings. The current teachings would be equally applicable to, and achievable by, all of these variations. The motors can be stepping motors, DC servos, linear actuators or be of any other form to drive the required motions.

One commercially available 3D printer that operates in roughly the manner just described is the 'Ultimaker Original' manufactured by Ultimaker BV headquartered in Geldermalsen, Netherlands. (The X-Y motion on this model is accomplished using belts and pulleys rather than lead screws, but the relevant operating principles remain the same.) This printer is available with a real-time controller that uses the Marlin open source firmware hosted on an ATmega™ microcontroller from Atmel Corporation. This model of 3D printer, when equipped with the available dual extruders, is one suitable platform for implementing the techniques described elsewhere herein.

In FIG. 1, a real-time motion controller 130 is provided for exercising control over all of the aforementioned mechanisms, including extruder motors, and the motors that control the relative positioning of nozzles 110a, 110b and build plate 120. Controller 130 may also receive inputs from limit switches (not shown) which are commonly used in motion control systems and serve to safely limit the movement of motor-driven parts as shown in the arrangement of system 100. A Z-axis limit switch also often assists in calibrating the distance between the nozzles and the surface of the build plate.

Controller 130 also controls heater blocks 108a and 108b and may also receive input from a thermocouple for each one of the heater blocks, so controller 130 can be involved in establishing a fixed temperature for each heater block which, as mentioned before, can be subject to software control. In some implementations, the build plate 120 is also heated and the controller 130 controls the heating of the build plate. If this is used, controller 130 receives temperature readings from a thermocouple from the heated build plate and sets the build plate temperature based on instructions received via G-code instructions, which are described below.

There may also be other peripheral devices that are controlled by the controller. For example, it is common for a cooling fan to be attached somewhere in the vicinity of heating blocks 100a, 100b. The optional cooling fan moves in conjunction with the nozzles and hastens the cooling of the newly deposited extruded filament, as is desirable for some builds.

Controller 130 generally implements 'real-time' control over the motors and other components, meaning that where specific timings and speeds are called for to deposit extrudate in a desired pattern, the firmware in the controller is dedicated to adhering to the specific timings to achieve consistent results. This is very important given the speed with which the nozzles must move for some projects and the fact that the extruded filament is emitted from the nozzles more or less continuously. It is important that the controller 130 not hesitate at inopportune times which could cause because extruded material to build up in some places in an undesirable fashion or cause other anomalies or interruptions that would be apparent in the finished object being built.

Accordingly, controller 130 generally does not make calculations as to how to build a certain object but instead accepts fairly simple, sequential instructions in the form of so-called "G-code" instructions. (G-code programming is best known in the context of automated or so-called CNC (Computer Numerical Control) machining and is described in EIA Standard RS-274.) The detailed instructions of how the motors and extruder drives must be coordinated to build a given object are calculated by a separate computer before the time that the object is actually built on the platform 120. These calculations are reduced to discrete commands of positions and speeds for operating the various motors. To ensure timely control of the various moving parts, real-time controller 130 acts as a 'slave' processor that simply reads and acts upon the sequence of relatively simple motor control instructions that have been prepared beforehand by a separate 'master' processor.

A master processor may determine, for example, that part of an object build requires a circular arc to be printed and may apply trigonometric functions to calculate a series of short segments to form the arc. As each segment involves moving the nozzles in a straight line from a first X-Y position to a second X-Y position, these beginning and ending coordinates are each listed as a single line of G-code instruction along with the rate at which the movement is to occur. The same G-code instruction may also instruct that, during the movement, an extruder motor is to drive a filament forward by a given amount.

The desired motion is called for by the instructions regardless of whether the actual motors of the 3D print mechanism are stepper motors or DC servos and regardless of how many turns of a shaft, pulley or lead screw are needed to accomplish the displacements specified in the G-code instruction. It is the job of the real-time controller 130 to determine, for example in the case of stepping motors, the quantity and timing of current pulses that must be applied to one or more motor windings to accomplish the motion called for in the G-code instructions. It may be said that the G-code instructions are largely independent of the specific 3D print mechanism being used and that the G-code instructions are therefore fairly portable to any printer (subject to maximum print size, of course.) The real-time controller associated with a given 3D printer mechanism interprets the G-code commands and determines how to accomplish the specified motions in the context of that particular mechanism.

In FIG. 1, a separate computer 140 is shown as an example of a master processor for producing G-code instructions and may be fulfilled, for example, by any variety of personal computer. Computer 140 is shown to comprise a central processing unit or CPU 142, a communications interface 144, a non-volatile storage 146 and a user interface 150. Computer 140 is also shown to comprise a memory 152 which is shown to contain, among other things, pattern data 154, the purpose of which will be further described below. The various elements shown inside computer 140 communicate over a data bus 156. User interface 150 may comprise an end-user display, such as a LCD or LED flat-panel display and one or more user input devices such as keyboards, pointing devices, etc. Communications interface 144 may allow data communications with other processors and may be implemented in the form of an Ethernet connection, a wireless LAN connection, a USB interface, an RS-232 interface, or any of a number of other possible communications ports and protocols. In particular, communications interface 144 may be the means by which computer 140 communicates G-code instructions 132 to real-time motion controller 130. A user may connect computer 140 to real-time motion controller 130 through a USB cable or so-called "FireWire" connection. Alternatively, a user may insert a portable data storage device into a USB port of computer 140 and transfer files including G-code instructions 132 onto the portable storage device (or so-called 'thumb drive' or 'jump drive'). The user may then withdraw the drive from computer 140 and plug it into a similar USB interface (not shown) supported by controller 130. When a build is commenced, controller 130 may read the G-code instructions directly from the portable data storage device and responsively cause the heaters, extruder drives and X-Y-Z drive motors to actuate.

Non-volatile storage 146 corresponds to the typical so-called 'hard drive' commonly found in personal computers. Non-volatile storage 146 typically contains boot information, operating system executables, and applications that the computer can load into memory 152 and execute. Non-volatile storage 146 also provides a persistent store for user data files, such as STL files (which describe 3D surfaces), G-code files and pattern data files. Memory 152 serves to temporarily store instructions for CPU 142, as well as data including operating system components, applications, and data used by applications. Of particular note, memory 152 is shown to contain a body of pattern data 154 that may be accessed by CPU 142 in a manner that will be described further below.

One typical way in which users employ the overall system shown in FIG. 1 is to load a 3D modeling application from non-volatile storage 146 into memory 152 whereupon CPU 142 is caused to present a depiction of three-dimensional space (although it is a two-dimensional display) upon a display screen as part of user interface 150. (There are also some web-based 3D development applications accessible via a web browser executing on computer 140.) Using the 3D modeling application, a person designing an object to be 3D printed can select a variety of shapes such as cubes, cylinders, spheres, cones, etc. in order to describe the shape of the object that they desire to have built. Such an application typically allows a user to manipulate a simulated 3D view by panning, zooming and rotating in various axes until the user is satisfied that they have adequately described the shape that they want to build. Some commonly known 3D modeling tools include Blender, Autodesk 123D, Sketch Up, TinkerCad and SolidWorks. Some of these tools are the same ones also used to create engineering mockups or animated feature films. The 3D modeling application then converts the user's model into a specially formatted file, such as an 'STL file', which essentially describes the surface of the user's object in terms of a large number of interconnecting triangles. In other words, the surface of the object is tessellated. (Information regarding the STL file format may be found at the Library of Congress using accession number fdd000504.)

The next step in the typical process is for the user to invoke another application, known as a "slicer", which receives the STL file and converts it into a series of commands motion control commands appropriate for building each thin layer or slice of the finished object that has been described in the STL file. One well known slicer application is called 'Curs' and is developed and maintained by Ultimaker BV. The slicer generates the G-code file as raw instructions for controlling the motors of the 3-D printer and this is the set of G-code instructions 132 that are conveyed to controller 130. To generalize, additive manufacturing systems fabricate an object according to a design description of the object that describes which portions of a build space are to be occupied by the object once it has been completely fabricated. In the course of converting a design description to layer-by-layer instructions, the intersection of a plane (generally parallel to the build plate surface) and the design description is calculated and yields one or more designed surface contours that describe the shape of what will become the surface of the printed object for a given layer of the build. In the case of extruding machines, slicing software applications generally create instructions that direct the nozzle(s) to follow this contour smoothly to form the outer surface or wall and then to fill the contained internal spaces, either solidly or more sparsely using arbitrary mesh-like fill patterns.

It is important to note that, while 3D modeling applications and slicers are the typical way in which a user envisions and describes an object and their description becomes converted into motor control commands, this is not the only way to produce G-code for producing 3D print objects. Other techniques are known for more efficiently describing objects or generating the G-code in certain circumstances. For example, some shapes, such as a geodesic dome or a spiraling seashell, are much more easily described in mathematical terms rather than tedious manual placement of carefully sized blocks, spheres, cylinders or other primitives. Therefore, there are other tools that generate either STL files or G-code based on mathematical formulas and such—more directly than operating the way that most 3D modeling tools do. Of course, employing the latter approach requires more advanced mathematics and visualization skills from a designer compared to the manipulative user interfaces presented by the 3D modeling tools. On the other hand, however, organic shapes, such as human hands, faces, plants, animal bodies or intricate combinations of basic shapes (such as a train engine) might be better assembled using one of the 3D modeling tools.

One of the previously known manners in which existing user applications have been able to create graphics or lettering on a finished 3D printed product is to include such shapes as protrusions on the surface. For example, if one desires to make a tag with lettering, then the tag 'substrate' or 'body' is formed more or less flat against the build plate. A number of layers of extrusion are deposited to form the tag itself and then a number of subsequent layers are deposited stacked on top of the initial layers to form raised letters. This form of construction is depicted in FIGS. 2A-2C. (It should be noted that, in dual extruder systems, another technique for depicting graphics or lettering on the surface of an object involves separately defining two shapes, one shape from each color, and then superimposing the two shapes within either a 3-D modeling tool or a slicer software application. While this can work reasonably well for fairly coarse features, it is far too tedious of an approach for fine features. Furthermore, this typical approach may also inefficiently use special filament materials, such as metallic or iridescent materials intended for surface effects, for filling a significant amount of the interior of an object.

Representing a prior art approach, FIG. 2A shows a workpiece 202 having been constructed in the typical fashion just described. For reference, axes 204 are provided as a legend to show orientation of the workpiece relative to the motor directions described in FIG. 1. Axes 204 depict that the Z-axis is in a direction that comes outward from the plane of the drawing. As can be seen, workpiece 202 comprises a flat base of one or more layers 205, and upon which is further formed a graphic feature 206, in this case having the shape of the letter 'A'. Graphic feature 206 is formed atop the initial layers 205 by adding further passes of extruded layers in a particular pattern. FIG. 2B shows a cross-section of the same workpiece that was shown in FIG. 2A. FIG. 2B shows that the graphic feature 206 has been formed by successive layers 208 of deposited filament material. This detail also shows a typical practice wherein each layer of the graphic comprises outline traces 207 defining an outer wall of the desired feature, followed by filling traces 209 deposited to fill in the space inside the feature. Although slicers tend to direct the outlining of the features in a consistent manner, different slicers use a variety of filling patterns and may even leave voids (to reduce material usage) or may vary the filling pattern layer-by-layer to avoid warping. This variability explains the irregular appearance of the filling traces 209 in FIG. 2B.

FIG. 2C is a close-up view of the graphic feature 206, viewed from roughly the same angle as in FIG. 2A. FIG. 2C depicts what is typically observed on the surface of a feature that is formed in this manner in that the path of the tool outlining the shape is evident as well as the pattern of motion of the tool in filling in the internal area of the graphic. The outline traces 207 and the filling traces 209 show evidence of chatter from the motion of the heated nozzle as the topmost layer was formed. It is also often observed that either small voids 215 or excess material buildup 216 lends to a rough outer appearance for the graphic feature 206. Thus, the finished appearance of the article is degraded by the use of the tool to move in the X-Y axis to lay out the graphic feature and this approach is also relatively complex in terms of the calculations needed to determine a useful fill pattern on the part of a slicer. Finally, this technique suffers from limiting the surfaces on which graphic features such as graphic 206 may be formed as part of a workpiece. While it may be possible to control a extrusion nozzle to cause protrusions on the vertical sides of an object as it is being built, this is not advisable on many 3D filament forming equipment because some parts of the build, such as the transverse stroke running horizontally across the capital letter 'A', would require extrusion from the nozzle over an area that is not supported underneath. In practice, extrusions over open areas succumb to gravity and droop or sag, causing the intended feature to be malformed.

Consequently, graphics and features that need to be depicted in relief, especially relief with contrasting color, present a significant challenge for extrusion-type printers if they are to be exhibited on more or less vertical portions of a workpiece. This attribute limits the ability of such printers to depict high-resolution graphics or lettering on anything but a topmost surface of an object being built.

FIGS. 3A-3C of the drawings depicts a progressive building process in accordance with the present teachings by which high-resolution graphics or lettering may be easily formed on the surface of an object being built using a fused filament process. FIGS. 3A-3C show the state of a small portion (spanning a few millimeters) of an existing workpiece that is being progressively or additively constructed. Facing leftward, an outer surface 301 is designated as a surface upon which graphic features are to be formed in accordance with the present teachings, although it should be understood that 'outer' is a relative term and the surface could be an inward-facing surface, such as the interior of a beverage cup. Outer surface 301 may be part of a 'multiple extrusion surface region' that is to be substantially formed using two or more extruded traces in alternating intervals per the present teachings.

For convenience, reference is often made herein to an 'outer' surface of an object, but it should be apparent that any portion of an object may be formed in the manner described so that a pattern of high spatial frequency may be made of traces from multiple extrusion sources. Even where the present teachings are applied to varying the composition on a surface of an object that is observable, topologically exterior or open to the ambient atmosphere, that surface may be inwardly facing, such as when a picture or text is to appear on the inside walls of a drinking vessel or on the inside surface of a so-called 'enchanted egg' which is only observable through a tiny hole. Graphic features may even be formed on surfaces disposed completely inside of an object which are not observable until a part of the finished workpiece is removed, peeled back, machined away, cut open or broken off.

In FIG. 3A, a total of seven previously deposited traces are depicted for convenience, although this is for illustrative purposes only and the existing workpiece may have considerably more traces built up below or behind the portion shown. Furthermore, for clarity in the line drawings of FIG. 3A, the traces are shown as being distinct from one another. In practice, each of the subsequent molten traces deforms into continuous contact into the other traces adjacent and below, so the actual appearance, if one were to cross-section the workpiece, would be a more or less solid block having the overall shape of what is depicted in FIG. 3A. Six traces 302 are shown, as well as a trace 304 behind the area that is next to be printed. Typically, traces 302 will have been formed in previous layers of the build whereas trace 304 will have been deposited, as part of the same print layer, immediately prior to what is about to fill the remaining space above traces 302.

FIG. 3B depicts the path of an extrusion nozzle 310 in laying down a subsequent eighth trace in addition to what was evident in FIG. 3A. Because of the specific motion of the nozzle 310 prescribed by the present teachings, this new trace 306 is observed to follow what may be described as a somewhat serpentine path. Along a first portion 307 of the extrusion pass, trace 306 roughly aligns with over an outermost trace that was previously laid down. Along a second portion 308, nozzle 310 moves into more inward course, causing trace 306 to be deposited away from the outermost facet of the workpiece and more against previous trace 304. As a latter portion 309 is traversed, nozzle 310 again moves outward so that trace 306 again aligns with the outer surface contour of the workpiece. In FIG. 3B, it may be observed that not all of the volume that was available to be filled as was evident in FIG. 3A has been covered by the passage of extruder nozzle 310 and deposition of trace 306. In FIG. 3B, along portions 307 and 309, there is some remaining space between traces 306 and 304. Over portion 308, trace 306 aligns more inwardly, leaving an unprinted open space facing the plane of outer surface 301.

The disposition of these remaining open spaces is explained in FIG. 3C. In FIG. 3C, it is evident that a second extruder nozzle 312 has passed over the area to be printed and deposited a trace of extruded material 316, which may be of a different material, color or texture than trace 306. While depositing trace 316, nozzle 312 is moved in a pattern exactly complementary to the path that was taken by nozzle 310. Trace 316 fills the voids that were left on either side of trace 306 with a second extrudate. The net effect, shown in FIG. 3C, is that the workpiece will be essentially solidly filled and that the outer surface of the workpiece will be formed by trace 306 along portions 307 and 309 and by trace 316 along portion 308. It is particularly advantageous in this approach that the extruder nozzles are able to move fairly continuously and more or less linearly and yet allow for fast interchange of high spatial frequency at the surface of the object. Furthermore, this is accomplished without significantly weakening the structure and without high incidence of switching between extruders. As mentioned before, extruder switching is time consuming and can introduce unwanted effects. As yet another advantage, the outer surface of the workpiece formed in this manner has a very well controlled contour and surface texture. Being formed from the sides of an extrusion traces, it is not subject to the chatter, material buildup and other telltale disturbances depicted in FIG. 2C.

Figure 4A:
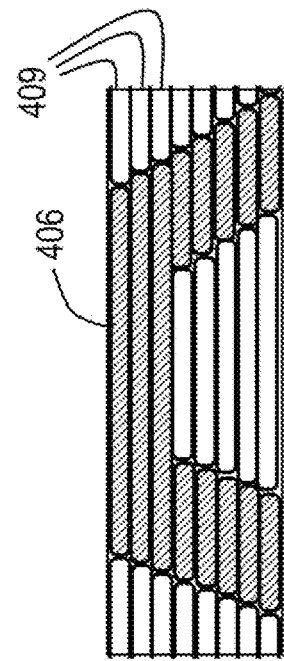
FIGS. 4A-4C show the formation of a graphic feature on a surface in accordance with the present teachings.
Figure 4B:
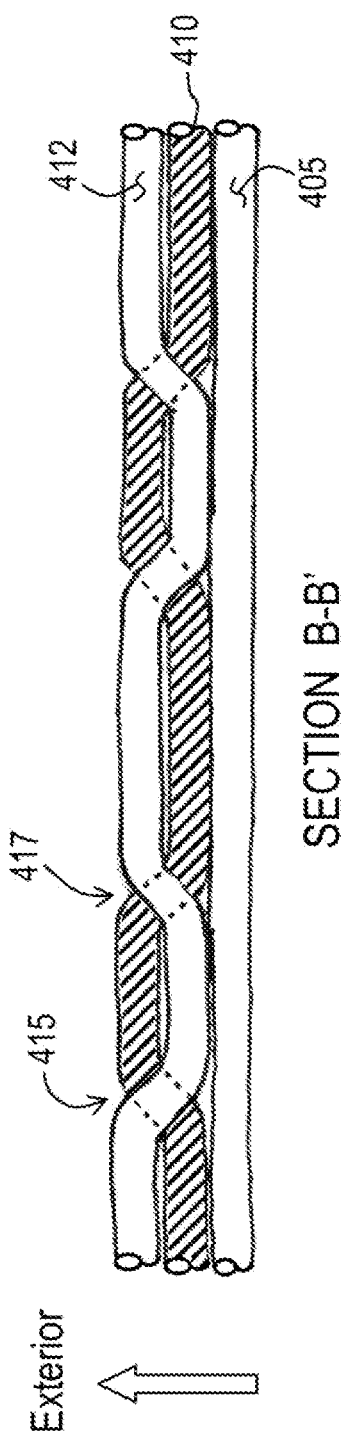
Figure 4C:
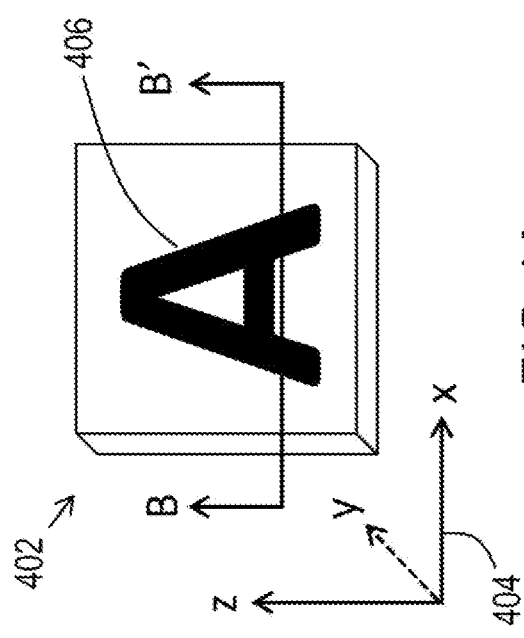

FIGS. 4A-4C of the drawings depict the appearance of a graphic feature that has been formed on the surface of an object in accordance with the present teachings. FIGS. 4A-4C may be usefully contrasted with the prior art construction depicted in FIGS. 2A-2C. In FIG. 4A, a portion of workpiece 402 is shown to have been created having a graphic feature 406. This portion may constitute part or all of a multiple extrusion surface region on an object where traces from multiple extruders are applied in alternating intervals to form the surface of the object. A set of reference axes 404 are provided as a legend to show the directions in which the object or workpiece 402 was oriented on the build plate. Note that, based on the orientation, the workpiece 402 was built vertically, that is, with the earlier layers of the build starting at the bottom of the image shown in FIG. 4A, and then working towards the base of the letter 'A' and then upwards. A cross-section of workpiece 402, built in accordance with the present teachings, is shown in FIG. 4B.

In FIG. 4B, the plane of the drawing parallels the plane of a build layer and the build elevation axis would extend normal to the plane of the drawing. Trace 405 and any underlying layers of traces are actually vertical walls in the construction of the finished object, so if there are other layers below trace 405 as shown in section B-B', these would be merely adding to the inward thickness of the wall of the printed object. The overall wall thickness of the three traces 405, 410, 412 combined may be around 1.8 to 2.0 mm when a 0.5 mm nozzle is used. Trace 405 is analogous to trace 304 introduced in FIG. 3A and its presence is optional, but preferable for greater wall strength and opacity. The view of FIG. 4B is comparable to FIG. 3C as observed from directly above the workpiece. For clarity of description, the three traces are drawn with slight gaps between parallel traces. In reality, these traces substantially adhere and meld with one another to become a solid structure having little or no void space.

In FIG. 4B, the upper two traces 410 and 412 determine the outer shape and appearance of the finished object. Considering FIG. 4B from left to right and taking the outer surface of the object is being towards the top of the sketch, one may observe that trace 412 is initially present at the outermost surface of the object until crossover point 415. At crossover point 415, the path of trace 412 diverts somewhat more interiorly and effectively 'submerges' behind trace 410. Correspondingly at this same point 415, trace 410 is formed to move from a position of being printed behind trace 412 and to emerge or surface for a distance until reaching point 417 at which point trace 410 again submerges and trace 412 reemerges. If the trace 410 is taken to be the darkened or black color depicted by the graphic feature 406 in FIG. 4A, then it is evident that the pattern formed in FIG. 4B would be essentially a 'light-dark-light-dark-light' pattern that could be used to represent the lower part of the legs of the capital letter 'A'.

FIG. 4C shows the outward appearance of the printed article resulting from techniques taught herein. In particular, FIG. 4C shows a close-up of the workpiece 402 from FIG. 4A so that individual build layers can be observed. This view may be somewhat exaggerated depending on the thickness of the layers and the size of the graphic that is being rendered. Given the build direction, successive layers of the build (that is in the Z-axis) are observed as stacked layers 409 in FIG. 4C. Each layer 409 may comprise traces from both extruders. The lighter portions observed in FIG. 4C correspond to positions at which, in FIG. 4B, trace 412 is the uppermost trace. Where darkened intervals appear within one of the layers 409 shown in FIG. 4C, this corresponds to the surfacing of trace 410 as the uppermost trace in FIG. 4B.

Although FIG. 4C is a line drawing and does not convey the smoothness of the surface, it can at least be noted that this surface is as smooth as any other vertical surface that a given 3D printer is able to create on objects. In the current state of fused filament printing, this outer surface, formed by the sides of successive traces, can be quite fine and appear to have somewhat of a silky texture with a matte finish or with very fine ribs. Correspondingly, graphic feature 406 can be formed to appear flush with or inlaid into the surface of the object. Furthermore, unlike the techniques of the prior art, graphic feature 406 need not be depicted in relief and any traces that would form horizontal or overhanging portions of a letter or other graphic feature are no longer problematic because every trace is supported by underlying previous traces.

Figure 5A:
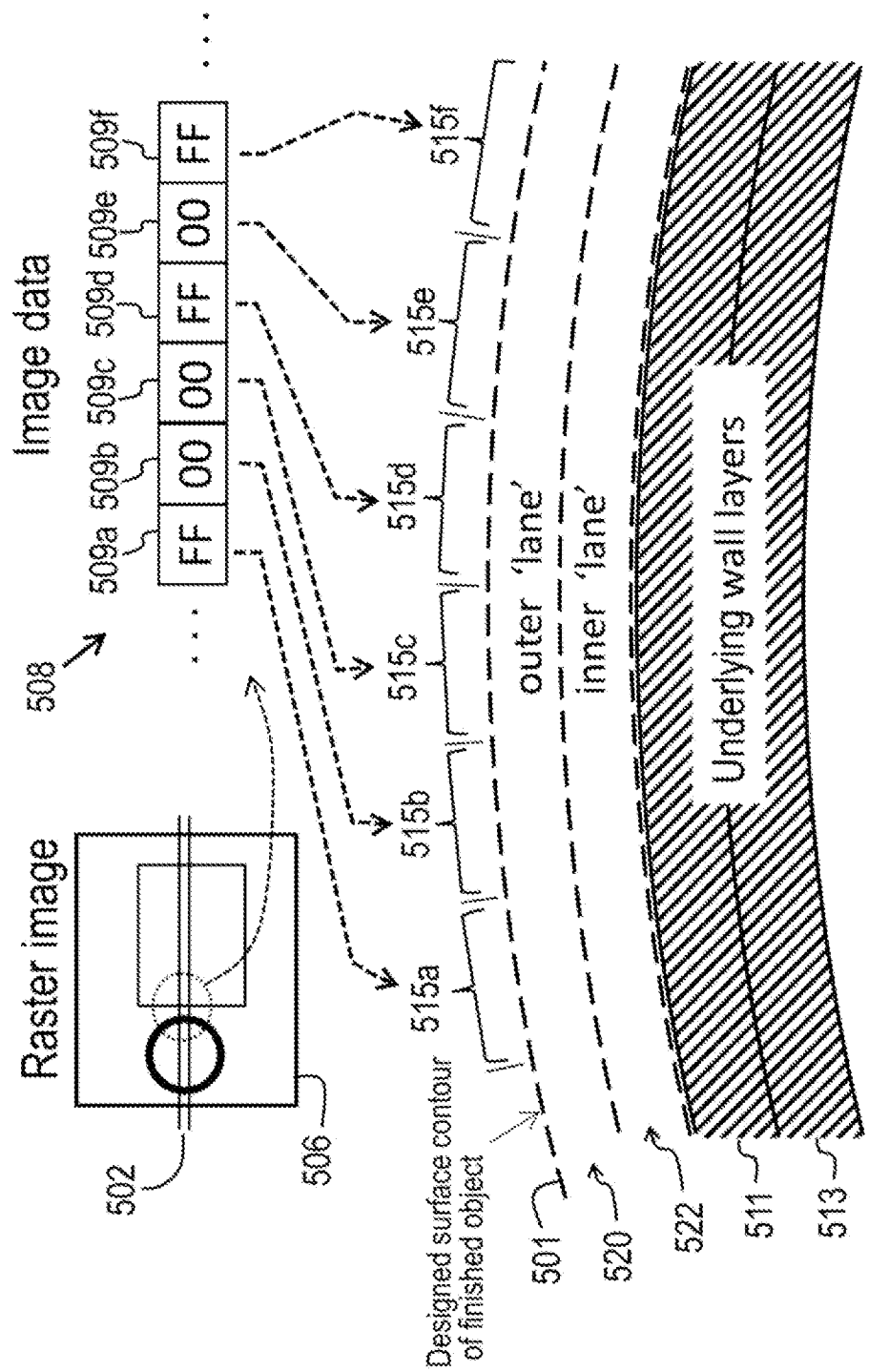
Figure 5B:
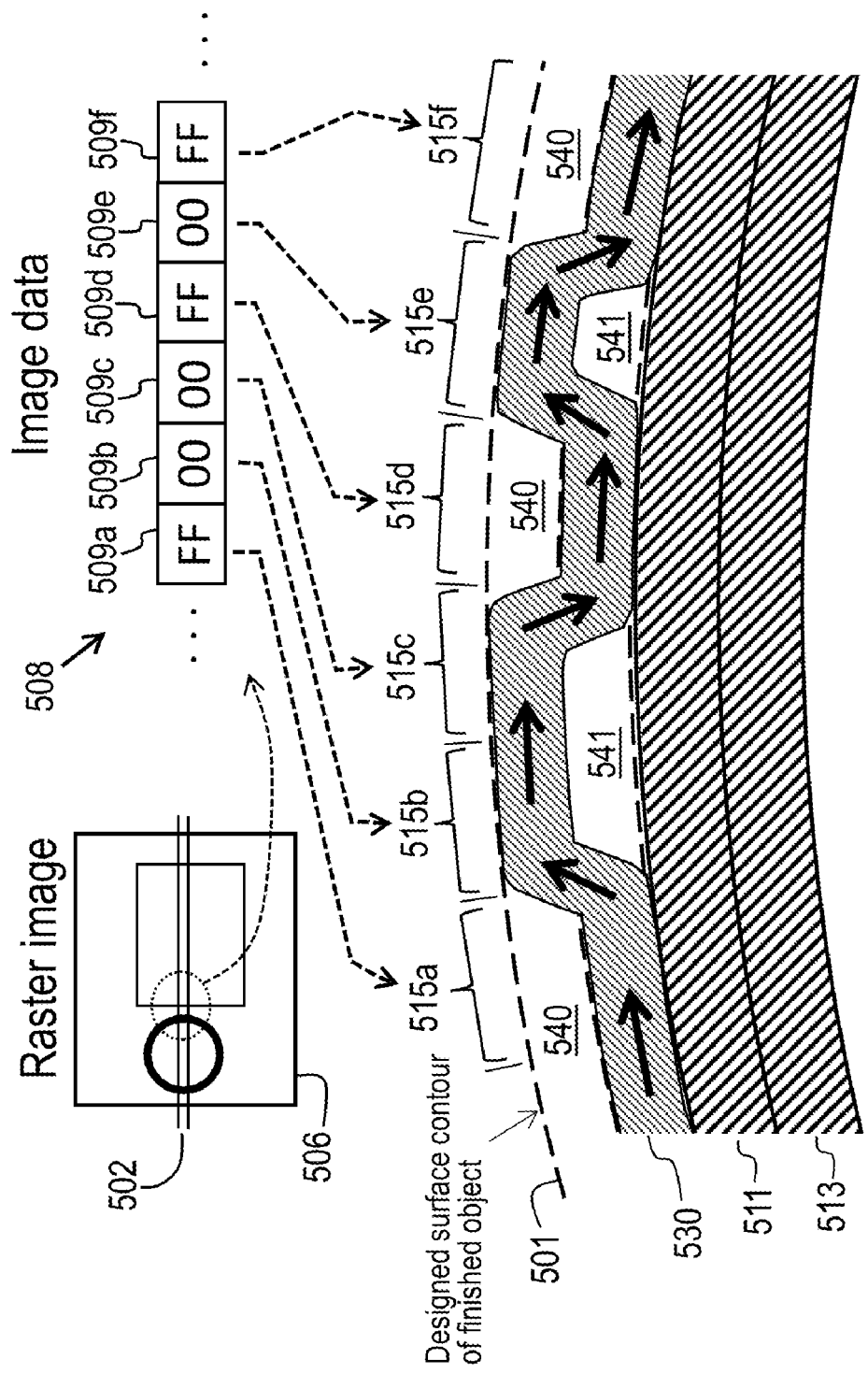

FIGS. 5A through 5C show more particularly how pattern data (such as pattern data 154 depicted in FIG. 1 as being stored in memory 152) may be interpreted to control the pattern in which the path of extruder nozzles, and therefore the shape of the extruded traces formed, may be controlled to depict a desired appearance or image on the surface of a 3D printed object. Raster image 506 may be expressed in the form of a bitmap file, or any of a number of other well-known formats for representing images or letters in a computer system such as a GIF, JPEG, PNG, TIFF files or the like. There are also font files for depicting different character sets, whether in an inherently rasterized format or in a metafile description that enables rendering into a raster memory space. Raster format refers to establishing a 2D array of pixel values, each addressable by a row number and column number. In practice, any form of image description suffices as long as a determination can be made as to whether one trace or the other should surface at a particular position on an object surface.

For illustrative purposes, a particular horizontal row 502 of pixels through the image 506 is shown to be analyzed within the image and interpreted for controlling a layer of extrusion in the course of forming a 3D printed workpiece. What is next described will be repeated for other rows of the image as applied to other layers of the build, resulting in the complete image 506 affecting the appearance of the surface of the finished workpiece.

A further subset of data taken from row of pixels 502 is depicted in pattern data subset 508 wherein a series of sequential pixels 509a-509f are shown to have values either "FF", representing a white pixel, or "00", representing a dark pixel. Of course, this is a very simple single-byte-per-pixel example for illustrative purposes only, and bitmap pixel values are often represented as multi-byte RGB values, palette indices or in other forms. Furthermore, there are any number of ways to convert arbitrary pixel values to a determination as to whether one or the other of the extrude traces should surface on the workpiece at the position that corresponds to the pixel location in the graphic. The determination may be based on any aspect of pixel data values, such as the state of a single bit, specific values or thresholds applied to integer values, calculations of brightness or color attributes (hue, tint, saturation) from multiple values (RGB or CMYK), level of a particular color component, an alpha or transparency value, etc.

For forming the machine commands that will be instructing a 3D printer to build the object, it is often necessary for a designer to understand how each pixel in raster image 506 corresponds to a location on the surface of the 3D object that is being constructed. This correspondence may be established by program logic in the course of assembling G-code instructions or may be set more interactively by an end user using a 3D modeling or visualization application (if adapted in view of the present teachings) running on computer 140. Where a raster image is to be rendered as a feature on a particular portion of an object, such as a designated multiple extrusion surface region, several points of correspondence may be needed to unambiguously establish the position, orientation and scaling of the graphically-controlled feature on the object's surface. For relatively simple shapes, such as a cylindrical shape completely wrapped by a graphic feature or a flat rectangular surface, relatively few points are needed to enable mapping from pattern data to point-in-build or point-along-contour. The correspondence between an pattern data value and a position on an object's surface may or may not be explicitly selected by, or known to, a designer. The correspondence may be inherent, implied or even completely arbitrary, particularly where an object's entire surface is a multiple extrusion surface region and the graphic pattern need only be self-consistent within the build but otherwise has no required orientation relative to the object. An example would be a basket-weave pattern applied to the surface of pail.

Accordingly, in FIG. 5A, it can be seen that the first pixel 509a in pattern data subset 508 corresponds to a first position 515a along the designed surface contour 501 of the finished object. As mentioned earlier, designed surface contour 501 will have been derived by determining where a hypothetical plane parallel to the build plate surface intersects with mathematical components in an object design description for the given object. The lower part of FIG. 5A depicts the successive walls that form the surface and superficial structure of an arbitrary object. The uppermost dotted line represents the designed surface contour 501 for the object, that is, the intended location of the outer surface once the printing is finished.

Traces that may have already been printed just prior to printing the outside surface are represented by trace layers 511 and 513 (shown crosshatched). In practice, there may be considerably more underlying trace layers to build a thicker wall or to even build a fully solid object. Alternatively, the entire object wall can be formed thinly by just traces 530, 532 (introduced below), optionally excluding trace layers 511 and 513. The other dotted lines in the lower part of FIG. 5A are intended to show potential positions or 'lanes' for subsequent traces that will define the outer appearance of the finished object. Outermost lane 520 is the position at which a trace will essentially form the surface of the finished object and conform to the intended surface contour 501. Outermost lane 520 is a first candidate toolpath along which a nozzle could be directed to deposit a trace that would conform to the designed surface contour 501. Further inboard from lane 520, lane 522 depicts an alternative path along which a trace may be deposited such that it fits behind a trace in lane 520. A trace placed here does not form the surface of the object but is displaced approximately one nominal extrusion width away from the surface of the object. Lane 522 constitutes a second toolpath that a nozzle could follow and resulting extruded trace would be parallel to, yet spaced from, the designed surface contour. The candidate toolpaths are designed so either one or the other of the nozzle-extruded traces will form the outermost surface of the object at a given interval along its surface contour.

The allocated widths of lanes 520, 522 correspond to the nominal width of the extrusion traces deposited by the extrusion nozzles. A typical overall trace width for a 0.4 mm nozzle is about around 0.6 mm when the height for each build layer is set to 0.2 mm and the extrusion rate (amount of material discharged per linear distance travelled) is properly adjusted. Thus, in cross-section, a typical extruded trace is flattened out to about a 3:1 aspect ratio and has somewhat rounded or bulging sides. To assure good fusing between traces deposited side-by-side, the toolpaths of the depositing nozzle(s) may be offset by somewhat less than 0.6 mm—such as 0.55 mm—to assure that the bulging side parts meld together, but not so much as to exceed the volume available for the trace. The nominal trace width (or trace spacing) is said to be around 0.55 mm in this instance—roughly equal to or slightly less than a measured overall trace width—and would likely be similar among multiple nozzles on the same machine operating under a similar set of parameters. The nominal trace width may also be considered as an approximate, average or estimated trace width, considering that actual depositing trace width and geometry may vary somewhat with conditions such as filament variations, ambient temperatures, heating block temperature swings, workpiece thermal expansion, etc.

The value of pixel pattern data element 509b will determine which of the two traces from the extruders will be present at the surface of the object at the location on the surface of the object 515b. Likewise, data for pixels 509c-509f correspond to positions on the surface of the object, 515c through 515f. Where the pattern data for a pixel represents a first color or a first extrusion material, the corresponding nozzle for the first extrusion material will be directed to follow along lane 520 and as it passes over that portion of the surface 515a. This will be made more clear with reference to FIG. 5B.

In FIG. 5B, a first trace 530 is shown to have been deposited (in the manner described earlier in FIG. 3B) by the passing of a nozzle that is laying down a first extrusion trace in a particular pattern conforming to the indications of the progressive sequence of pixels in the pattern data subset 508. In particular, it can be seen that trace 530 aligns with lane 522 as it passes by a first position 515a along the designed surface contour 501. This choice of lane 522 over lane 520 is in response to the fact that the value at 509a is "FF" which corresponds to another extruder's material being desired at the surface of the object at that position. As the extruder that is depositing trace 530 approaches a different position 515b of the surface, it can be seen by pixel value 509b that the output of the active extruder is desired to form the outer surface 501 of the finished object at that position. Therefore, the path of the nozzle extruding trace 530 shifts outward and follows along the path of lane 520 throughout its travel through portions 515b and 515c. In response to the value evident in data elements 509d-f, the nozzle depositing trace 530 moves back inward and follows trace lane 522 for a distance, then moves outward again while passing by portion 515e, and again submerges as it passes by portion 515f of the surface. This leaves a pattern of outward facing voids 540 and inward facing voids 541. These voids are filled by a subsequent nozzle moving in a complementary fashion to the path in which trace 530 was laid down.

In FIG. 5C, a new trace 532 has been laid down by an alternate nozzle in a complementary pattern to that of trace 530. That is to say, wherever one of the pixel data values in pattern data subset 508 indicates a value of "FF" trace 532 will be aligned with the outside surface contour of the finished object. Wherever the pattern data has a value of "00", trace 532 will be formed a distance away from surface contour 501. It can be seen in FIG. 5C that, in forming the outer surface of the object being printed, that traces 530 and 532, which may be of different materials, different colors or different compositions, effectively swap positions between lanes 520 and 522 in order to present either one trace or other while following the outer surface contour of the object and forming the outward appearance of the object at that point. Thus, over a first interval (portion 515a) along designed surface contour 501, trace 532 is at the surface of the object and conforms to the design surface contour, while trace 530 is printed in parallel with design surface contour but spaced away such that trace 532 is interposed between the designed surface contour 501 and trace 530. Over a second interval (comprising portions 515b, 515c) the toolpaths for depositing traces 530 and 532 are transposed, causing trace 530 to surface and to be interposed between the designed surface contour 501 and trace 532. Over a third interval (portion 515d) the situation is again reversed so that trace 532 is present at the surface and is interposed between the designed surface contour 501 and trace 530.

Referring to FIG. 5B, a composite toolpath assembled for a first nozzle depositing trace 530 would comprise: (1) a segment (or, as necessary, a curved path described by a series of short segments) corresponding to following lane 522 along the first interval (portion 515a); (2) a segment for transitioning from lane 522 to lane 520 at the juncture of portion 515a and 515b; (3) a segment conforming to the designed outer contour along the second interval (portions 515b, 515c); (4) a segment for transitioning from lane 520 to lane 522; (5) a segment corresponding to following lane 522 during the third interval, etc. A similar but complementary composite toolpath over the same three intervals may be assembled to direct the nozzle extruding trace 532, resulting in the path shown in FIG. 5C. The G-code instructions for controlling the nozzles will reflect this sequence of discrete commands to implement the type of pattern shown in FIG. 5C in accordance with the present teachings. In some circumstances, either or both of traces 530, 532 could be printed in the opposite direction (with reversed sequence of segment commands) and achieve equivalent end results and effectiveness.

It should be evident from the depictions in FIGS. 3 and 5 that the toolpaths direct the nozzles or move very directly from their above described positions over a first interval, then a second interval and third interval with little to no extraneous motion and without diverting substantially (such as to perform interior fills or switching extrude nozzles in between intervals) from the vicinity of the object surface there the three intervals are implemented. The nozzles move in a continuous, though serpentine, pattern and, at any given point, adhere to specific ones of the conceptual candidate toolpaths or are involved in direct transitions therebetween. Aside from efficient continuous flow and the resulting desirable surface quality, one consequence of this controlled degree of excursion is that the cumulative distance travelled along the respective composite toolpaths are very nearly equal to one another as the outer layers are formed over the multiple extrusion surface region. In forming the multiple extrusion surface region of an object, the consumption of extruded materials tends to be essentially equal between the two or more extruders regardless of the pattern or image being rendered. Furthermore, the cumulative distance travelled over a set of contiguous intervals by any one of the nozzles, including transitions between lanes, will generally be well less than twice the cumulative arc length of the designed contour over the same set of intervals. In contrast, conventional slicing techniques faced with the same demand to intersperse multiple extrusion on a surface will try to treat locations where a color is to appear as separate constructions and may jump in an indeterminate order among them, without regard for the efficient continuity achievable by allowing contrasting traces to run alongside one another, to be transposed at some points and to cross over one another. Conventional techniques may also interrupt the rendering of outside appearance to attend to interior filling tasks. Both of these tendencies of conventional methods result in toolpaths that do not exhibit the attributes mentioned above.

FIG. 6 is a flowchart describing a process 600, in accordance with a preferred embodiment, for building a 3D object with a dual extrusion 3D printer. More particularly, process 600 provides for controlling dual extruders in response to pattern data such that the outer surface of the object is formed in a specific pattern of interchanging traces between the two extruders. The multiple extruders may be configured to extrude different colors, different materials, different textures or compositions, etc.

Process 600 may be expressed or implemented in G-code and may be simulated or modeled in a master computer 140 beforehand for the purpose of generating G-code instructions that cause a 3D printer to execute the recited steps at build time. Where the steps described below refer to acts such as printing or switching extruders, this is equivalent to creating a series of G-code instructions that express those specific actions and appending them to a cumulative file of such G-code instructions. That is why the steps in process 600 read as if they were being executed by the 3D printer itself when in fact process 600 is more likely executed in master computer 140 in advance of the actual build.

Although pixel values in rasterized image data are shown by way of example, the determination as to whether some portion of the surface of an object is to be formed by either one or the other of the extruders may be determined algorithmically or in some manner other than working purely from a rasterized image. All that is needed is some way of making a distinct determination as to use one nozzle or another for any given point on the graphic area on a surface of a workpiece object where this technique is to be applied. The present teachings are not limited to patterns expressed as purely rasterized image data. As described herein, pattern data can encompass any way of calculating a binary value based on position in the workpiece, such as by modulo operations or other mathematical functions applied to the 3D coordinates of the given point or to related positional variables. Any other means may be used for arriving at a determination of whether one or the other nozzle should conform to the contour of the finished object at any given point on the surface.

Flowchart 600 commences in step 602 upon the beginning of at least a portion of the construction of an object upon which the present teachings may be used. It is acknowledged that there may be many other well-known preparatory steps implied by step 602, such as warming the build plate or the heating blocks to temperature and otherwise getting the machine ready for building the workpiece. There may also be portions of the workpiece below a point where the present teachings are applicable, such as the lower layers of a coffee cup below where a graphic feature is to appear on the side of the cup.

Following the commencement of this process in step 602 and completion of the above acknowledged peripheral activities or previous build layers, step 604 is undertaken to activate the first of the two extruders, if it does not happen to be already active in the course of the build. Step 604 involves driving extruder drive 104a to feed nozzle 110a and printing any other portions of the workpiece that are designed to be performed with this nozzle while the workpiece is at the current Z-axis elevation or build layer.

This preparatory printing could include, for example, any deeper walls of extrusion traces behind the two outer traces, such as trace layers 511,513 shown in FIG. 5A. Trace 304 in FIG. 3A is another good example of a trace that is printed at the same elevation or build layer and before traces 306, 316 are then printed to define the outside of the object. It is not imperative that innermost traces like trace 304 precede formation of the outer traces 306 and 316 but it is generally advantageous for minimizing the number of extruder switchovers in the course of a build.

With properly designed sequencing of instructions (as a variation on process 600) it may be possible to act in an efficient alternating fashion as follows. A first extruder nozzle performs all of its non-contour-following structural builds for a given first layer and then lays down an outer trace such as trace 306 for that same build layer. After this, the printer may switch to a second extruder so that it deposits all of its traces necessary for that same first layer, including laying down a complementary outer trace analogous to trace 316. The workpiece elevation is then incremented to a second build layer. At that second layer, the still-active second extruder performs all requisite printing, including its outer trace 316 for that second layer. While remaining at the second build layer, the printer then switches back to the first nozzle, prints the remainder of the layer, and then the Z-axis elevation is again changed to reach a third build layer. The first nozzle continues to print all that is required of it for the third layer, including an outer trace 316, and the above process repeats. By coordinating in this manner, the 3D printer need only switch extruders once per build layer, even though each layer comprises traces from both extruders. In other words, the extruder switching occurs once per elevation change, rather than twice.

Returning to FIG. 6, step 604 involves the first extruder becoming active and performing all the extrusion steps it needs to for that given layer of the build other than the surface-related outer trace instructions that will follow in accordance with the present teachings. After completing step 604, execution moves to step 608 addressing the necessary correlation of an interval on the printed surface of the object with the position of a pixel in graphic pattern data. This relates to the concepts that were described in conjunction with FIGS. 5A through 5C, namely that of extracting a portion of raster pattern data into an pattern data subset 508 and establishing which pixel in the pattern data subset 508 corresponds to what portion of the surface of the object.

In practice, this mapping is the responsibility of the designer of the object being printed. For example, a designer must decide where a graphic feature is to be rendered on the surface of an object being built, such as a coffee cup. In such an example, there would necessarily be an aspect of the design that determines how many layers are printed before reaching the start of the graphic feature, how large the graphic feature should appear and where the graphic feature is aligned radially around the surface of the cup, such as at a particular angular displacement from where the handle might be. This is entirely up to a designer or a programmer to establish. Whether by using interactive design tools or by writing software, it is necessary, when printing a graphic at a specific position on an object, for there to be some established correspondence between a pixel in the pattern data and what portion of an object's final surface will be affected by the value of the pixel at that location in the pattern data.

Step 608 may correspond to simply a 'look up' of data by, for example, subdividing the outer surface of the desired finished object contour into equal linear or angular measures, and simply counting those to index into the raster pattern data. As a simple example, suppose that the raster pattern data is to wrap completely around a cylindrical object such as a coffee cup. In this case, the pattern data accounts for the surface appearance across the entire circumference of the object. If the raster pattern data is 360 pixels wide, then each pixel would represent one degree of angular measure along the outside of the cylindrical object. In software then, a loop may be coded that increases an angle variable in one degree increments while also incrementing a column number by which to look up a pixel value in the raster image. At each increment, the motor movements will be directed to travel one degree further along the arc of the workpiece contour and at the same time a corresponding pixel in a row of the raster image will be selected as the determining value as to whether a given extruder needs to travel the outer lane 520 or the inner lane 522 while passing along that arc.

Once the appropriate pixel defining a printed surface of the object is identified in step 608, the specific value of that pixel in the raster image is assessed in step 610. If, in step 610, it is determined that the pixel value corresponds to having the first extruder's output present at the surface of the object, then step 614 is undertaken to position the first extrusion trace at the surface of the object over that interval. This corresponds to what was described in FIG. 5B, where it was determined that pixel value at 509b indicated that trace 530 was to form the surface of the object and conform to the surface contour 501 over portion 515b. So, in step 614 of process 600, the first extrusion trace is printed at the surface of the object over the interval that was referred to in step 608. Alternatively, if, in step 610, it is determined that the second extruder is to form the outer surface of the object along that portion, then the first extrusion trace that is currently being printed is printed parallel to the object surface but displaced 'inward' by one trace width. This corresponds to the passage of trace 530 in FIG. 5B, where trace 530 aligns with lane 522 for a distance in response to image pixel data 509a indicating an "FF" value. Trace 530 remains submerged over the portion of the surface 515a.

Regardless of whether step 612 or 614 has been performed, execution then moves to step 616 to determine whether all the pixels from the row of raster pattern data have been read for that given layer of the build. In practice, this step may not necessarily take the form of an 'if-then' statement. In software, it may also be effectively executed by a 'for-next' loop or 'do-while' loop as is well-known. If, in step 616, it is determined that all pixels for the currently printing layer and involving the first extruder have not yet been printed, then execution moves to step 618 to examine the next interval that needs to be printed, to look up the corresponding pixel position in the graphic pattern data and to extract the value of that pixel data to again determine whether step 612 or 614 are to be executed over that portion of the extrusion process. Referring to the earlier example of angular intervals along a cylindrical object, this would correspond to incrementing to the next one degree interval and also incrementing to the next adjacent column in the graphic pattern data to extract its pixel value.

Steps 608 through 618 are executed until the first extruder has performed all of the outer-surface-defining printing that is called for in accordance with the present technique.

When, in step 616, it is determined that all of the first extruder's graphic feature pixels have been rendered for this layer, then a switch to activate the second extruder is performed in step 620. This may involve inactivating the first extruder, such as by retracting the filament or performing other steps depending on the model of the unit. It is conceivable that some models of fuse filament printers might employ a mechanism of parking print nozzles that are not in use such that they do not move in tandem. If that is the case, in step 620 corresponds to docking the first extruder nozzle and moving to engage the second extruder nozzle and bring it in contact with the workpiece. Step 620 also involves performing any other printing required from the second extruder for that build layer prior to performing the outer-contour-defining portion of the print in accordance with the present teachings. After these other steps are performed in step 620, then execution moves to step 622 to correlate the interval on the surface of the object with the position of the pixel in the graphic pattern data. This takes place as was described for step 608 above.

Once this correlation has been made, then execution proceeds to step 624 to determine whether the value of the corresponding pixel indicates whether the second extruder or the first extruder is to conform to the contour of the finished object along that portion of the surface of the workpiece. If it is determined that the presently printing extruder, namely the second extruder, is to form the outer surface of the workpiece, then execution proceeds to set 628 and the second extrusion trace is printed as the surface of the object over the given interval. This is analogous to the manner which trace 532 in FIG. 5C initially conforms to lane 520 and forms the outer portion of the object by conforming to outline 501 over the interval 515a. Alternatively, if, in step 624, it is determined that the pixel value from the graphic pattern data corresponds to using the first extruder over that interval that is being printed, then execution proceeds to step 626 wherein the currently printing second extrusion trace is printed parallel to the object surface but displaced away from the surface by one trace width. This corresponds to having trace 532 in FIG. 5C move in alignment with lane 522 over the intervals 515b, 515c responsive to the pattern data indicating "00".

Regardless of whether step 626 or step 628 has been performed, the process continues on to step 630 wherein, analogously to step 616, it is determined whether all the pixels have been read for the current layer. If not, then execution proceeds to step 632 (analogous to step 618) to move further along the surface of the object, to determine a corresponding pixel in the graphic pattern data, and to process the path of the second extruder accordingly by the action of steps 624 and either 626 or 628. In other words, steps 622 through 632 are iterated until all the pixels in the graphic pattern data have been processed by the second extruder. In step 634, a determination is made as to whether all of the layers of the object in the workpiece have been printed (or at least all the layers that employ graphic feature rendering in accordance the present teachings.) If not, then execution proceeds to step 636 to adjust the height of the workpiece, such as by causing Z-axis motor 112*c* to turn lead screw 114*c* and cause build plate 120 to move one increment further away from nozzles 110*a* and 110*b*. Then the majority of process 600 is again executed so that both the first and second extruders perform their desired actions for the next layer of the build. If, in step 634, it is determined that all layers have been printed, then the printing process (or at least the graphic feature portion) concludes in step 640. At this point, the graphic-depicting layers in accordance with the present teachings have been incorporated in the workpiece.

Figure 7:
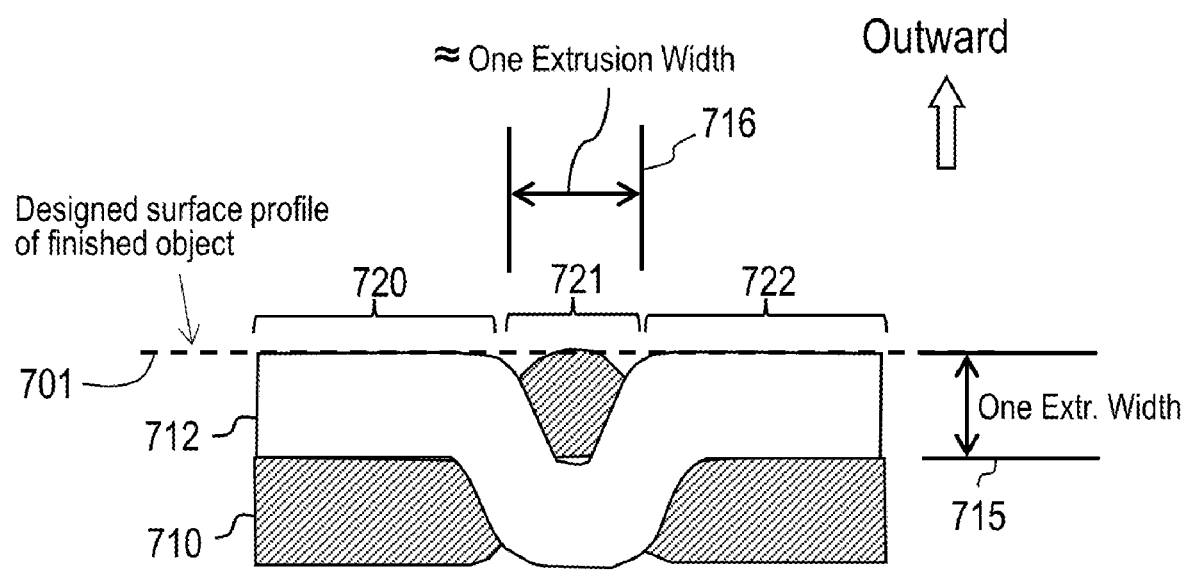
FIG. 7 depicts the manner in which two extruded traces may be transposed for a short distance to render a fine resolution feature on the surface of a printed object in accordance with an exemplary embodiment of the present teachings.

FIG. 7 depicts the point of crossover between two traces in a simplified fashion, but is comparable to FIG. 5C. Even though underlying walls in the same build layer are excluded from this drawing for simplicity, FIG. 7 serves to illustrate the degree of fine detail achievable using the present teachings for depicting graphics letters and numbers on the surface of a 3D printed object. The designed outer contour 701 of an object is shown as a dotted line. The nominal width 715 of an extrusion trace is identified, which is typically about 0.60 mm when a nozzle of 0.5 mm diameter is used but also depends on extrusion rates, build layer height and other factors.

In FIG. 7A, first trace 712 is observed to follow the outer contour 701 over a first interval 720, to be printed slightly away from the outer contour of the object over second interval 721, and then again meet the outer contour 701 over a third interval 722. In exactly complementary fashion, a second trace 710 is observed to be submerged behind trace 712 over interval 720, to surface over interval 721, and to again re-submerge along interval 722. FIG. 7 mainly shows, that even using fairly conservative angles at which the traces crossover one another, it is possible for the apparent width 716 of trace 710, as it would be seen over interval 721, is on the order of the same as the width 715 of an extrusion trace. In practice, where the width of an extrusion is on the order of 0.6 mm, this means that graphic images on the surface of the 3D printed object using a typical nozzle diameter of 0.5 mm can yield graphic detail (or spatial frequency) on the order of 40-50 dots-per-inch horizontally. In the vertical axis, given a nominal layer thickness for each layer of the build of 0.2 mm, the effective resolution is about 125 dots-per-inch (dpi) in the vertical direction.

It should be kept in mind that FIG. 7 shows an approximate practical minimum over which extrusion trace 710 might submerge, assuming that the two traces fully swap positions. An even smaller presentation of trace 710 may be possible if it does not fully surface, but the spatial frequency with which traces 710 and 712 could be rapidly alternated would still be limited to roughly that shown in FIG. 7. Nonetheless, the present technique is not precluded from enabling the exact positioning of interval 721 to vary more finely, such as to enable a finer degree of positioning of a point at which either trace surfaces or submerges. The fine positioning of such transitions may be comparable to the vertical resolution of 125 dots-per-inch. Thus, relatively fine details can still be rendered using the present teachings even though the minimum line thickness in the horizontal axis may be limited.

As one example, a solid colored circle may be depicted graphically on the surface of the workpiece and the edges of the circle may be very smooth and precisely placed, rather than jagged, effectively with at least the same finesse that would be achievable with a symmetrical 125 dpi resolution. If the circle needed to be drawn as an outline only, the minimum line thickness for the outline would be around 0.6 mm, but its contour could still be rendered quite smoothly.

In accordance with an exemplary embodiment of the present teachings, a method for creating the G-code based on input from graphic pattern data is to read the graphic pattern data, or calculate the graphic pattern data algorithmically, in a software executable such as an application written in 'C' source language and executing on the master computer 140, such as a PC. The executable may directly generate G-code that, in turn, specifies the motor control commands for creating finished objects. This approach makes it fairly simple to incorporate text or graphics into the surface of an object especially where the remainder of the object is also being produced directly in this manner rather than through the typical process of using a 3-D modeling application and a slicer application.

Nonetheless, it is contemplated that existing modeling and slicing software tools could be modified to allow an end-user to project or superimpose any desired bitmap or raster, including text that could be freely typed in from the application's interface, onto the surface of an object that is being designed. In accordance with the present teachings, it may be unnecessary to form or manipulate text or graphic objects in a 3D modeling environment in the course of defining and building an object with multi-extrusion surface features. Furthermore, in accordance with the present teachings, it may be unnecessary to depict text or graphic objects in a tessellated description of the surface of an object in the course of defining and building an object having multi-extrusion surface features. Some forms of object surface description are known which include surface color or texture, including Virtual Reality Markup Language (VRML) and so-called PLY, 3DS and ZPR file formats. A software tool may be adapted to extract the surface appearance information from such descriptions and generate toolpath commands that cause multiple extruders to vary the surface appearance of a constructed object as described herein. In other words, a toolpath computer, such as computer 140, may receive as input a design description of an object's shape and separately receive or apply pattern data to the designed object without reverting to the tool or modeling environment that created the design description. This practice may be referred to as a 'late binding' of surface features to otherwise already complete design descriptions, offering a user the ability to freely change surface graphics or textures as superimposed on an existing design. The toolpath computer will generate G-code commands implementing the overall shape of the designed object while injecting the necessary toolpath nuances to render the pattern on the surface of the object. In contrast to conventional approaches, the present teachings allow for the overall design of the shape of an object to originate from a different source than a patterned texture or graphic feature to be applied to the surface of the object. For example, a user may download from a website the general shape of a tea pot in the form of an STL or SCAD file and then select a decorative pattern from a different site (or create their own) and have the toolpath computer generate an altered sequence of motion control commands that reflect the influence of both inputs.

Figure 8:
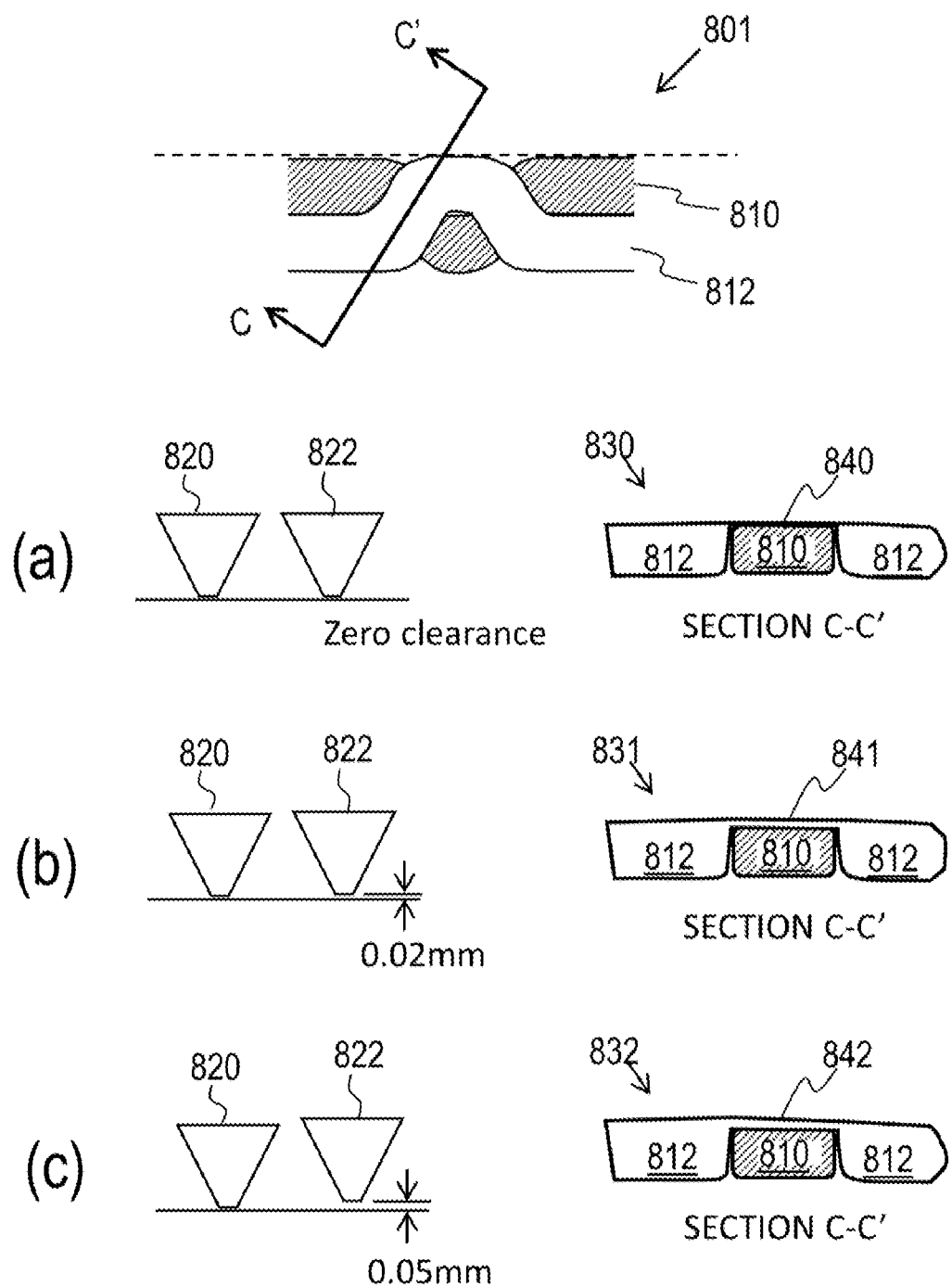
FIG. 8 depicts a manner in which relative nozzle heights in a dual-extrusion printer can affect the shape of one extruded trace that is deposited to overlap another extrusion trace.

FIG. 8 shows a pair of traces 810 and 812 crossing over one another in accordance with the present teachings and in a similar fashion as was depicted in FIG. 7. The portion of the traces 801 is shown to be cross-section along line indicated as C-C' and then image obtained from the cross-section C-C' is depicted in a variety of slightly differing circumstances. Each of the instances (a)-(c) shown in FIG. 8 is intended to demonstrate the effect of having the extruder nozzles for the respective extruders for traces 810 and 812 at slightly different elevations in the Z-axis direction. In scenario (a) it is shown that the discharge tips of nozzle 820 and nozzle 822 as viewed from the side are at substantially the same elevation relative to the plane of a build plate or workpiece. When two traces are interleaved in accordance with the present teachings, the effect is similar to what is shown in cross-section 830. In cross-section 830, the cross-hatch section corresponds to trace 810 that has been deposited before trace 812. The two white lobes on either side of this section are the trace 812 formed by the subsequent passage of nozzle 822. In section 830, it can be seen that there is essentially no clearance below the nozzle 822 as it passes over trace 810 and so the trace 812 thickness as indicated at portion 840 is essentially zero, so that trace 812 may be pinched off by pressure against trace 810, or a thin sheet or thread of extrudate may stretch over or displace into trace 810. Even if the rightward lobe of trace 812 as shown in sketch 830 becomes pinched off from the leftward side, this extrude material will nevertheless be held in place by bonding to the surrounding structures above, below and behind it in the final constructed object.

In scenario (b), nozzle 822 is slightly higher in the Z-direction than the tip of nozzle 820. As evident in picture 831, that portion 841 of trace 812 that corresponds to nozzle 822 crossing over tray existing trace 810 allows for some residual thickness of trace 812 to connect between the leftward and rightward lobes as shown in this view. This simply means that the outermost portion of trace 812 that conforms to the surface contour of the object remains connected to the remainder of trace 812 by a thin sheet of material. This may be beneficial to keeping the rightward lobe of trace 812 connected although, as noted before, there are other points of adhesion between this part of the trace and the remainder of the build.

Finally, in scenario (c) a larger offset between the nozzle tips of 820 and 822 are is observed, leading to an even larger margin by which nozzle 822 clears the existing trace 810 and allows for continuity of extruded trace 812 as it crosses over trace 810. FIG. 8 demonstrates one parameter that may be adjusted to achieve desired results in conjunction with the present teachings. The condition depicted in sketch 832 may actually be beneficial in conjunction with the teachings of FIG. 9.

In FIG. 9 a variation is taught wherein a first trace 910 and a second trace 912 or made to cross over one another and to define the outer surface of an object. However trace 910 is moved outward beyond the main surface contour of the object 901 so that, where trace 910 surfaces, it also forms a raised surface or depicts the graphic in relief. For example, trace 912 may be formed of a black extrusion material and trace 910 can be formed of a very light colored white or fluorescent color so that forming the traces as shown in FIG. 9 would result in light colored letters that stand out slightly from the surrounding surface. The extent to which they stand out is freely adjustable between the flush arrangements typified so far in the present teachings and a different situation where trace 910 may considerably step outward at the surface of the nominal contour of the object to depict a raise surface. (The protrusion in a given interval may be considered as an alternate surface contour that roughly parallels the object's nominal contour. This alternate contour may either be expressed as bumps in the designed surface contour evident in the design description of the object or may be superimposed in a 'late binding' application of a surface treatment to an existing object shape.) Where an extreme relief is desired in the graphic or text being depicted in this manner, due consideration must be given to the fact that the trace 910 may protrude far enough to not be supported by underlying previous traces and gravity may cause the trace 910 to sag. One solution to this is to ensure that, where such high degree of protrusion is warranted, that at least one underlying preparatory trace be in place to prop subsequent traces. For example, in the vertical direction, it may be necessary for a highly protruding of trace as depicted in FIG. 9 to be supported by one or two prior traces that progressively ramp between a flush configuration and the full protrusion shown. If it is desired to have an even higher degree of protrusion, then a correspondingly longer ramp-up by lower layers may be necessary to achieve that.

Figure 10:
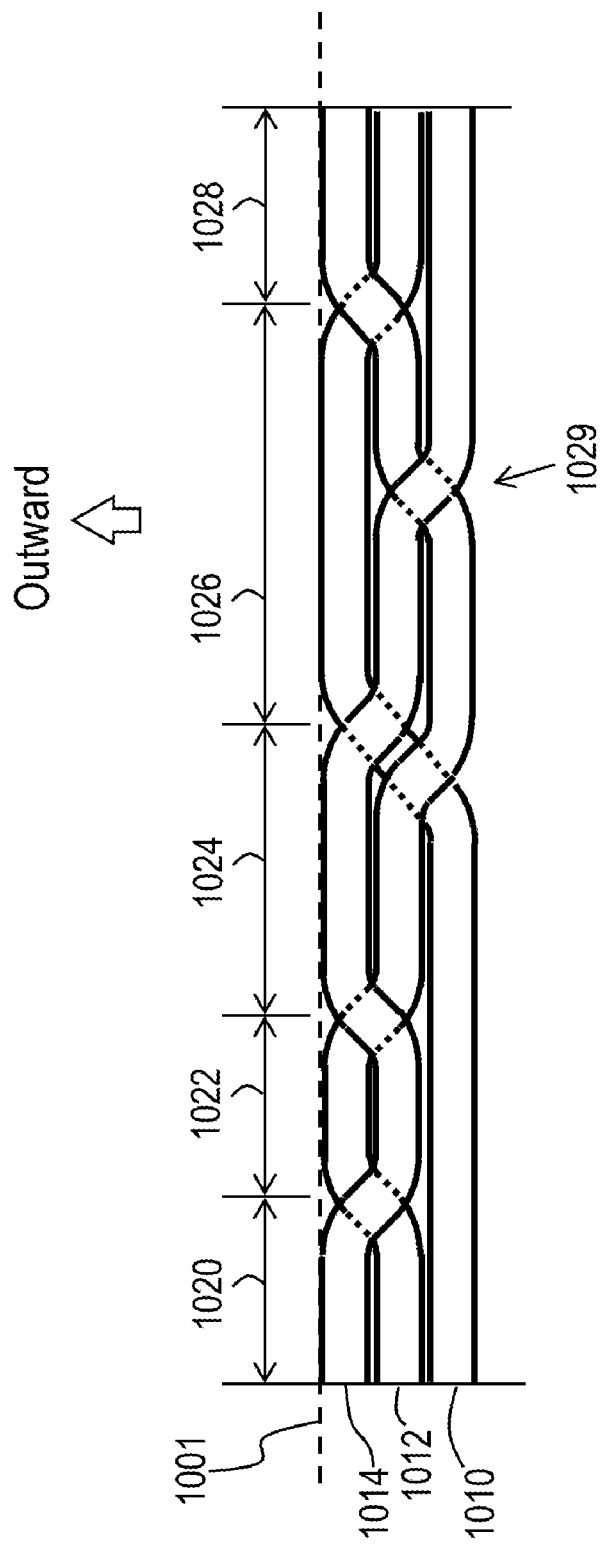
FIG. 10 depicts a variation of the present teachings in which more than two extrusion traces are manipulated to provide a greater variety of surface appearance features on a 3D printed object in accordance with an exemplary embodiment of the present teachings.

In FIG. 10, a technique is described for working with higher numbers of distinct extruded traces—whether differing in color, transparency or material texture—and extending the present teachings to interspersing more than two extrusion sources over a given portion of an object's surface. As with the previous figures, the top of the drawing is construed to be towards the outside of the object being printed. To form this build layer as part of a multiple extrusion surface region, three transposable traces 1010, 1012 and 1014 are, at various intervals, assigned among three candidate lanes or toolpaths. Starting at the far left of the diagram, trace 1010 is shown to be innermost and is separated from the outer surface of the object by traces 1012 and 1014. Over interval 1020, the appearance of trace 1014 will determine the appearance of the outside of the object. In passing from interval 1020 to 1022, the toolpaths for the nozzles that deposit trace 1014 and 1012 are transposed such that, over the interval 1022, trace 1012 is at the surface while trace 1014 submerges behind trace 1012. In passing to interval 1024, these two traces again reverse, bringing trace 1014 back to the fore. In transitioning to interval 1026 along the surface of the object, another variation is undertaken wherein both traces 1014 and 1012 are shifted inward and trace 1010 is transitioned to the outermost lane so that it surfaces. In progressing left to right across FIG. 10 through portion 1024, the transitioning to move trace 1010 outward begins with trace 1010 crossing over trace 1012 well in advance of the juncture between 1024 and 1026. This is done to preserve roughly a 45° angle as any trace approaches the point at which it must surface. This recommended angle ensures that, when some nozzles pass over existing traces with little to no clearance, they do so for such a brief duration that the traces continue in pretty much a normal fashion without any pressure build up or excess or insufficient discharge at some points. In practice, after all nozzles have traversed an area that has been printed according to the current teachings (and despite frequent crossover points), the finished surface is essentially as smooth and level as if only a single extruder had been used to solidly fill the area in the conventional manner.

Continuing on from left to right along FIG. 10, trace 1010 determines the appearance of the final printed object over interval 1026 until, at the transition to portion 1028, traces 1010 and 1012 are transposed, meaning trace 1012 comes to the surface and trace 1010 assumes a position in the middle lane. It is not necessary for trace 1010 to return to the innermost position and, in fact, it may be advantageous for trace 1010 to stay in the middle position if, for example, the very next interval causes trace 1010 to again surface. Another interesting facet or point along FIG. 10 is at juncture 1029. At this position, in anticipation of having to surface trace 1012 at interval 1028 trace, 1012 is transposed with trace 1014 well before the outwardly apparent transition between portions 1026 and 1028. The software preparing G-code to implement the superficial layers of a multiple extrusion surface region may take into account the pixel values that corresponding to intervals one or more steps ahead of the currently processed interval.

A greater number of traces, perhaps exhibiting different colors or other characteristics, could be interlaced in this fashion to present readily changing colors on the surface of the 3D printed object at relatively high spatial frequency and with minimal extruder switching at each layer. Yet another variation in the context of FIG. 10 involves utilizing somewhat translucent materials to extrude. Using one or two somewhat translucent traces and varying the depth by which more opaque traces are buried underneath his translucent traces might lead to for example the ability to depict grayscale or other color variations with finer gradation than just the colors presented by the three or more separate extruded materials. For example, if trace 101 is somewhat translucent and traces 1021 and 1014 are of different colors or different translucency, then the transition that occurs at point 1029 might actually be desirably visible as a subtle variation in color within interval 1026.

Figure 11:
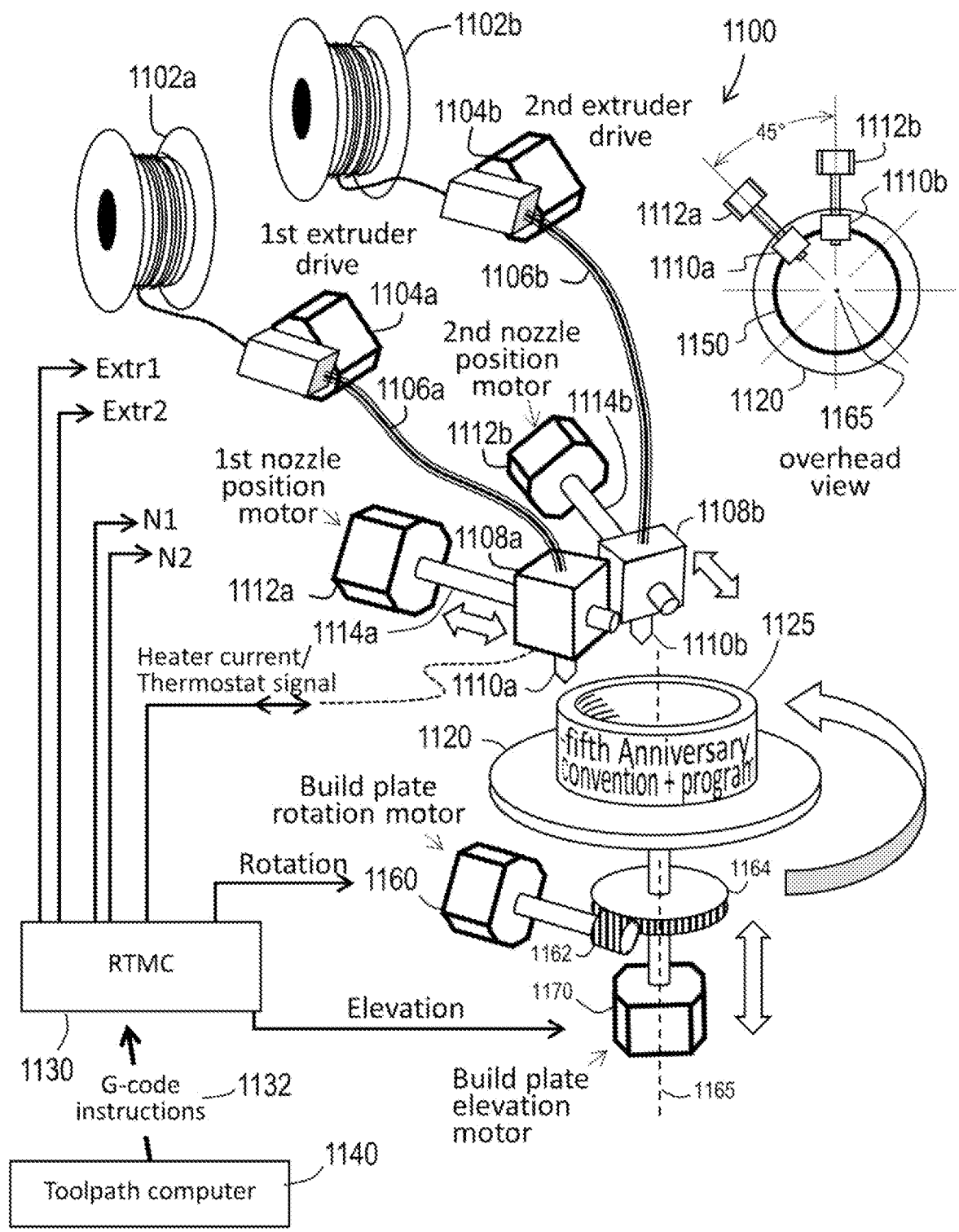
FIG. 11 is a diagram of an alternative motor-driven 3D printing system which applies a rotary motion between a build plate and its extruding nozzles.

FIG. 11 depicts an alternative embodiment in the form of additive manufacturing system 1100, in which many of the components are analogous to those shown and described in connection with FIG. 1. However, in contrast to system 100 described earlier, system 1100 is configured to apply a controlled rotational motion to the build plate and to move the other components, such as extrusion nozzles, in coordination with the rotation to construct objects, especially round or cylindrical objects.

Another characteristic of system 1100 is the decoupling of the motion of two or more extrusion nozzles. In system 100 described earlier, the two extruders were described as moving in concert at all times and remaining in a fixed orientation with respect to one another. Even though the three orthogonal axes of motion provided by earlier system 100 can, with the proper instructions, achieve circular motion of the nozzles over the build plate, the arrangement of system 1100 offers certain advantages in printing speed and simplicity for objects that are roughly cylindrical, exhibit radial symmetry or are otherwise easily described in polar, cylindrical or spherical coordinates. Examples of such objects include bracelets, napkin rings, collars, gears, bushings, bearings, wheels, jar lids, vases, etc. With certain classes of objects upon which surface features are desired to be formed from two or more extruded traces in accordance with the present teachings, especially cylindrical, toroidal or conical objects, or more complex surfaces of rotation (for example, a vase or urn), the system 1100 may allow for multiple extruders to deposit material onto a rotating workpiece simultaneously, albeit at different locations on the workpiece at any given time. This attribute can reduce or eliminate the need for any extruder switching and the various related measures that must normally be exercised to prevent dribbling from an idle extruder from spoiling a workpiece. In addition to improved speed and 'clean' formation of a workpiece, system 1100 enables some workpieces to be constructed spirally, that is, by gradually incrementing the Z-axis elevation of the nozzles over the course of a rotation of the build plate rather than abruptly incrementing the elevation at a particular angle in the rotation. Thus, for many objects fabricated in a dual extruder system constructed as in FIG. 11, both extruders may continuously extrude material at a constant rate throughout the build and generate an object having complex graphic surface features of the type described herein.

In particular, it is advantageous to dispose multiple, independently-controlled extruder nozzles around the center of rotation of the build plate and to arrange the linear axis of motion for each nozzle to align with the rotational axis. (See inset labeled 'overhead view'.) In this manner, if a toolpath for an object is readily describable in terms of a distance 'IR' from center of the build plate as a function of angle of rotation 'theta' of the build plate, the action of the motor rotating the build plate can be mapped to angle 'theta' and the motor controlling the nozzle can simply move in response to the value 'IR' at the given angle. As the rotating workpiece passes under the respective nozzles each nozzle may independently move to a position where the specific extruded trace from that nozzle needs to be applied.

Referring to FIGS. 5A-5C, if a cylindrical object is being fabricated, the rotary motion of the build plate will cause the workpiece to pass under an extrusion nozzle and, for as long as the nozzle is set at a fixed distance from the center of rotation of the build plate, an extruded trace from the nozzle will naturally be formed in a circular fashion on the build plate or workpiece. If the designed surface contour of the object to be built is circular, of a particular radius 'r' and centered around a center axis of the designed object, then positioning a nozzle at a fixed distance from the center of the rotation of the build plate—the distance being equal to the radius 'r' minus one half the nominal width of an extruded trace—then the outer side of the extruded trace will closely conform to the designed outer surface of the object. This condition is analogous to aligning the nozzle with lane 520 in FIG. 5A. Moving the nozzle further inward toward the center of build plate rotation by the width of an extrusion trace would correspond to aligning the nozzle with lane 522 in FIG. 5A. Providing a motor 1112a to move the nozzle inward or outward as the workpiece is rotated by the build plate accomplishes a shifting between of the toolpath as different portions of the workpiece pass under the nozzle. The shifting of the nozzle can be controlled based upon an pattern data value corresponding to a specific position on the object surface which, in turn, corresponds to a particular angular position of the build plate. With appropriate coordination of the nozzle position with build plate rotation, a trace may be deposited resembling trace 530 in FIG. 5B.

To accomplish the placement of a complementary trace such as trace 532 as shown in FIG. 5C, another nozzle placed at a different azimuth relative to the first nozzle can be similarly controlled to move inward and outward responsive to the pattern data as the build plate is rotated, but in an opposite 'outward-inward' sense compared to the first nozzle and as delayed by the angular offset between the two nozzles. As an example, assume two nozzles are spaced at 45 degrees around the build plate. A first nozzle has, at a given point on the workpiece, deposited a trace that is conforming to the object contour for one degree of build plate rotation and then moves inward by about one trace width over the next degree of build plate rotation. A short time later, after the build plate has rotated 45 degrees and the same given point on the workpiece comes under the second nozzle, the second nozzle will be moved inward for one degree of build rotation and then move outward during the next degree, responsive to the same pattern data that earlier compelled the first nozzle to move outward and then inward. Over a series of intervals and after both nozzles have acted upon a given point along the workpiece, the resulting two outer traces will resemble FIG. 5C. The two nozzles may also be controlled to form other wall layers (FIG. 5A—511-513) during additional revolutions of the build plate, either before or after depositing the outer traces 530,532. In other machine designs, additional nozzles with separate drives may also be added so that other wall layers (511,513) may be formed in a single pass. Additional nozzles may be added for further variety in an object's outer surface, such as by employing the approach shown in FIG. 10.

In FIG. 11, material for making items is provided in the form of a filament wound on spools 1102a and 1102b, although it will be appreciated that other materials which are not provided as filaments may also be extruded through suitably designed nozzles and deposited in a pattern. The presently explained techniques of using continuous, transposed extrusions to achieve fine details on a surface are equally applicable to, for example, heated viscous solutions or syrups. Other alternative materials that may not as solid filament include slurries, powders, foodstuffs, biological materials, fast curing adhesives, sintered metals, etc. These may be dispensed from reservoirs and discharged or driven forward in a controlled fashion through valves, pistons, rotating augers or pneumatic or hydraulic pressurization.

In the case of filamentous raw materials, such as plastics, filament from spool 1102a is fed into a first motor-driven extruder 1104a. Likewise, in a dual extruder system, filament from spool 1102b is fed into a second motor-driven extruder 1104b. Under control of a motion control computer, such as real-time motion controller 1130, extruders 1104a and 1104b push the filaments through flexible tubes 1106a and 1106b, respectively. Each filament is forcefully fed into its respective heater block 1108a and 1108b. Each of the heater blocks comprises a heating element and a temperature sensing element, such as a thermocouple. As connected to real-time motion controller 130 or a separate temperature controller, heating block temperature may be controlled by sensing actual heating block temperature and sending controlled electrical current through the heating elements to achieve a desired temperature. When driven by force on the filament entering from the top, heater block 1106a discharges material from the bottom at the tip of nozzle 1110a. Likewise, heater block 1106b can extrude material from the tip of nozzle 1110b.

The position of nozzle 1110a relative to the build plate center of rotation 1165 is adjusted by first nozzle position motor 1112a responsive to control signal 'N1' from real-time motion controller 1130. First nozzle position motor 1112a acts upon leadscrew 1114a to cause block 1108a to be driven inward or outward relative to the build plate center of rotation. First nozzle position motor 1112a may be coupled to block 1108a via belts, pulleys, gears, linkages or other means, resulting in substantially inward and outward motion. First nozzle position motor 1112a may be a rotary stepping motor, DC servo, phase resolver or may be a linear motor or galvanometer. Similarly, second nozzle position motor 1112b may move block 1108b inward and outward relative to the build plate center of rotation and is subject to the same description for motor 1112a above.

Build plate elevation motor 1170 may be control the elevation (or Z-axis clearance) of the build plate relative to the nozzles. Although FIG. 1100 is highly simplified for clarity, motor 1170 may act upon several lead screws or pulleys to elevate an entire build plate platform while keeping it leveled. The build plate platform could include build plate 1120, rotary shaft bearings for the build plate (not shown), worm gear assembly (comprising worm 1162 and worm wheel 1164) and build plate rotation motor 1160. Alternatively, a common shaft 1172 may be coupled to elevation motor 1170 through a thrust bearing and coupled to a stationary motor 1160 and worm 1162. Using well known techniques, shaft 1172 may be free to slide vertically through worm wheel 1164 yet be coupled (by engaging a key or splines on the shaft) so that the worm wheel can apply torque to turn the build plate 1120 through shaft 1172. Shaft 1172 may be coupled through a thrust bearing to elevation motor 1160 which allows the motor to drive the shaft vertically but allow the shaft to freely rotate under control of the worm wheel. Although not explicitly shown, elevation motor may act through, or include, reduction gears, lead screws, pulleys, cams or the like to accomplish fine control of the vertical shaft position. Such elements are well known and a wide variety of designs would adequately fulfill this role. Thus, motor 1160 and motor 1170 independently control the rotation and elevation of the build plate, respectively.

A workpiece 1125, which is an object being constructed progressively by addition of materials from either or both of spools 102a, 102b, is shown on build plate 1120, though it should be understood that, just before a construction begins, the build plate will generally be blank until the extruders deposit the first layer of traces. In the arrangement shown in FIG. 11, a build will be initiated by driving build plate elevation (Z-axis) motor 1170 such that build plate 1120 is elevated to a point that nearly brings it in contact with nozzles 1110a and 1110b. To form the first layer of a workpiece, first and second nozzle position control motors 1112a,b will be set to initial distances from the center of build plate rotation and build plate rotation motor 1160 may begin rotating the build plate as either or both of the extruder droves 1104a,b actuate to drive material from the nozzles 1110a,b. As the build plate rotates, nozzles 1110a,b may be independently driven toward or away from the build plate center as necessary to deposit materials onto the workpiece in accordance with the designed shape of the object being built.

Build plate rotation need not be unidirectional or of constant rate. Indeed, shapes resembling flower petals, undulating patterns, Lissajous figures and circular saw blades may be readily achieved by careful control of rotation in coordination with the inward-outward positioning of one or more extruder nozzles. Furthermore, a hybrid type of machine may be constructed that uses build plate rotation as in system 1100 while preserving the Cartesian coordinate control of nozzle positions as set forth in system 100. Of course, a toolpath calculating computer would likely need to take into account which machine geometry the G-code instructions were intended for, be it system 100, system 1100 or a hybrid thereof. Most conventional machines receive instructions for moving in three orthogonal directions and accommodate for machine-specific parameters, but a rotary-based system may require earlier consideration in calculating toolpaths.

Once an initial layer of material has been deposited in this fashion, then Z-axis motor 112 C will generally be directed to turn lead screw 114 C slightly so that build plate 120 moves downward and further away from the plane in which nozzles 108a, 108b are moving. At this point, the apparatus is prepared to lay down a second layer of material upon the initial layer that is contacting build plate 120. The remainder of the workpiece is constructed by iteratively lowering the build plate using Z-axis motor 112c and then coordinating the motion of nozzles 110a,110 b to deposit extruded filament under the control of X-axis motor 112a, Y-axis motor 112 b, and either or both of extruder drives 104a and 104b. This process is repeated until all layers have been deposited and the workpiece is completed.

For clarity and simplicity, FIG. 1 is mainly a conceptual drawing and excludes many gantries, support structures or framework and other details such as pulleys, belts, wires, linear and rotary bearings, thrust bearings, etc. It should be understood that motors, leadscrews and other components, whether shown in the drawings or mentioned in the text, are mechanically coupled or rigidly attached to an overall foundation or common frame of the system 1100, even though, for clarity in the sketches, it is not explicitly shown and may vary in design and construction. Such frames are commonly made of rigid members made of aluminum, steel, acrylic panels, birch plywood and even plastics that have been 3D printed. By the presence of a unified frame, motors 1112a, 1112b, 1160, 1170 cause relative motion between the build plate (and therefore the workpiece) and either or both extrusion nozzles shown.

A first nozzle position motor 1112a acts to control axial displacement of nozzle 1110a relative to the build plate's center of rotation 1165. For example, motor 1112a may turn a leadscrew 114a which drives block 1108a inward toward the center of rotation 1165 or outward way from center of rotation 1165. Alternatively, motor 112a may act upon pulleys, belts, cams, gears or other well-known elements to effect fine control over the positioning of nozzle 1110a towards and away from the center of rotation of the build plate. In similar fashion, a second nozzle position motor 1112b may control the positioning of nozzle 1110b, coupled through elements such as leadscrew 1114b. For simplicity in the diagram, leadscrew threads are not shown but it is implied that motors 1112a, 1112b may contain thrust bearings or be coupled to a leadscrews assemblies that include thrust bearings coupled to a stationary frame of the overall machine that the motive force against block 1108a may bear against. Block 1108a,b may contain a complementary nut or threaded member that couples to the leadscrew threads. Furthermore, blocks 1108a,b may be coupled to linear bearings, lubricated slides, Peaucellier linkages or the like which allow for linear motion in the desired axis as driven by the leadscrew but which also prevent the block from turning in the same direction that the corresponding leadscrew turns. The real-time motion controller controls the first and second nozzle position motors by conducting motor drive signals through connections N1 and N2.

In FIG. 11, the description of the roles and attributes of real-time motion controller 1130, computer 1140 and the passage of G-code instructions 1132 therebetween is substantially the same as for the respective counterparts shown and described in FIG. 1. It is noted that, in system 1100, real-time controller 1130 controls one additional motor channel compared to FIG. 1. The different axes of motion made available in system 1100 versus system 100 are taken into account by the toolpath computer and its software in preparing discrete toolpath commands for the real-time controller. The accommodation of an additional axis (or even more axes) is well known and practiced in the field of multi-axis motion controllers.

Figure 12:
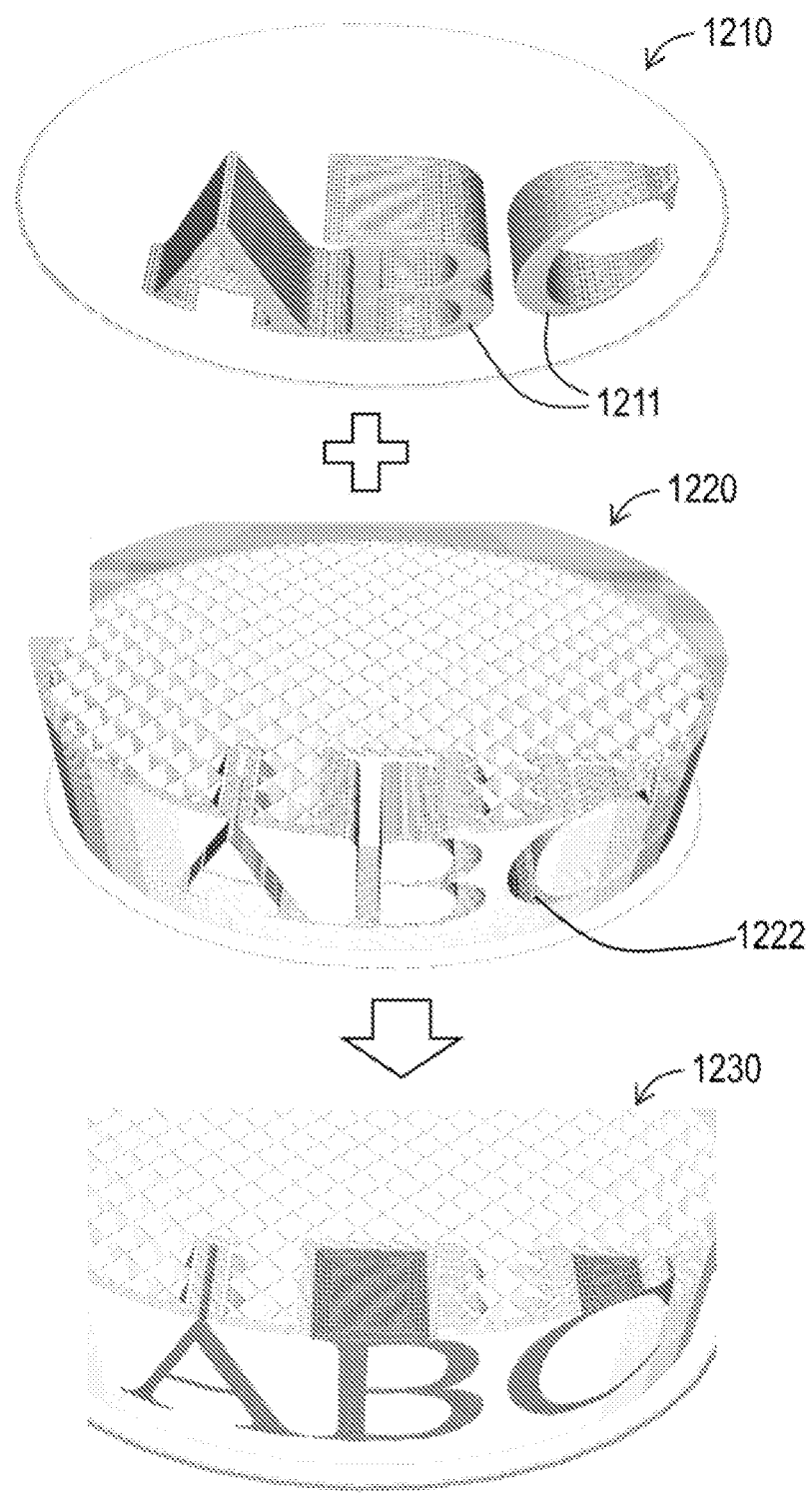
FIG. 12 is a pictorial depicting the merging of component models in accordance with conventional prior art practices.

To highlight advantages realized by various implementations of the present teachings, FIG. 12 depicts a prevalent prior art approach for modeling a 3D printed object to cause two-colored graphics to appear on the object's surface. In this scenario, a designer of an object simply wants to have the letters 'ABC' appear in a contrasting color on a cylindrical object that will be formed, for example, by polymer extrusion using two different colored feedstocks discharging from separate nozzles. In the conventional approach, a three-dimensional model 1210 of the letters 'ABC' must be defined in elongated 3D form and then, using constructive solid geometry (CSG) operations, the elongated form must be mathematically intersected with the cylindrical outer shape of the object to clip the letter shapes so that their front faces 1211 match the cylindrical contour.

To complement the space that letter model 1210 will occupy when printed by one nozzle, the cylindrical shape model 1220 must have also have letter model 1210 subtracted from its 3D shape by a differencing CSG operation. (Note the letter-shaped voids 1222.) These procedures create two separate models, 1210 and 1220, designed to occupy complementary portions of the build volume and to be printed by two different extruders to create the desired surface appearance.

In a conventional process, these two models must be separately loaded into a 'slicer' application in a computing environment and then be 'merged' to form a combined model 1230. The slicer's 'merge' feature will generate numerical G-code instructions directing the 3D printer to build the composite part by switching among the two nozzles and depositing materials from each nozzle at specific locations, effectively forming both the letter model 1210 (at full depth) and the cylindrical mode 1220 out of their respective materials and with an interlaced fit as shown in combined as-printed model 1230.

Figure 13:
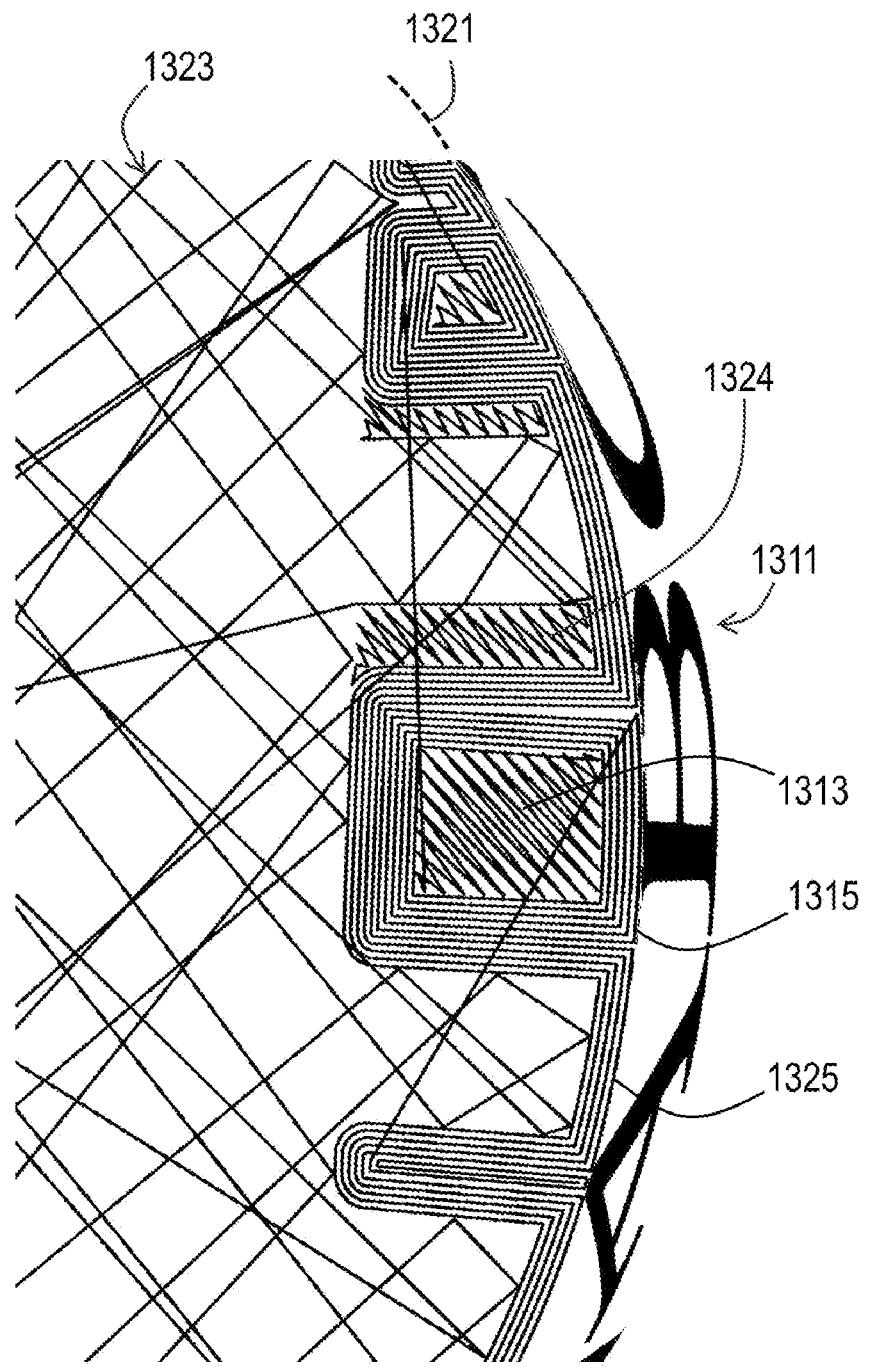
FIG. 13 is a high-angle close-up view of extruded traces resulting from merging models in accordance with conventional prior art practices.

This prior art approach is cumbersome and overly complex in several ways. Because each model 1210 and 1220 are, in a sense, treated as separate printed objects being modeled and sliced, the respective surfaces of these models will be formed of a set of one or more outer perimeters and separate interior fill patterns. To emphasize this aspect, FIG. 13 provides a close-up view showing extruded traces planned by a slicer when creating the merged output, model 1230 shown in FIG. 12. In FIG. 13, the 'ABC' surface graphic 1311 is shown along the curved outer contour 1321 of the cylindrical shape. The majority of the cylindrical shape is formed by perimeters 1325 and a sparse infill lines 1323. Note that perimeters 1325 divert inward at places to create inclusions that accommodate the shape of embedded letter model, such as letter model 1210. Separate extruded traces for forming the letters are shown as perimeters 1315 and infill lines 1313. The adjacency of cylinder perimeters 1325 and letter perimeters 1315 result in substantially dense deposits in some locations and yet lend very little to overall part strength. As another detriment, the treatment of the merged models as isolated printable units means that oblique surfaces, such as the mild slopes formed near the pinnacles of the 'B' and 'C' curved portions, causes the slicer to generate dithered toolpaths 1324 that needlessly consume time and material. Dithering is commonly performed when a nominal outer wall thickness needs to be maintained for very mildly sloped, nearly horizontal exterior surfaces for which simply stepping through fixed-height layers and fixed perimeter counts would result in open gaps or stair-stepped wall thickness.

Furthermore, if a designer wishes to change an aspect of the graphic feature on the surface of the cylindrical object, like switching to a lower case 'abc' graphic, the designer using this technique must return to the modeling environment and basically start over with forming a new model of the 'abc' graphic and repeat all of the CSG operations and in-slicer merging of the components listed above. This complexity hinders the agile replacement of surface graphics applied to an object, as is especially important in creating a series of identically shaped objects having unique graphic features on each, such as personalized or serialized items.

As another disadvantage of the conventional treatment of graphics as a separate embedded model as shown in FIG. 12, with some graphics that comprise small, isolated features, like an accent or punctuation mark, there is no assurance that the graphic part formed is fused with the surrounding material and it may eventually rattle loose and fall out of the cavity where it was formed. Aside from aesthetic concerns, the loose small part may be detrimental in the vicinity of small children, pets or moving mechanical parts in consumer goods.

Another significant disadvantage of treating the graphics elements as separate models is that when forming isolated elements (for example, note the space between each of the letters 'A', 'B' and 'C') a nozzle depositing the contrasting color to form these letters must jump between these separate 'islands' of deposits and will likely perform a momentary extruder retraction, Z-elevation, travel and extruder advance for each jump. As explained earlier, this abrupt starting and stopping of a nozzle many times per layer undermines quality and efficiency and is preferably avoided. Even if this jumping behavior can be suppressed in a given slicer application, then extraneous fine strings of build material may be formed between these islands and may be placed indiscriminately by a slicer, even visibly breaching the object's surface where concave shapes are present.

Figure 14:
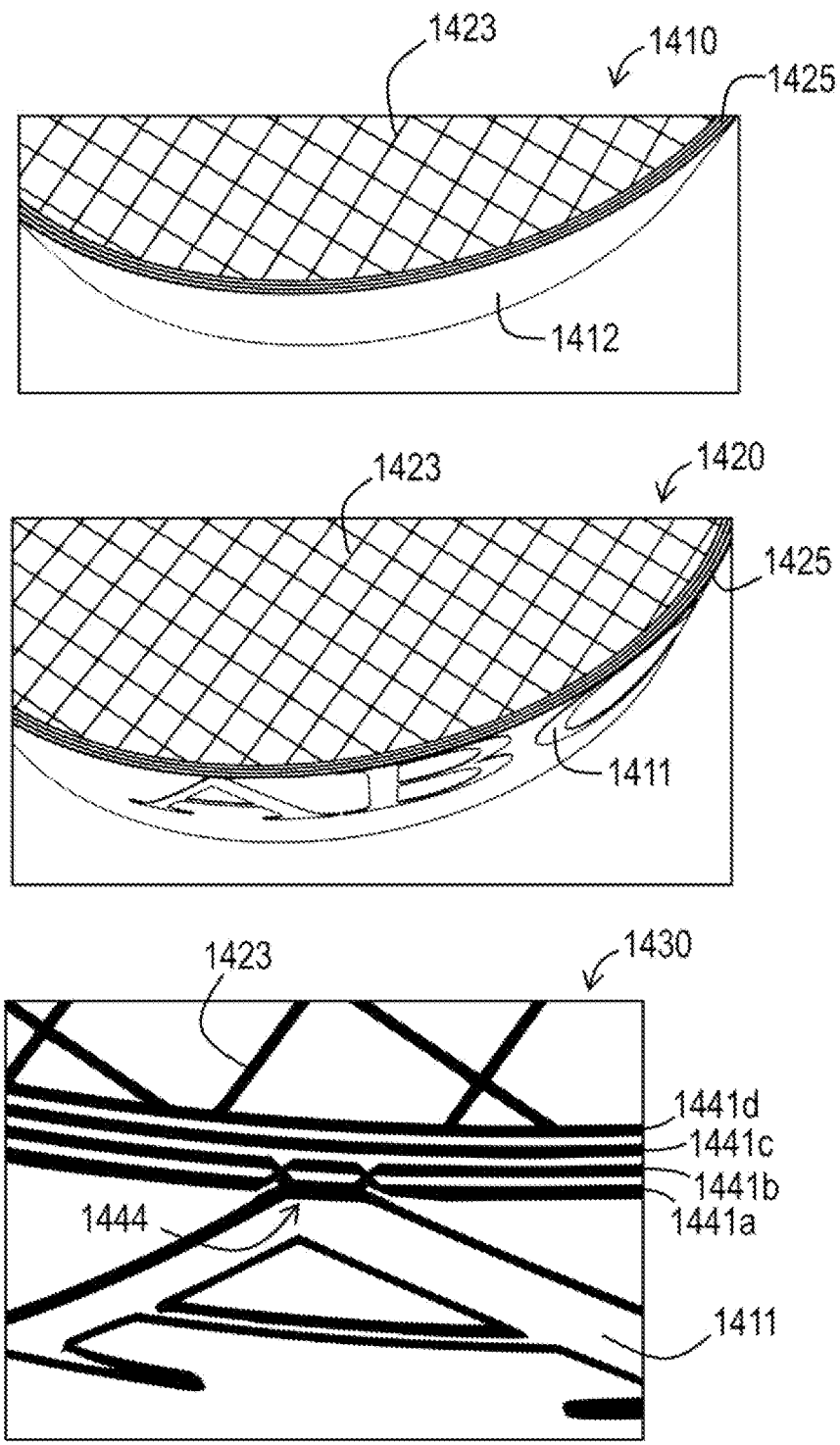
FIG. 14 is a high-angle close-up view of extruded traces wherein surface graphics are applied in accordance with an exemplary embodiment of the present teachings.

FIG. 14 pictorially represents the formation of a surface graphics feature in accordance with preferred embodiments of the present teachings. A first view 1410 shows the typical toolpath generated from a slicer application for a cylindrical shape, shown as comprising a set of outer perimeters 1425 and a sparse pattern of infill traces 1423. For visual reference, the outside-facing surface of the object formed by previously deposited layers is shown as object surface 1412.

Resembling view 1410, view 1420 shows the planned toolpaths of a cylindrical shape upon which a surface graphic feature 1411 has been applied. The toolpaths shown in view 1420 may well be derived from the same infill traces 1423 and perimeter traces 1425 shown in view 1410 and may have been modified or diverted slightly to implement the surface graphic 1411 by applying the present teachings.

In FIG. 14, view 1430 is a close-up view resembling view 1420 and showing how surface graphics 1411 can be implemented by transposing short portions of two adjacent toolpaths. In this example, an extruded trace 1441a may be deposited as the outermost trace forming the exterior of the object until an interval 1444 over which trace 1441a is diverted inwardly and a second trace 1441b may shift to the surface of the object. Trace 1441b may be discharged by a different nozzle than trace 1441a and may be of a material having a different color, appearance, surface texture or other property (such as exhibiting phosphorescence) so that the graphic feature contrasts with other surrounding parts of the object surface.

It is important to note that to change surface graphic 1411, the toolpaths 1425 could simply be again modified from what was shown in view 1410, just as they were modified in view 1420, without having to revisit the slicing procedure that created toolpaths 1423 and 1425 from a cylindrical shape model. The remaining perimeter traces 1441c, 1441d could be deposited by either of the same nozzles that produced traces 1441a and 1441d or by yet other deposition sources. The use of numerous perimeters is fairly common and may be primarily driven by requirements for part strength or opacity, but some surface graphics implementations set forth herein may also require multiple perimeters.

FIGS. 15A-D are diagrams of perimeter traces in controlled arrangements to produce surface effects beyond what was depicted in FIGS. 5A-5C.

Figure 15A:
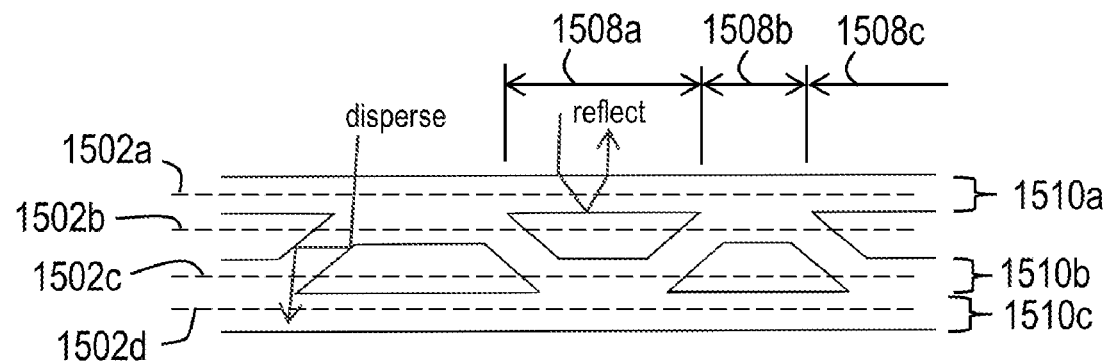
FIGS. 15A-15D are diagrams showing how perimeter extruded traces may be routed to create a variety of surface graphic effects in accordance with exemplary embodiments of the present teachings.

FIG. 15A shows one technique in which three extruded traces 1510a-c follow along four candidate toolpaths 1502a-d to create a special effect which shall be referred to herein as 'subsurface texturing' or simply 'subtexturing'. Let candidate toolpath 1502a represent a toolpath that conforms to the designed outer contour of the object being constructed. Any extruded trace deposited along this toolpath will form the outermost surface of the object. Although, for convenience, these candidate toolpaths are depicted as straight lines, it should be appreciated that these toolpaths will actually parallel the designed contour of an object being built and may, in some locations, be curved to form a convex or concave shape based on the object's outer shape.

In this subtexturing technique, an outer extruded trace 1510a is preferably made of a transparent or translucent material, such as a clear red tinted polylactic acid (PLA). Trace 1510a persists as an outer surface or window across a zone over which the effect is to be rendered. This presents a smooth, uninterrupted surface while a second, underlying trace 1510b moves between two positions that cause some locations underneath trace 1510a to appear lighter or darker, as may be modulated by image data analogous to how image data 508 affected surface appearance in FIG. 5C. Unlike FIG. 5C in which opaque traces could be transposed to render a surface graphic, FIG. 15A relies upon transparency of extruded traces and can produce an interesting effect when underlying trace 1510b is also made of a translucent material or is the same material being deposited by the same nozzle as trace 1510a.

Over a first interval 1508a across the surface, the second trace 1510b follows toolpath 1502c, leaving an unfilled region 1503 where toolpath 1502b is shown. In practice, trace 1502a is deposited from a round nozzle and is deposited in the shape of an elongated bead or strand having smooth, rounded sides. Due to its transparency and smooth rounded features, trace 1501a creates an optically reflective or lenticular effect, when deposited in a single thickness, and tends to reflect ambient light incident on the object.

However, over a second interval 1508b, second trace 1510b is shown to switch from following toolpath 1502c to following toolpath 1502b, which causes trace 1510b to meet and fuse with trace 1510a. (Alternatively, the deposit order could be reversed and trace 1510a would meet and fuse with previously deposited trace 1510b wherever the latter had shifted outward to toolpath 1502b. Unless specified, any of the prescribed trace configurations shown herein yield the same desired effects regardless of deposit sequence, leaving other practical factors to influence the deposit sequence.)

The fusion between trace 1510a and 1510b over interval 1508b changes trace 1510a from being an efficient internal light reflector to a light-absorbing tunnel. Light striking the surface of the object at a location where traces 1510a and underlying trace 1510b are fused together is partially deflected away from the surface and effectively absorbed, resulting in a relative dark area on the surface.

Using image data to modulate between areas where traces 1510a and 1510b are either fused together or separated by a gap, it is possible to create a pattern of lightness and darkness that appears just under the surface of the object even though, to the touch, the surface of the object is smooth and continuous.

Figure 15B:
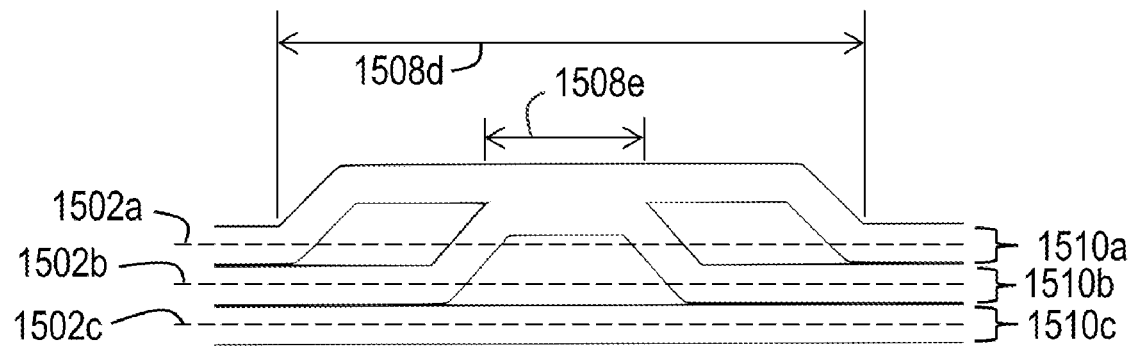

The structure shown in FIG. 15B operates on a similar principle for creating light-reflecting and light-absorbing areas as just explained, but adds a dimension of surface relief. In FIG. 15B, trace 1510a is formed to protrude outward from an object's designed surface contour over an interval 1508d, which can create, for example, a bubbled-looking outer surface. Image data may be interpreted as expressing locations where trace 1510a is to protrude outward or to conform to the object's designed contour. Aside from creating physical protrusion with trace 1510a, it is possible to also form visual detail within the protrusion using trace 1510b as shown. Where trace 1510b extends outward to meet with trace 1510a, the fusion of the two traces creates a relative dark spot or dark-edged region over interval 1508e. Image data may independently control the protrusion of trace 1510a over some locations of an object's surface as well as locations where trace 1510b extends outward to meet trace 1510a. For example, for single-byte pixel values arranged in a raster format, the extent by which trace 1511a is displaced outward from the nominal contour toolpath may be directed by, or proportional to, a value represented by seven binary data bits and points at which trace 1510b are to fuse underneath trace 1510a may be indicated by an eighth bit. Alternatively, in a common technique wherein each pixel is represented by three bytes that represent red, green and blue color values, one color 'channel' may be selected to drive displacement of trace 1510a and another color value may drive the offset of trace 1510b. This control may be proportionate, meaning that, for example, a byte value ranging from 0 to 255 might linearly control the displacement of trace 1510a over a range from zero displacement to some maximum displacement from the contour-following default toolpath.

Figure 15C:
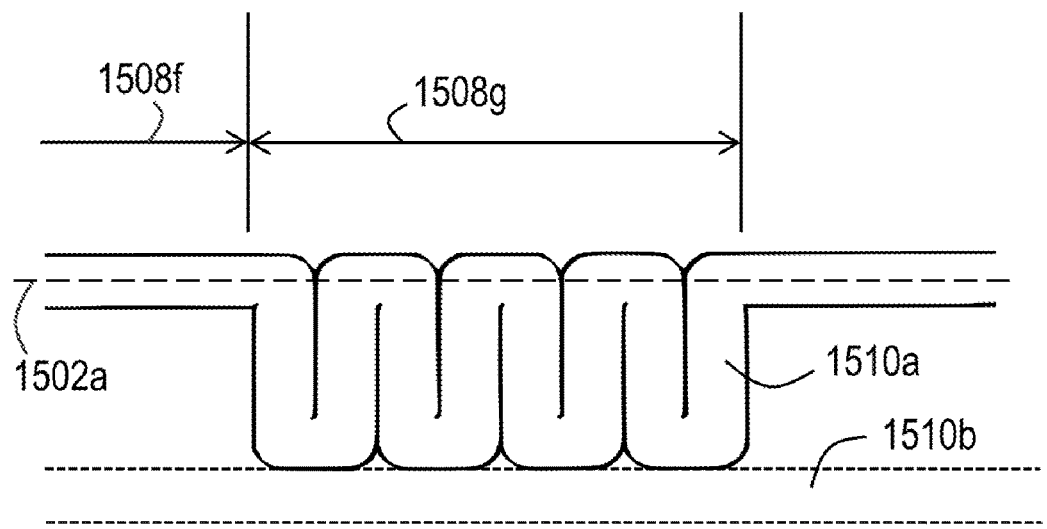

FIG. 15C presents another technique for providing a variable appearance on a surface of an object in response to image data. If FIG. 15C, a single trace 1510a conforms to an outer surface contour toolpath 1502a over interval 1508f. Over interval 1508f, trace 1510a may present a comparatively reflective surface due to internal reflection and lenticular shape of trace 1510a. Incident light may reflect efficiently due to the transparency of the extruded trace and the heat-smoothed surfaces that present a glass-like shift in refractive index. In some instances where successive layers have been deposited and fused side-by-side, some angles of incidence and observation may result in remarkable reflective effects as light may enter the edge of one bead and be reflected outward through an adjacent bead.

Over interval 1508g, single trace 1510a takes a different course, alternately diverting away from, and then returning to, toolpath 1502a in closely space ripples that are normal to the designed contour. (Although the trace is shown with distinct edges to outline the extruder path, the deposited material actually fuses to form a more-or-less solid block over interval 1508g.) This pattern of deposition is unlike the shallow reflective form of trace over interval 1508f and instead creates a deeper optical tunnel over interval 1508g that is less reflective and may appear to be darker or more densely colored than the single trace. Image data describing a pattern of light and dark areas may be used to control where a trace is deposited along a contour toolpath as shown over interval 1508f and where a trace engages in bursts of lateral dithering as shown over interval 1508g. An optional trace 1508b may also be deposited to lend strength.

While the technique shown in FIG. 15C may be useful for single-walled structures, one or more optional additional perimeters 1510b may also be deposited behind the outermost trace for thicker-walled structures. With some added perimeter traces, the contrast between light and dark areas may even be enhanced in some cases, such as if trace 1510a is of a transparent, colored material and more inward trace(s) 1510b are of an opaque white or black material.

Figure 15D:
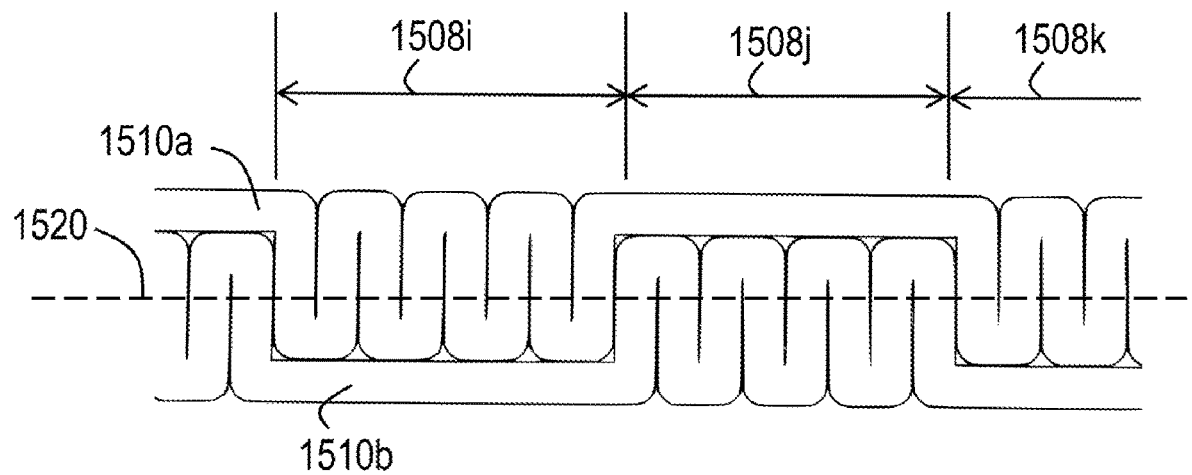

FIG. 15D presents yet another arrangement wherein the modulation of deposition paths results in an image-driven structure that is initially hidden but later revealed upon machining away some of the deposited material. The designed contour of an object represented by dotted line 1520, yet extruded trace 1510a is shown to be deposited outwardly beyond the contour line over interval 1508j. Over intervals 1508i and 1508k, as may be controlled by image data, extruded trace is observed to follow a serpentine path (similar to the movement previously shown over interval 1508g) repeatedly crossing contour line 1520. In complement to first extruded trace 1510a, a second trace 1510b may follow a path that is displaced inward as shown over intervals 1508i and 1508k where trace 1510a is rapidly fluctuating and follow a serpentine path that crosses contour line 1520 over interval 1508j. Assuming that, for example, extruded trace 1510a is an opaque black material and extruded trace 1510b is an opaque white material, the printed part will initially have an all-black appearance after being formed by deposition. However, if material is then removed from the roughly formed part, such as by abrasion, ablation or cutting, until reaching the object's final design contour (line 1520), then the final surface of the object will be formed as a slice through the patches of serpentine deposits by either material and will reveal a graphic pattern as controlled by image data. This implementation of data-driven surface graphics may be referred to as a 'machine to' technique.

Figure 16A:
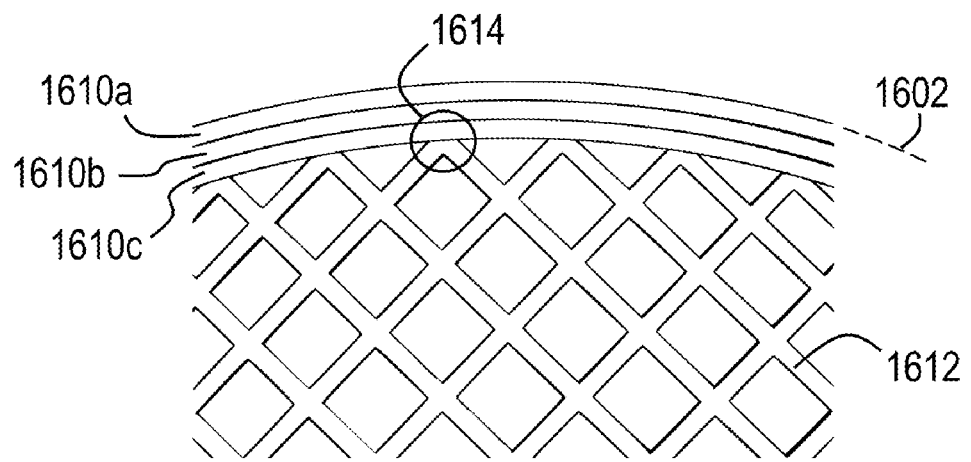
FIGS. 16A-B depict the junction between perimeter traces and infill traces as a perimeter is added to existing toolpath commands in accordance with an exemplary embodiment of the present teachings.

FIG. 16A is a close-up view of a portion of a 3D printed object, showing a portion of the outer surface and some infill, and may represent a printed layer in the course of the build as seen from above or by sighting downward along a vertical axis, a direction of build progression, or what is customarily referred to as the Z-axis in a Cartesian coordinate system. A designed outer contour 1602 of the object is indicated by a superimposed dotted line and three perimeters 1610a,b,c are shown to comprise the 'wall' of the object, along interior extruded traces formed as an infill that sparsely occupies the interior space surrounded by the walls. The infill extruded traces 1612 support the outer walls and rigidify the overall structure without requiring a solid fill. Normally, the paths of traces 1612 are calculated to provide contact or overlap with at least an innermost perimeter 1610c, as shown at contact point 1614.

Figure 16B:
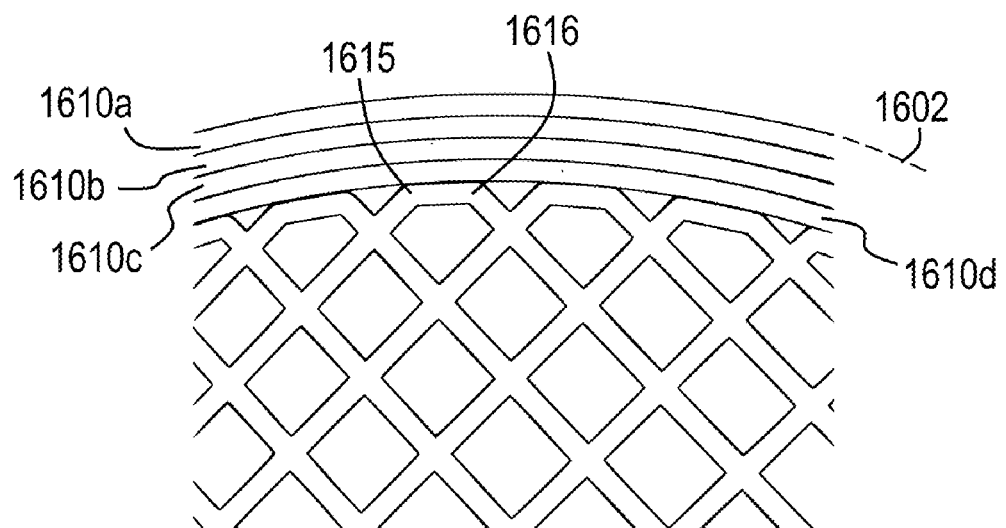

FIG. 16B is shown for comparison to FIG. 16A and to depict one technique for adding a new perimeter 1610d. This action may be needed when a graphics effect requires four outer toolpaths (see the subtexturing effect in FIG. 15A) but the outer toolpaths have already been calculated using only the three perimeter toolpaths guiding the extruded traces shown in FIG. 16A. (Refer also to step 2714 in process 2700.)

Note that where already-calculated endpoint coordinates for infill traces 1612 previously contacted perimeter 1610c at contact point 1614, an efficient way to slightly modify the infill paths, rather than recalculate them entirely, is to shorten the infill traces and, for example where a grid or similar infill pattern is used, truncate each turning point as shown, effectively replacing each single contacting point 1614 with two waypoints 1615 and 1616.

Figure 17:
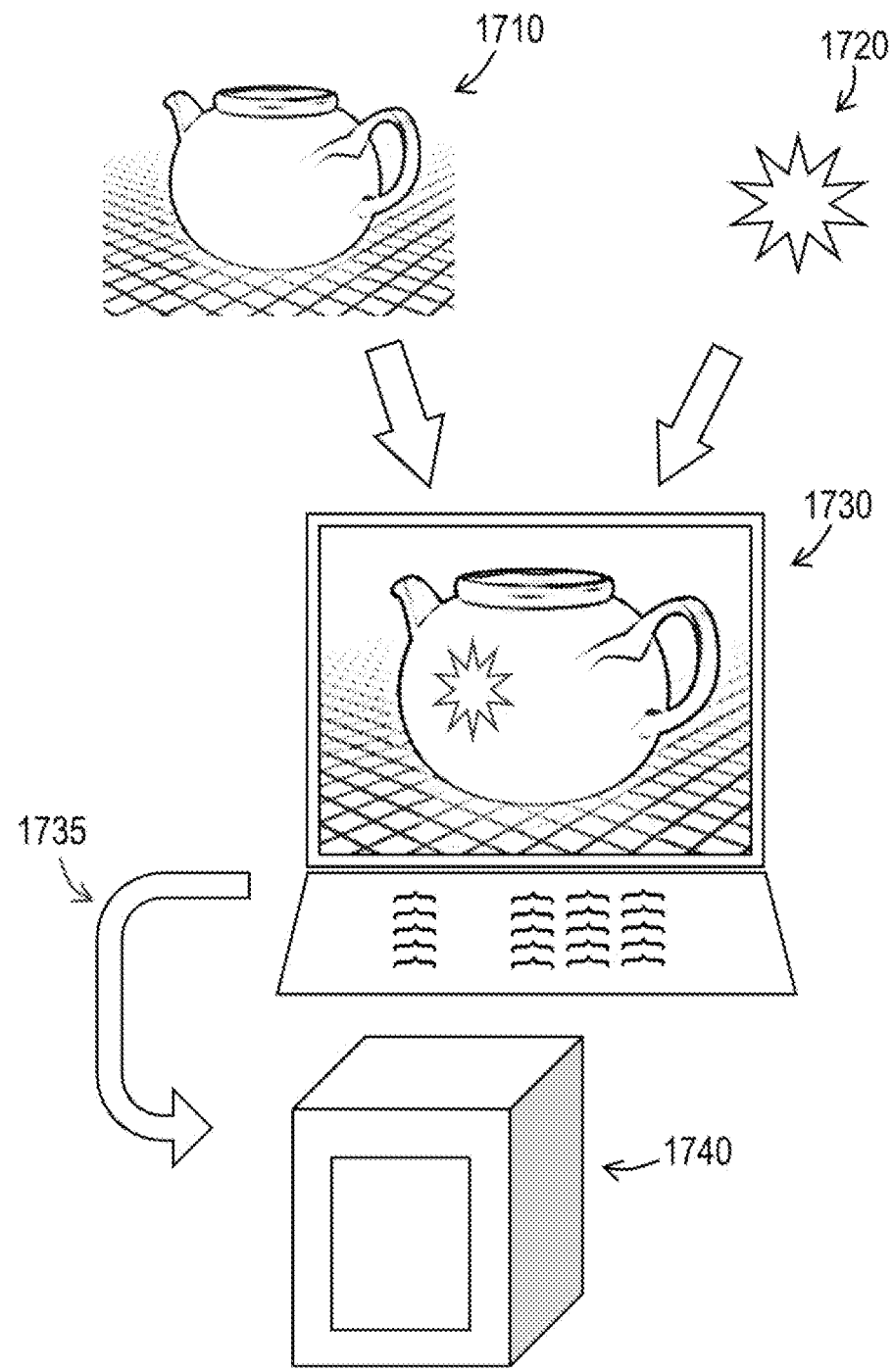
FIG. 17 is a conceptual diagram depicting how a shape-defining model data file and a surface graphic data file are combined in a computing environment and converted into instructions for a 3D printer in accordance with exemplary embodiments of the present teachings.

FIG. 17 provides a conceptual overview of how a 3D model and a graphic element may be combined by software application in accordance with various embodiments of the present teachings. An object to be constructed in three dimensions is represented as 3D model 1710 in a form as it might appear to a human user who creates the model or obtains the model from another source and then previews the model. Importantly, the 3D model may be created by a separate designer and then obtained for use such as by downloading the model from an internet web site, receiving via electronic mail or by some other form of data transmission or by carriage upon a non-volatile computer-readable medium. In the form shown, model 1710 may describe the outer surfaces of the object and yet may be devoid of any information specifying color or variations in color, texture or appearance at specific points on the surface of the object.

Graphic pattern 1720 may be in one of several formats of digital image data representing a two-dimensional image such as a raster bitmap, a vector graphic or a compressed image using a discrete cosine transform, to name a few. Graphic pattern 1720 may also be obtained using a function that defines an image element value as a function of coordinates in three-dimensional space and by sampling the function at specific coordinates, such as those making up a planar surface or those that intersect a shape model, to provide a determinate value for each of many adjoining sampling points over a planar or non-planar mesh.

Graphic pattern 1720 may be created by a designer who has prepared 3D model 1710 or may be obtained from a different designer. Each of graphic pattern 1720 and 3D model 1710 may have been created in any sequence and without forehand knowledge or regard for the existence of the other. A wide variety of different graphic patterns 1720 might be combined with 3D model 1710 to yield items that are of the same 3D shape but have different surface appearances. Likewise, a single graphic pattern 1720 may be applied to a wide variety of 3D models 1710 to create various shapes that bear the same graphic feature.

The selection of a 3D model 1710 from among multiple different models, and of a graphic pattern 1720 from among many candidates, may be made by a third user who is not the creator of either the model 1710 or pattern 1720. The third user may, for example, select a model from a publicly accessible repository such as Thingiverse (an internet website having a URL of www.thingiverse.com and operated by Makerbot Industries, LLC, NY, NY) and separately source graphic pattern data from a vendor offered through Etsy (an internet website at www.etsy.com operated by Etsy, Inc. of Brooklyn, New York.)

A user who either creates or obtains model 1710 and either creates or obtains pattern 1720 may use application software on a computing workstation 1730 (such as a desktop computer, laptop computer, cloud-hosted service, tablet or smart phone) to present the model and graphic in juxtaposition so that the user can preview the appearance of the combination and preferably adjust the relative location and size of the graphic feature on the model to simulate the appearance that will result after the build. Preferably, the user may select colors or other attributes of the materials that will be used during the build process and view a rendering that closely simulates the appearance of the finished article if the selected model, pattern and materials are used.

When a user has selected model 1710 along with pattern 1720 and has viewed and adjusted the size and location of the graphic feature on the model, then a process within workstation 1730 (or otherwise hosted on some computing platform) calculates nozzle toolpaths, using processes described elsewhere herein, to cause pattern 1720 to be formed as the object is being constructed by extrusion deposition. The resulting toolpath instructions are conveyed by data communications (see arrow 1735) over a data network, by recording upon a portable non-volatile computer readable medium or otherwise providing a data file to an extrusion-based additive manufacturing system 1740 which creates a solid object with the chosen graphic feature.

Note that, despite FIG. 17 showing visualized renderings of model 1710, pattern 1720 and a combined result at workstation 1730, it is not strictly required for an end user to see any or all of these views. For example, a quantity of items to be made based on model 1710 may be intended to each receive a different name of a person who is a member of a list, group or team. Once a generic text position is set on the model, then the toolpath generation step for each object-plus-graphic combination may be automatically performed and need not be displayed for an end user. Batchwise or command line invocations may be used to carry out toolpath calculations without any visual rendering.

As yet another alternative contemplated, the model may come with or have embedded a preferred or allowed location for graphic content. Model 1210 may have embedded, affiliated or attached mask data that controls or advises where graphic content may be applied.

Figure 18:
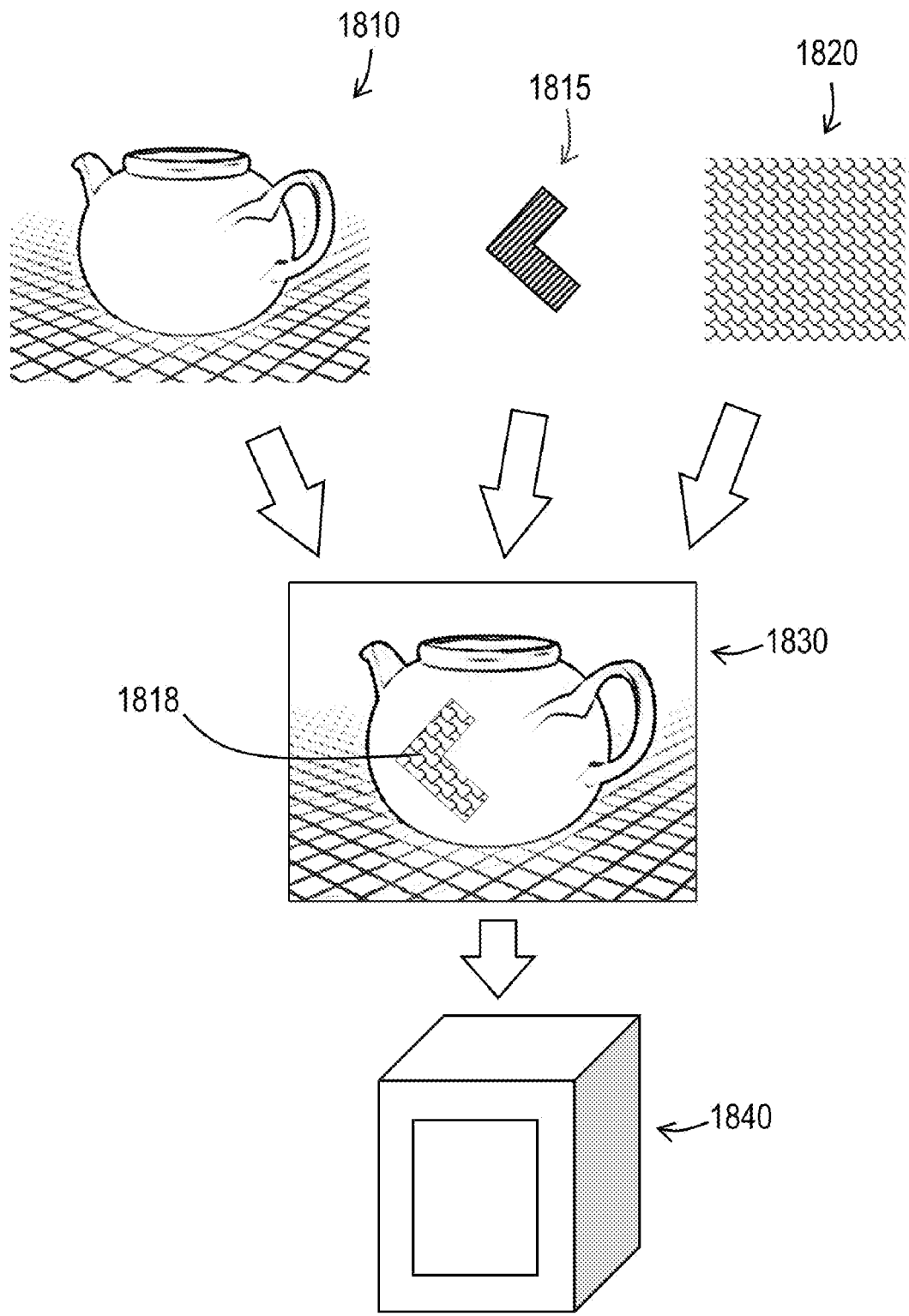
FIG. 18 is a conceptual diagram depicting how a shape-defining model data file, a mask-defining data file and a graphics-defining data file are combined in a computing environment and converted into instructions for a 3D printer in accordance with exemplary embodiments of the present teachings.

Extending upon FIG. 17, FIG. 18 depicts another possibility wherein a solid object model 1810 is to be formed having a graphic feature that is the combination of shape mask data 1815 and textural graphic pattern 1820. A finished object, represented by final appearance rendering 1830, shows the intended outcome in which mask shape 1815 defines a shaped region 1818 on the surface of the object within which pattern 1820 provides a textural effect bounded by the mask. Object shape model 1810, shaped mask 1815 and pattern 1820 may each have been created by a separate entity or obtained from entirely separate sources. Each of model 1810, shaped mask 1815 and pattern 1820 may have been created without regard for one another and each may be interchangeably used with alternative object models, shaped masks or textural patterns. In one scenario, an end user may obtain the model 1710, the mask 1815 and the pattern 1820 from completely different sources, such as from publicly accessible repositories or e-commerce store fronts. In another scenario, an end user may have created one or two of the three elements and obtained the remainder from other sources. As yet another scenario, a designer who created object model 1810 may also convey, along with the model, associated data as to a shaped mask which may optionally already be at a preferred location relative to the object model in accordance with the shape designer's preferences. This allows other users to obtain the model and mask combination and then apply any choice of textural graphic therein.

As with FIG. 17, the resulting combination of object shape data, mask and textural image data, achieved by processes described elsewhere herein, is encoded as toolpath commands and provided to an extrusion-type 3D printer to yield a solid object resembling view 1830.

Note that, despite FIG. 18 showing visualized renderings of model 1810, mask 1815, pattern 1820 and a combined result at workstation 1830, it is not strictly required for an end user to see any or all of these views. For example, a quantity of items to be made based on model 1810 may be intended to each receive a name of a person who is a member of a list, team or group. Once a generic text position is set on the model, then the toolpath generation step for each object graphic combination may be automatically performed and need not be displayed for an end user. Batch-wise or command line invocations may initiate toolpath calculations with or without any visual rendering for review by a user.

Figure 19A:
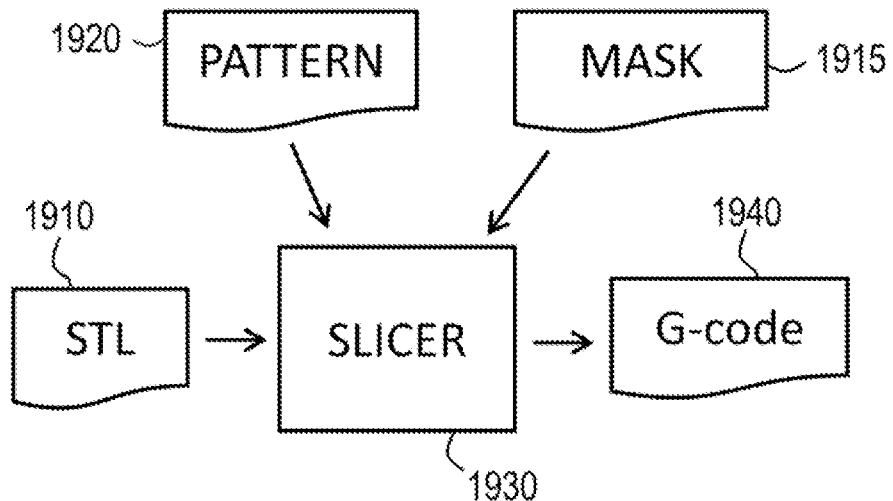
FIGS. 19A-B are block diagrams depicting various data workflows by which shape-defining and graphics-defining data may be combined into instructions for a 3D printer in accordance with exemplary embodiments of the present teachings.
Figure 19B:
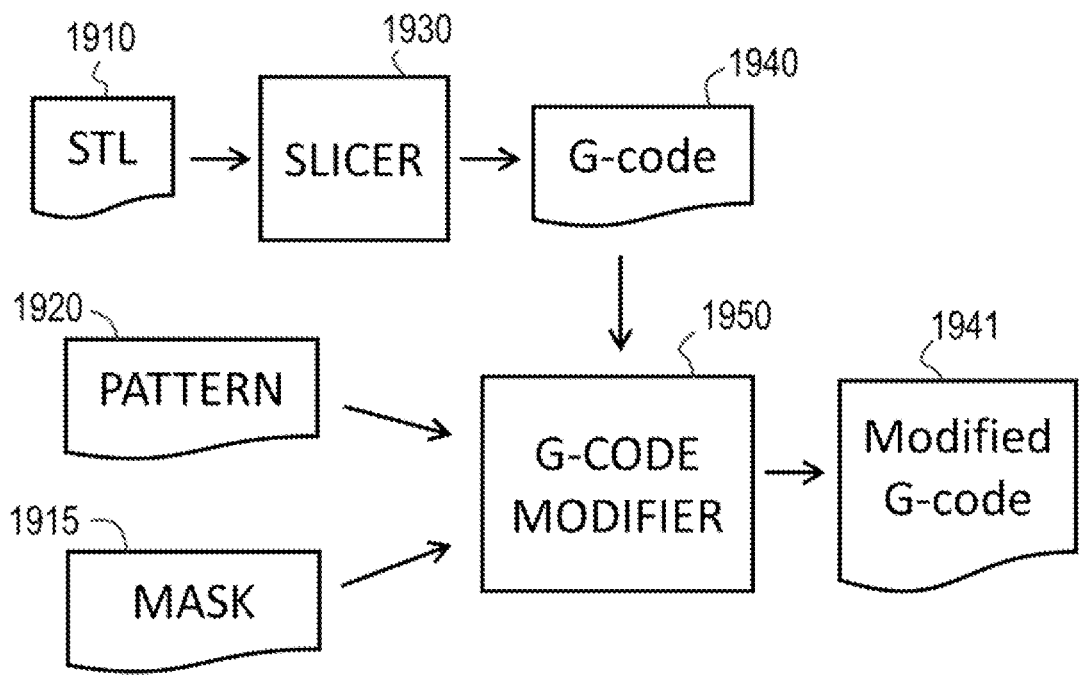

FIGS. 19A and 19B are block diagrams demonstrating an additional dimension of variability in how a solid object model 1910, in the form of an STL data file or the like, may be combined with image data, shown as pattern 1920, and optionally a mask pattern 1915, within a slicer application 1930. These diagrams comport with FIGS. 17 and 18 but reveal a different aspect in terms of data work flow. Both FIGS. 19A and 19B provide an overview of methods for preparing motion instructions for use in the context of an extrusion deposition modeling process that constructs a solid object by depositing successive layers of material upon a build plate as performed by a system, such as system 100 depicted in FIG. 1, comprising at least one extrusion nozzle for extruding the build material and a plurality of motors for creating relative motion between the extrusion nozzle and the build plate. Later FIGS. 20, 24A-E, 25-27 provide more detailed descriptions of these methods.

FIG. 19A shows, as one option for combining these elements, the simultaneous providing of model 1910, pattern 1920 and mask 1915 to a slicer 1930 which performs computations (as will be described in FIGS. 24A-E and FIG. 25) and generates toolpaths in the form of a body of G-code commands 1940, or the like, that cause graphic pattern 1920 to be formed upon an object while it is being built according to the shape specified in model 1910. Shape-descriptive STL file 1910 represents one form of a first data set which may be more generally described as a digital data model describing shape information for the object to be constructed. Graphic pattern 1920 represents a second data set describing a graphical pattern of data values as a function of at least two dimensions, which includes raster or bitmap data as well as vector graphic or compressed forms (JPEG) that may be rendered in at least two dimensions. Shape-descriptive STL file 1910, graphic pattern 1920 and mask 1915 (if used) may each be obtained from different sources, created at different times and via different means. (Graphics 1910 and mask 1915 could be even scanned from paper hardcopy.) It is contemplated that, alternatively, some elements could be provided in combined form. A shape-defining model file may be supplied with adjunct or embedded mask data. In accordance with the present teachings, where an effect requires a minimum number of perimeters, slicer 1930 can assure this number of perimeters is provided while calculating toolpaths.

FIG. 19B depicts another option for incorporating graphics features in an object being constructed. In FIG. 19B, a shape model, such as an STL file 1910 shown by way of example, is provided as input to a slicer in the more conventional way so that slicer 1930 produces a toolpath data set, such as a list of G-code machine instructions 1939 that, by themselves, would direct a 3D printer to create the solid object in three dimensions but without the graphics effects.

In contrast to FIG. 19A, instead of supplying pattern 1910 and optional mask 1915 to slicer 1930 to be incorporated as inputs in the original creation of G-code 1939, pattern 1910 and mask 1915 may be applied to 'already-sliced' G-code 1939. As will be explained in connection with FIG. 27, based on slicer-inserted feature type identifier comments or by inference from XY data, a G-code modifying process may separate out contour-following perimeters in the G-code that will form the surface or outer walls of the additively formed object and redirect the existing toolpaths in accordance with pattern data 1910 or a combination of mask data 1915 and pattern data 1910. The output can be referred to as modified G-code 1941 that incorporates the perimeter-implemented graphic features.

The advantage of using the approach depicted in FIG. 19B is that pattern 1910 and optionally mask 1915 may be freely changed through the action of modifier 1950 without having to laboriously load STL file 1910 and re-execute the entire slicing operation for every unique instance of modified G-code 1941 needing to be generated. This agility in graphic content may be useful for personalization, such as producing numerous identically shaped items but with each printed item having, for example, a different proper name, monogram or the like. Using this approach, serialization is also facilitated. Where numerous identical items are to be additively manufactured and each item needs to bear a unique or changeable marking, such as a serial number, batch number, date of manufacture or expiration date, a surface graphic may be changed without re-slicing the model. The manipulation of toolpaths by a modifier process 1950 to create a surface graphic effect may be far less cumbersome than a slicer application 1930 and may be implemented within a 3D printer's onboard computer that is also used for human interface and motion control or otherwise logically nearby, such as through a data communication link or network, on a separate computing device.

Figure 20:
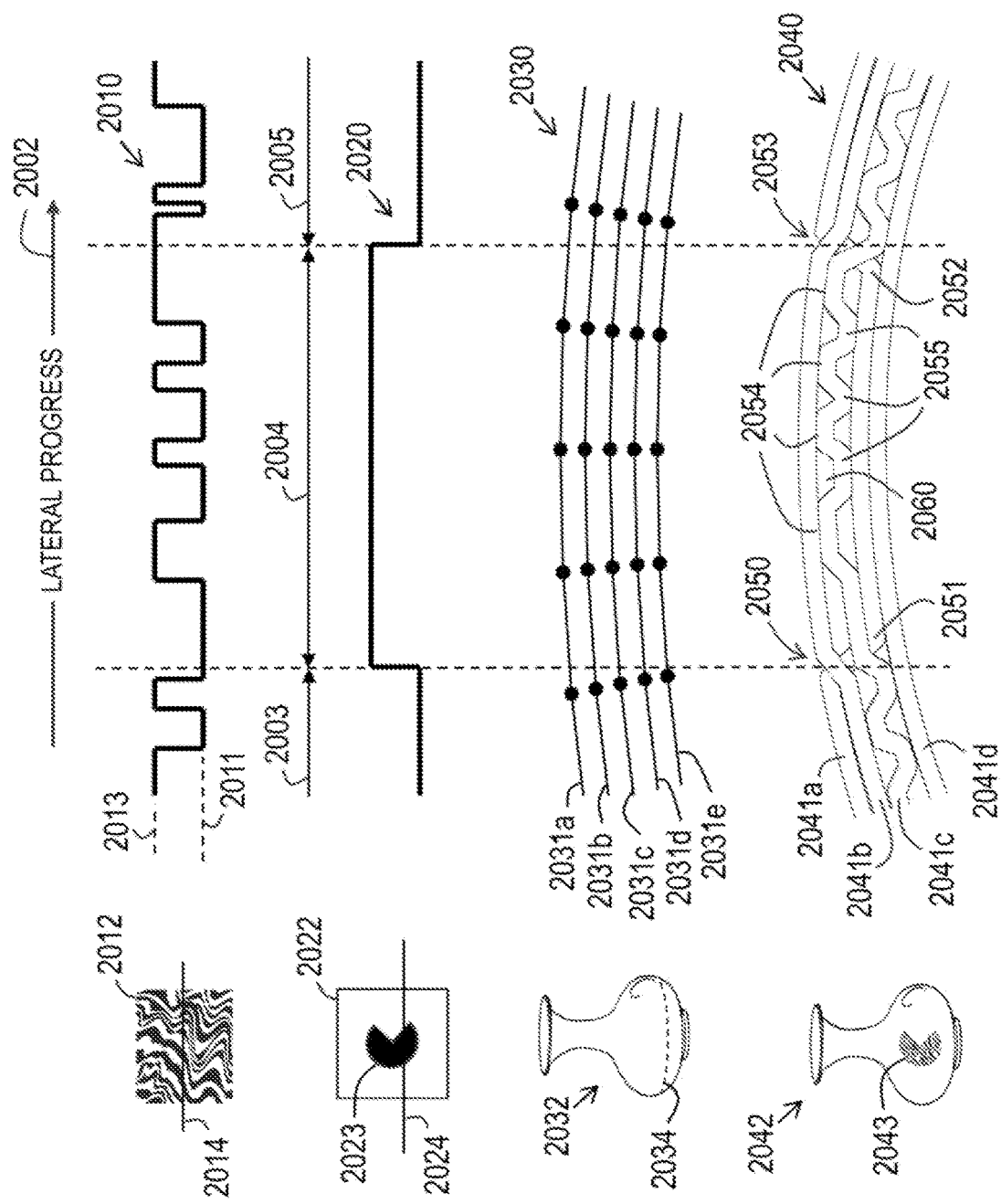
FIG. 20 shows aligned plots of image data states, toolpath waypoints and extruded traces as a function of a lateral progress axis in accordance with exemplary embodiments of the present teachings.

FIG. 20 presents a conceptual diagram explaining a manner in which perimeter data points that describe a surface contour of an object are processed for a given build layer in conjunction with data representing graphical elements to be incorporated as the object is formed by extrusion deposition. Specifically, FIG. 20 depicts a graphical pattern or texture 2012 that one desires to apply as a visual feature to at least a portion of an object, represented by 3D model 2032, while the object is being formed. In this example, pattern 2012 is not to be applied over the entire surface of the object, but rather as an effect within a region that is bound by another patterned graphic, namely mask pattern 2022.

A first plot 2010 represents the state of graphical pattern 2012 as a function of circumferential progress (represented by arrow 2002) along the designed contour of an object's surface. This progress axis mainly pertains to graphics that conform to an object's surface, even if not flat. It should be noted that, alternatively, a progress axis may simply be positioned along a linear axis as when a surface to receive a graphic treatment is comparatively flat or when a collimated image is projected from a given direction towards an object without distorting to accommodate the object's shape. In general, the progress axis represents the establishment of a monotonic mathematical relationship, such as a linear proportional relationship, between two scalar-valued ranges, the first range being a spatial range of values assigned to points that lie along a toolpath and the a second range of values being a graphical range of values of coordinate along at least one dimension by which graphic data values may be indexed in a graphical pattern data set.

Figure 21A:
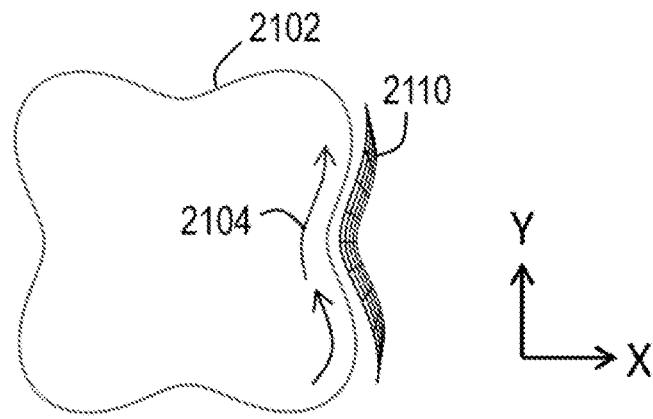
FIGS. 21A-21C are views in an XY plane depicting various ways in which a progress axis may be chosen to map graphic image data to surface points on an object in accordance with exemplary embodiments of the present teachings.
Figure 21B:
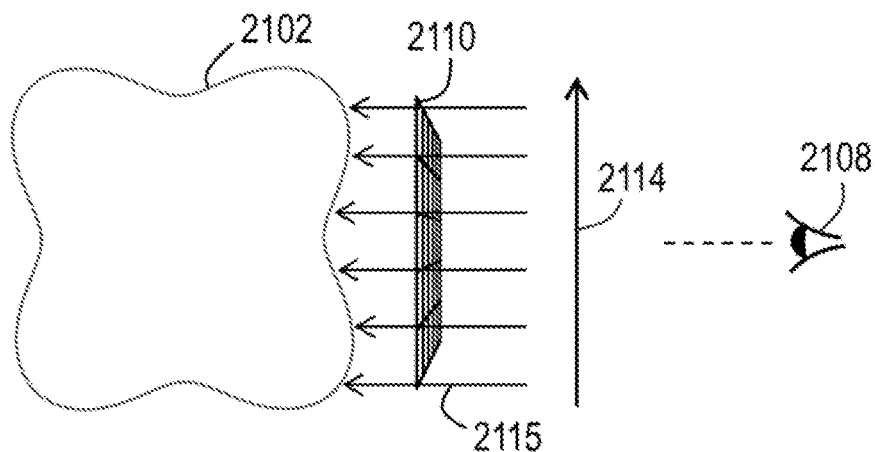
Figure 21C:
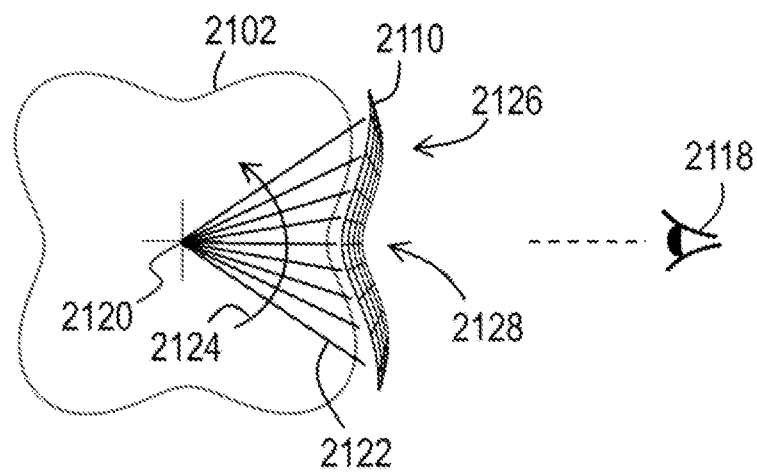

With brief reference to FIGS. 21A-C, three variations on a progress axis are explained. FIG. 21A shows an outer contour 2102 of an irregular shape as seen from above. Outer contour 2102 may be the result of a single layer slice operation intersecting a plane with a 3D model of the shape. In particular, FIG. 21A represents a circumferential or contour-following progress measurement as indicated by arrows 2104. A graphic feature 2110 to be implemented as toolpaths are calculated is shown in perspective and hovering away from contour 2110 for illustrative purposes. FIG.

21A intends to show that using a contour-following progress gage renders a surface image as if one were to apply a decal of the graphic feature to the side of the object. The distortion and foreshortening of the image from any point of view would be the same as if a flexible, contour-following decal had been applied after the object was formed.

FIG. 21B shows an arbitrarily selected linear axis 2114 as a measure of progress by which to correlate position on the object contour to horizontal progress across a row of an image. In this example, a range along the Y axis is used. The range encompasses the Y-axis coordinate of many points along contour 2102 and the horizontal axis of graphic feature 2110 is scaled and offset to span the same range. The resulting effect resembles projecting the flat image using collimated rays 2115 as shown. Using this method, an observer from vantage point 2108, especially at a distance, would essentially see an undistorted image despite the curvatures of object contour 2102.

FIG. 21C represents yet another variation wherein each location on the object contour corresponds to an angular or azimuthal location relative to a central axis and a relative to a reference azimuth. Angular progress axis 2124 may be expressed in angular units. To portray the image distortion that might result from this approach, equiangular rays 2172 are shown to divide the graphic-bearing part of the contour 2102. Looking closely at the spacings of vertical lines in the grid pattern, as the angular progress is advanced in coordination with horizontal progress across the even grid image, the surface graphic effect appears distorted from an observer's point of view 2118, giving the appearance of a relatively stretched area 2126 and relatively compressed area 2128. These distortions occur as the contour curvature causes variable distance from the central axis 2120.

An end user or designer may, depending on circumstances and desired effect, select any of the above approaches or yet other approaches for coordinating contour-wise progress to image-wise progress. The present invention is not limited to reliance on any specific one of these mappings.

Returning to FIG. 20, in plot 2010, a lower state 2011, represents one of, for example, two states that a given graphical effect may express at any given location within the graphic. For example, for the case of a subtexture effect shown earlier, a lower state in plot 8110 may represent a location at which a darker or light-absorbing effect is called for, whereas a higher state 2013 indicates that a lighter, light-reflecting appearance is to be presented. The sense in which pixel states in a source image 2012 will affect the light/dark states or other conditions on the surface of an object may be such that light graphical corresponds to a lighter or more reflective area of an object surface. The opposite sense may also be applicable in some circumstances, meaning that dark portions of a source graphic image result in a localized lighter appearance on the surface of the object, depending which of several schemes shown earlier are being used and perhaps on an arbitrary choice of positive or negative sense selected by a user or designer for a specific circumstance.

Plot 2010 corresponds to the variation between these graphic states, for example, as graphic pattern 2012 is scanned left-to-right along one raster 'row' 2014. Of course, pattern 2012 may be two-dimensional (2D) and represented by a raster graphic data set (bitmap), a vector graphic data set or other format as long as the state or value at any addressable location within the image can be unambiguously determined. In accordance with preferred embodiments, two-dimensional pattern data may be encoded in manner having a finite integer number of 'vertical' rows, while representing 'horizontal' locations of transitions between states using a high-resolution representation such as a floating point data value encoded according to IEEE Standard 754. Preferably, two-dimensional pattern data is encoded in a manner with highly asymmetric resolutions, such that the number of distinct values that may be represented in a first dimension, such as a relative 'horizontal' axis, may be more than one thousand times greater than the number of values that are representable, or are actually represented within a given data set, along a second dimension, or a relative 'vertical' axis.

It is also possible to express a graphic pattern in 3D space and to either obtain a 2D slice of the 3D pattern to use as pattern 2012 in a flattened sense or to determine the graphic values at any given point on the object's' surface contour by calculating the value of the 3D graphic pattern using the 3D coordinates of the object model.

Although depicted here as having binary states, some forms of data for graphic pattern 2012 may have indicate higher numbers of pixel values, may comprise multiple separate 'channels' affecting surface appearance or may be continuously valued or presented in high resolution.

In simple terms, plot 2010 may be viewed as a 'slice' through pattern 2012 showing the changes between light and dark along the slice line 2014. In this example, pattern 2012 is a generalized texture devoid of any particular shape or outer boundaries. Alternatively, some patterns may have a bounding shape, presenting patterned variation in some regions, surrounded by a solid 'background' or a field of fixed state graphics values.

Similarly, a masking graphic pattern 2022 is shown to exhibit changes between two different graphical states, represented here as light and dark portions. As sampled along row-wise line 2024, these changes among graphic values are presented as plot 2020 as a function of progress from left-to-right across pattern 2022. Again, this progress axis may indicate both progress across pattern 2022 and corresponding circumferential progress across the surface of the object.

The left-to-right aspect of this conceptual explanation should not be construed as determining or implying a limitation to the actual printing sequencing or direction. Actual printing may be in either direction and deposited traces may be printed in any combination of directions and in any sequence.

Masking graphic pattern 2022 serves to confine or define specific regions where graphics pattern 2012 may have an effect on the surface appearance of the object being formed. As shown FIG. 18 earlier, a designer may wish to form a given shape upon a solid object and have the shape filled by a separately variable textural effect. In the example scenario of FIG. 20, a designer may like the 3D shape of a vase 2032 and want to apply on its surface a graphic feature shaped like dark area 2023 but having an interior texture (or 'fill' texture) defined by a 'swirl' textural pattern, shown as graphic pattern 2012.

Whereas plots 2010 and 2020 pertained to graphics data, plot 2030 represents polyline vertices for several perimeter toolpaths that follow the object's design contour at a given build layer (over just a tiny portion shown here) and have been calculated by mathematically 'slicing' the 3D model 2032 for the object to be constructed, such as by intersecting the object model along a plane at a height indicated by line 2034. As shown in a somewhat exaggerated fashion for explanatory purposes, each perimeter toolpath 2031a-e is represented by a series of line segments extending the between the coordinate locations or 'waypoints' that a 3D printer will be instructed to move between while depositing material. In a similar convention as FIG. 5A-5C an outmost perimeter toolpath 2031a is shown topmost in this diagram and follows the dimensional contour of the object based on its model surface. More inward perimeter toolpaths, 2031b-e are shown in parallel with the outer design contour, but deeper away from the outer surface and submerged behind toolpath 2031a. If material were to be extruded along all five of these toolpaths as shown, the object would have at least five perimeters forming its outer wall. Perimeter toolpaths are represented by an ordered series of waypoints, also regarded as vertices forming a polyline, with segments implicitly defined between each pair of successive waypoints. Throughout the present disclosure, a given point in the build space that either corresponds to one of the waypoints of a toolpath or that intersects or is substantially near (within the radius of a deposited bead, for example) any line segment defined by a pair of adjacent waypoints in the toolpath is said to 'lie along' the toolpath.

It should be noted that when curved surfaces are to be formed by numerical controlled 3D printers and conventional CNC cutting machines the movements are often encoded as many minute straight line movements in this manner of plot 2030. Relatively few polyline points are shown here for simplicity but curves are often represented by more frequently spaced points to better represent curved features at high resolution and avoid the appearance of discernable flat facets on an object's surface.

Most significantly, the present teachings enable the combining of the shape information exemplified by plot 2030 with the graphics effects specified by graphic pattern plot 2010 and optionally a mask pattern 2020. Plot 2040 shows a desired final placement of extruded traces resulting from the combination of these example patterns.

In plot 2040, an outer surface of the object is generally formed by an extruded trace 2041a that follows the designed outer contour of the object's shape as defined by model 2032. In this example, most of the object's surface will have an appearance based on the material used in depositing extruded trace 2041a. If the extruded material used for this trace is opaque and white in color, then the majority of finished object 2042 will be white, except where a graphic feature 2043 is to be formed among the extruded perimeters.

Referring to plot 2040 and following along extruder trace 2041a from left to right, trace 2041a is initially seen as the outer most trace, consistent with this material being the predominant default material that determines the overall color for most of the object's surface. Where a location of a graphic feature 2043 is encountered, trace 2041a is shown to submerge behind other traces beginning at location 2050, yielding the surface contour to be defined by other traces coming to the fore. In this example, this transition at location 2050 from a background color to the beginning of a surface graphics feature corresponds to a mask pattern, shown by plot 2020, having transitioned from a light region to a dark region. The change of state shown by plot 2020 signifies that the routing of traces to form the outer wall of the object transitions from a first state, wherein trace 2041a solely forms the outermost surface, changes to a second state wherein other traces, as well as patterned effects formed therein, are allowed to influence the visual appearance at the surface of the object.

After submerging to make way for other traces, extruded trace 2041a turns at point 2051 to follow an inward candidate toolpath paralleling perimeter toolpath 2031d. At the same juncture, location 2050, a previously submerged second trace 2041b may emerge and beginning following along outermost perimeter toolpath 2031a. Second trace 2041b may be, for example, of a translucent green colored material, so that a sharp visual demarcation is formed on the object surface corresponding to location 2050. To implement a subtexture graphical effect explained earlier in FIG. 15A, yet another extruded trace 2041c may also shift among the shape-dependent perimeter toolpaths and become active in forming the visual appearance of the object's surface over interval 2004. In a first interval 2003 over which mask pattern 2020 is in a low state, extruded trace 2041c is shown as oscillating between two candidate toolpaths 2031c and 2031d. This oscillating pattern creates a mechanical bond between adjacent traces while reserving the ability to leave an unfilled toolpath in some areas within a 'graphics active' interval 2004. Refer to the earlier explanation as to why it is preferable to keep nozzles moving and flowing rather than creating interrupted flows. By 'idling' below the object surface 'behind' trace 2041a, trace 2041c remains visually hidden while ensuring mechanical integrity. Upon entering into interval 2004, trace 2041c shifts to a toolpath where it can affect the appearance at the object's surface. The material forming trace 2041c may be the same as trace 2041b and may be deposited by the same extruder during a different 'pass' of the extruder through the vicinity. As explained in FIG. 15A, trace 2041c may move between a more outward toolpath 2031b and a more inward toolpath 2031c. When following along outward path 2031b, trace 2041c is brought into fused contact with trace 2041b, creating a light-absorbing or darkened surface appearance. When trace 2041c follows along perimeter toolpath 2031c, an unfilled gap 2060 is formed between trace 2041b and 2041c and trace 2041b presents an optically reflective or lenticular effect at the surface, effectively presenting a lighter appearance. Note that the presence of darkened areas (2054) and lightened areas (2055) corresponds to the changing state of graphics pattern 2012 as depicted by plot 2010. On either side of interval 2004, the locations of traces 2041a-c are unaffected by the state of graphical pattern 2012 due to the overriding effect of masking pattern 2022 over those locations. (Of course, in an alternative implementation in which a separate masking pattern is not used, a graphics pattern may depict a shape as well as an internal texture such that a background color of the graphic pattern correlates to locations at which a default outer trace 2041a forms the outermost surface of the object.)

It is over the interval 2004, determined by the affirmative state of mask pattern as a function of lateral progress as shown by plot 2020, that a graphic pattern 2012 is permitted to be expressed by the transitioning or transposing of traces 2041a-c.

For practical reasons, it is recommended that an innermost perimeter trace 2041d, which can be printed by any available extruder nozzle, is present in addition to the graphics-implementing traces 2041a-c. This constant 'backstop' trace having a fixed depth provides a consistent attachment location for infill traces, regardless of surface graphics, and provides an important mechanical attachment for trace 2041c when it is oscillating and not being used within an active graphics interval.

The right end of interval 2004, which maps to location 2053 on the surface of the object, signifies the end of the subtexture graphics effect and a return to presenting the background color of the object. Accordingly, extruded trace 2041a turns at location 2052 and reemerges at location 2053. In complementary way, trace 2041b submerges behind trace 2041*a* and returns to following along toolpath 2031*b* unless and until another graphics region is encountered within the same build layer.

Upon reaching the end of interval 2004, trace 2041*c* also submerges behind trace 2041*a* and resumes its oscillating behavior between toolpaths 2031*c* and 2031*d*, alternately fusing between traces 2041*b* and 2041*d*.

As shown for one example build layer, plots 2010 and 2020, and the resultant routing of extruded traces in plot 2040, are applicable for the particular vertical elevations or raster rows 2014 and 2024 at which patterns 2012 and 2022 are sampled and pertain to a specific deposition layer in building the specified object. Typically, the continuation of these graphics onto a subsequent build layer will involve shifting slice lines 2014 and 2024 upward, reassessing state changes in each as a function of lateral progress and combining these in a similar fashion with the shape-determining perimeter toolpaths 2031*a-e* for that next build layer. By continuing to sample and apply the graphics and mask patterns as each build layer is formed, a finished object 2042 will be constructed having the specified graphics shape and texture applied.

Figure 22:
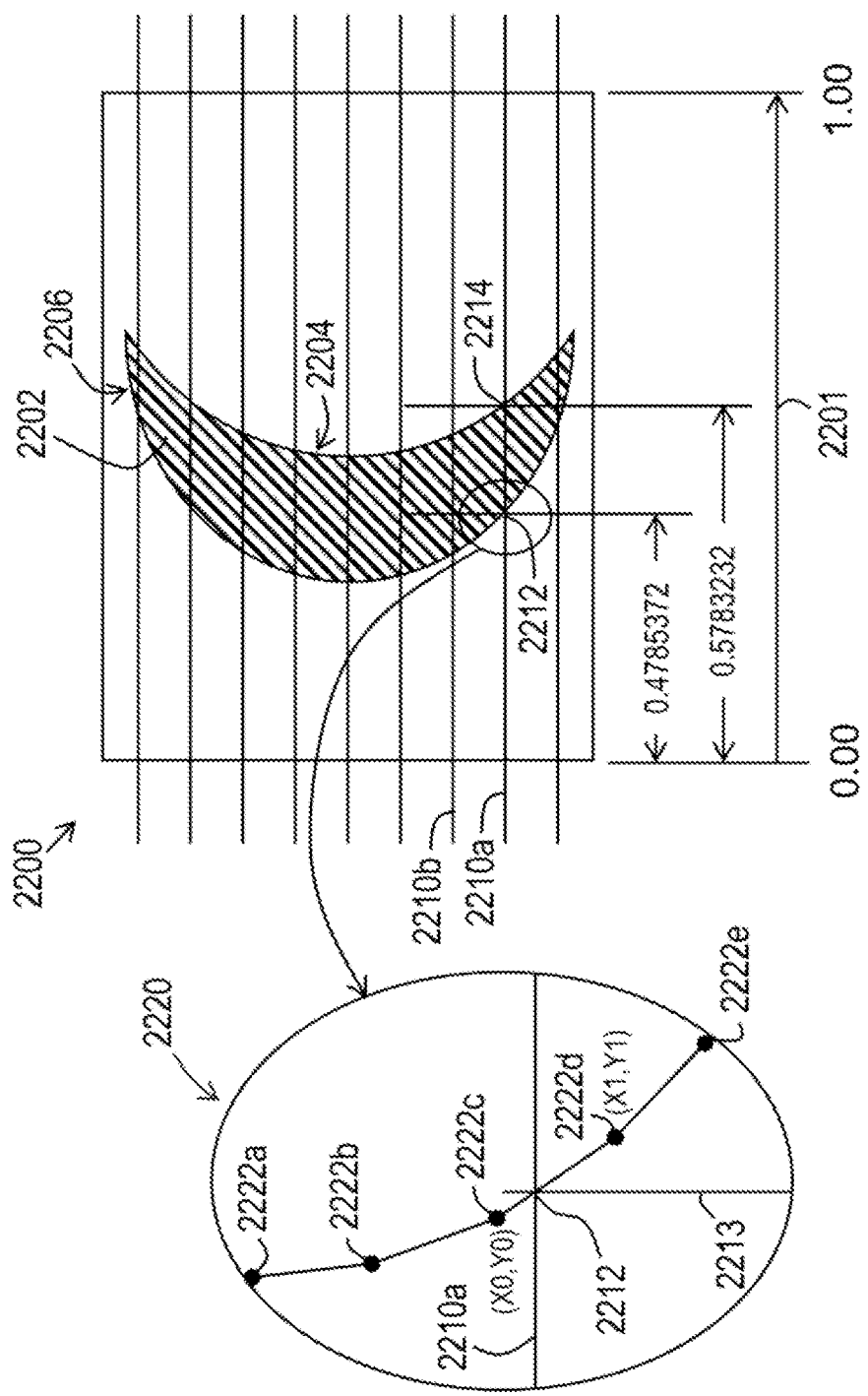
FIG. 22 is a diagram showing how a two-dimensional graphic image may be sampled across horizontal lines and encoded as transition locations in accordance with exemplary embodiments of the present teachings.

In FIG. 22, a graphic pattern 2200 represents a textural graphic or a mask to be applied as shown on FIG. 20. Within graphic pattern 2200, a shape 2202 is seen to comprise curved edges, with some portions, (such as edge portion 2204) being nearly parallel to vertical or Y axis in pattern coordinates and other portions of the curve (such as edge portion 2206) being nearly parallel to the horizontal or X axis in a coordinate system for graphic pattern 2200. It is noted that the Y axis of the graphical pattern will likely correspond to the vertical or Z axis of additively constructing an object bearing the graphical pattern.

While shape 2202 is depicted as having smooth continuous edges, it is important to consider how the integrity of this image degrades when the image is divided into a finite grid pattern of pixels that are assigned light/dark values. The vertical resolution is practically limited by the thickness of each deposited layer. Briefly referring to FIG. 23, this degradation is evident when an outline version 2310 of shape 2202 is shown next to a rasterized image 2320 that would hypothetically be produced from representing the same image as an array of approximately 60×60 square pixels. The 60×60 example resolution is based on the horizontal resolution being subject to the same limitations that are inherent in the vertical resolution.

Outline version 2310 may either be a very large pixel array as a raster image or outline version 2310 may be a vector description comprising curve equations or polylines.

If printed at a 0.2 mm layer height and assuming each raster row in the image data maps to a layer in the build process, this image would be rendered at approximately 12 mm in height. Scaling up the overall rendering size, such as by having each image row control two adjacent printed layers, does nothing to alleviate the rough edges caused by limited discrete coordinate values along the horizontal direction. The jaggedness seen in image 2320 would be very pronounced and of low fidelity in comparison to the source image edges represented by outline version 2310.

Given that, by employing the present teachings, a shape 2202 will be realized by the patterned depositing of extruded layers that are, for example, 0.2 mm high it is apparent that the vertical resolution of the printing process is effectively limited to 0.2 mm without extraordinary measures. At first, it may seem that the horizontal resolution should be deemed to about the same as this value and that, given a limitation in the vertical axis, there may not be a significant advantage to rendering graphics elements like shape 2202 using a much finer resolution for representing edge location along the horizontal axis.

Surprisingly, as will be explained, considerable image edge quality can be preserved by enhancing horizontal resolution even ff vertical resolution remains constrained. An alternative and efficient technique for encoding image data is set forth below that is particularly applicable and beneficial in the context of the present teachings.

For a graphic pattern that is to be applied in a horizontally elongated manner, such as when wrapping around the entire circumference of an object, a rasterized representation quickly becomes unwieldy. For example, if an object such as a bowl or a bracelet having a diameter of 100 mm is to be formed with a graphic element that is 12 mm tall and pi*100 mm=314 mm wide, a straightforward raster image, such as a bitmap, would require 60 rows and 1582 columns or 60×1582 pixels. Even using this number of raster columns to index pixel values, a graphic edge with a slope greater than 1 would show jaggedness or a stairstep effect, significantly detracting from the graphics quality. If the horizontal axis were to use, say, five times as many columns, the jaggedness effect would only be partially diminished and yet the aspect ratio of the raster image data would be increased to 131:1 (width to height), making the source graphic difficult to produce or display using most common graphics manipulating tools. Maintaining a more reasonable aspect ratio, such as 4:3, would force a designer or user to obtain and represent graphic images in a large format, like 7910× 5932 (or nearly a 50 megapixel image), even though the 5932 rows would degenerate into only 60 rows that actually get printed. Even if this avenue is chosen for handling source graphic images, jaggedness will still be evident on some edges and this effect will be pronounced on large objects, such as object that are several hundred millimeters to several meters in linear dimension or in circumference. In practice, it has been discovered that even a comparatively high-resolution raster image leaves a residual jagged-edged appearance on curves and inclined edges.

In accordance with preferred embodiments, an alternative representation of a graphic element is used wherein the graphics-describing data is arranged into an integer number of rows that are the same as, or comparable in magnitude to, the integer number of printed layers over which the graphics will be formed while printing an object. An exact one-to-one correspondence between graphic rows and printed layers is useful but not essential as some interpolation techniques can derive a virtual row from two adjacent rows of raster data. Nevertheless, it is advantageous for image data to map directly in the vertical direction and this is more readily accomplished where graphics image data is originally obtained in a vector format without inherently having a finite row count. In a preferred method, each row of graphic data will comprise a sequence of locations at which transitions occur, such as between light and dark graphic states. Unlike row numbers, that may be indexed using, for example, a 16-bit integer value, the locations of transitions within a row may be encoded using high precision floating point values. Using the conventions set forth in IEEE Standard 754, for example, a 32-bit single precision value may represent the location of a graphics location to around 7 decimal places meaning that the location of a transition may be located within one ten-millionth of a normalized value. If the image data were in raster format and expected to express locations to this degree of precision, then the raster would have to have 10 million columns or use a run length coding technique. For even more precision, a 64-bit double precision value may represent a transition location to around 14 decimal places. Thus, horizontal resolution may be several orders of magnitude greater than vertical (row-counting) resolution. Encoding of only state transition locations is also far more compact for most simple graphics compared to full-width rows of pixels that undergo infrequent value changes along a row or scan line.

To illustrate the presently recommended method of encoding each scan line as an ordered list of transition locations, FIG. 22 shows several row-wise scan lines representative of a set of equally spaced scan lines that may totally encompass the height of the graphic and equally divide the 2D space. Where a graphic scene 2200 is not originally rasterized but rather described in terms of edge line segments or curves, it may be particularly useful to have each scan line correspond to a deposited layer. This may be achievable if the context for printing an object with the applied graphic effects is known beforehand in terms of position and scaling of the image relative to the object model as well as the per-layer height or deposition thickness that will be used by a printer. The image data for a graphic element may be in a non-raster form, such as in a Scalable Vector Graphics or 'SVG' file format.

In FIG. 22, horizontal scan line 2210a is seen to intersect shape 2202 along two edges—at a first point 2212 where the graphic pattern 2200 shifts from light to dark and at a second point 2214 where the graphic pattern transitions from dark to light. The exact locations of these intersections may be calculated and expressed in terms of a proportional coordinate normalized to the width of graphic pattern 2200. Note that a horizontal axis 2201 for pattern 2200 is labeled from 0.00 to 1.00. Inset view 2220 shows a close-up of where scan line 2210a intersects left side of shape 2202, which is expressed as a 'polyline' or series of vertices (see subset of vertices 2222a-e) defining a sequence of adjoining line segments.

Assume that each segment defining the edges of shape 2202 is described by two ordered pairs of coordinates (X0, Y0) and (X1, Y1) in a Cartesian coordinate system of pattern 2200.

To build a list of high-resolution locations of transition points, which may be sorted in left-to-right order, for example, the Y value of the scan line (Yscan) within the same coordinate system is compared against the Y0 and Y1 values of every segment that delineates light from dark within the entire pattern 2200. Any segments for which the value of Yscan lies on or between the Y0 or Y1 values are noted, and each segment is evaluated in terms of an X location 2213 at which the segment exactly meets the Yscan value. This may be calculated by linear interpolation and yields a high-resolution value. If a given scan line value identifies multiple intersecting segments across a graphic pattern, the segments are sorted in order of increasing X intersection value. This sequence of normalized edge locations produced for each scan row yields an image presentation that efficiently expresses graphics patterns that are of comparatively low resolution in a vertical axis but support exceedingly precise location along a horizontal axis.

Returning to the example of FIG. 22, a first scan line 2210a may intersect shape 2202 at a first location 2212 where the image transitions from light to dark and the precise horizontal location of the transition may be calculated to be, for example, a normalized value of 0.4785372. following further along scan line, a second transition in graphics state, from dark to light, is noted at location 2214 with a precise normalized location of 0.5783232.

Along an adjacent scan line 2210b, a different Yscan value is applied and the edge intersections detected may occur, for example, at locations 0.3859874 and 0.4991323.

These values may be encoded within a data file that may be stored or transmitted. Within a computing environment, these values may also be listed in an internal data structure in memory, such as a row-wise array of linked lists, with each linked list accommodating the variable quantity of transitions that may occur along a given scan line. In either case, the values may be organized as follows and may include initial state and transition type or sense as follows:

Row 88:
Initial state: Light
Transition Location: 0.4785372
Transition Type: Light-to-Dark
Transition Location: 0.5783232.
Transition Type: Dark-to-Light
Row: 89
Initial state: Light
Transition Location: 0.3859874
Transition Type: Light-to-Dark
Transition Location: 0.4991323
Transition Type: Dark-to-Light A detailed process for accepting image data in this form and combining this data with shape-defining polylines so that the desired graphic effect is applied to a constructed object is described in FIGS. 24A-24D and FIG. 25.

Figure 24A:
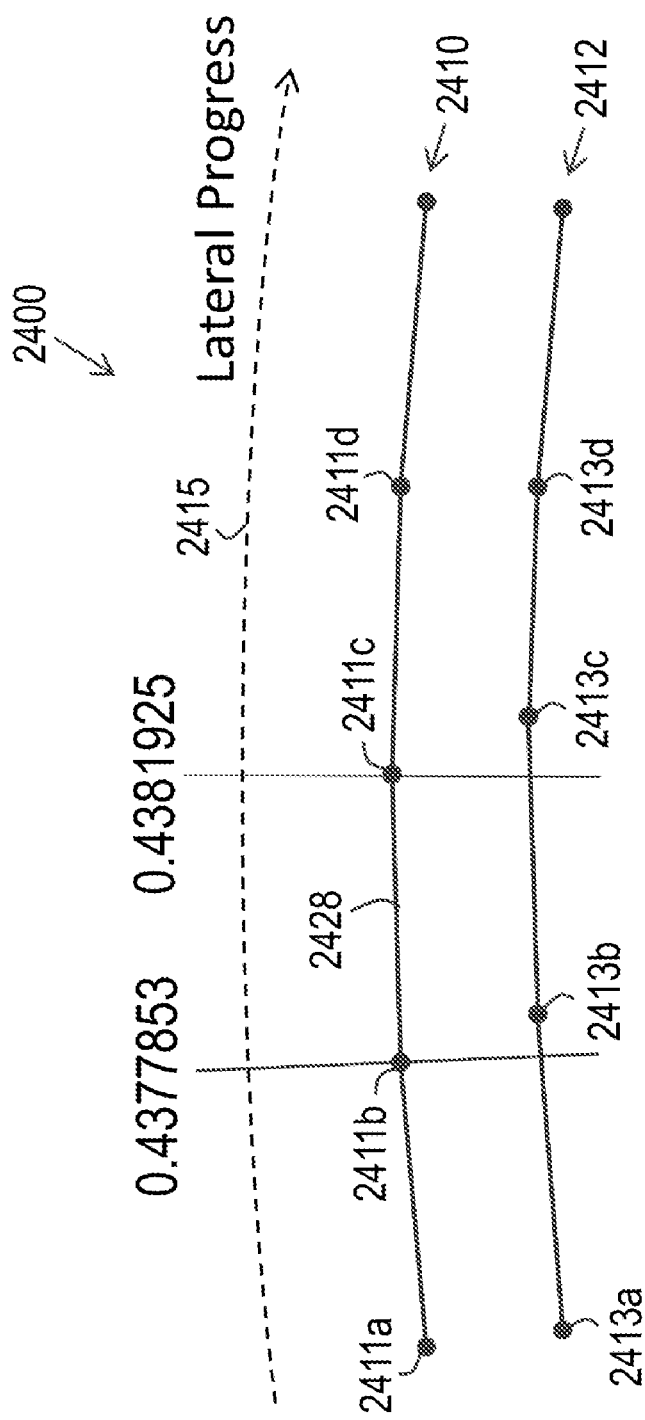
FIGS. 24A-E are plots of perimeter toolpaths and added waypoints calculated in response to image data in accordance with exemplary embodiments of the present teachings.

First, to conceptually describe how 2D image data encoded with such highly asymmetric resolution is combined with shaped toolpaths calculated from an object's design model, FIG. 24A shows a plot 2400 of an outermost toolpath 2410 that follows a designed contour for the object and a second, more inward toolpath 2412 that parallels toolpath 2410. More parallel toolpaths, typically calculated as a user-selectable number of wall layers or perimeters in most slicer applications, may be present as well but are excluded here for simplicity. In the course of slicing a triangle-tessellated model, a slicing process will compute polylines formed where the model's triangular facets intersect a plane having a specific elevation or Z-axis coordinate.

Each toolpath 2410 and 2412 is shown to comprise a respective set of waypoints 2411a-d and 2413a-d. Each waypoint is at a unique XY coordinate location within the slicing plane. Extrusion along toolpaths 2410 and 2412 may occur in any order, which may be user selectable. To form an object's surface in the conventional way, without the graphics features of the present teachings, an extrusion nozzle would simply deposit material while moving to each waypoint 2411a-d in sequence along toolpath 2410 and while moving to each waypoint 2413a-d in sequence along toolpath 2412.

To signify a convention for progressing in horizontal position as both a toolpath and graphic row are traversed, a 'lateral progress' legend 2415 indicates progression from left-to-right in FIG. 24, though the direction is entirely arbitrary and could refer to either left-right or clockwise-counterclockwise direction of moving across an object's surface in reality. FIG. 24A may be taken as looking at each toolpath and extruded trace from above or below and, in fact, either direction of printing while applying graphics content will generally work the same. However, it is important that the traversal across an object's surface and the traversal of ordered transitions in an image row must remain consistent with one another over the calculation steps that follow and within each layer over a build.

For every XY waypoint 2411a-d and 2413a-d, an additional numerical value is assigned that expresses the location of the point in terms of lateral progress. This value is preferably of high resolution to properly complement the high-resolution transition locations encoded in image data. In a scheme based on circumferential lateral progress (as in FIG. 21A), applicable to a cylindrical object or one having a substantial degree of rotational symmetry, such as a vase, a normalized circumferential value may be assigned to any point on the surface. This value essentially indicates, on a scale of 0.00 to 1.00, 'how far around' a point is located on the surface relative to a reference position. If an outer toolpath for an object has, at a given height, a circumference of 200.00 mm and a waypoint is located (as if wrapping a flexible ruler along the surface until encountering the waypoint) at a surface distance of 50.00 mm from a 0.00 reference line, then the normalized lateral progress coordinate for the waypoint is 0.2500. In practice, the length of each segment between pairs of waypoints is calculated along an entire outermost toolpath that encircles the object and a cumulative sum of all preceding segment lengths is recorded for each waypoint. Once a complete circular traversal is made of all waypoints in the toolpath, then the final cumulative length is noted and a second pass through all waypoints is taken to divide each cumulative length by the final cumulative length for the whole toolpath. By this procedure each waypoint becomes tagged with a unique normalized circumferential progress value that will be the basis for subsequent calculations explained below. This procedure is preferably done only for the outermost toolpath because the overall length of more inward parallel toolpaths may have a different cumulative length than the outermost toolpath. Thus, when a first point of an outermost toolpath is mapped to a nearest second point on a more inward toolpath, the normalized circumferential coordinates could be significantly different. Instead, the outermost toolpath and the associated normalized positional values are taken as the sole reference for measuring lateral progress and any corresponding points on underlying toolpaths are recommended to be calculated using perpendicular constructions from the outermost toolpath.

Though a surface or circumferential form of progress measurement has been thoroughly described thus far, it is possible to measure progress along a line in the XY plane (as in FIG. 21B), which will disregard the object's shape and effectively project a collimated image onto the object's surface. This may work especially well where the graphic feature is to be relatively small in size or where the surface of the object is relatively flat an parallel to the line that is serving as an axis of progress.

Other forms of progress measurement may be angular in nature, such as using cylindrical coordinates based on an axis at the center of an object. As shown in FIG. 21C, an azimuthal value sweeping across an angular range may address each point on the surface of an object while also indexing across a scan line of image data for controlling graphics effects. Spherical coordinates, either centered within the object model or at an exterior point may also be used. A longitudinal value may correspond to both lateral progress across an object surface and traversal of a scan line in image data. A latitude value may correlate to a build layer and to an image row. In each of the above approaches, a monotonic mathematical relationship can be established so that position on an object's contour can be mapped to a position along a graphic pattern, and vice-versa.

Note that, in FIG. 24A, some waypoints 2413 are not perfectly aligned under surface waypoints 2411. In some areas and for some shapes, there may happen to be some approximate alignment between waypoints 2411 and 2413 but this is not guaranteed when a slicer independently calculates each parallel or concentric perimeter toolpath.

In the example of FIG. 24A, waypoints 2411b, 2411c are shown to be assigned lateral progress coordinates of 0.4377853 and 0.4381925, respectively. These values are an example of a spatial range of positional values that lie along toolpath 2410. In the logic process that follows, these waypoints will generally be considered in ascending order of this coordinate value.

Figure 24B:
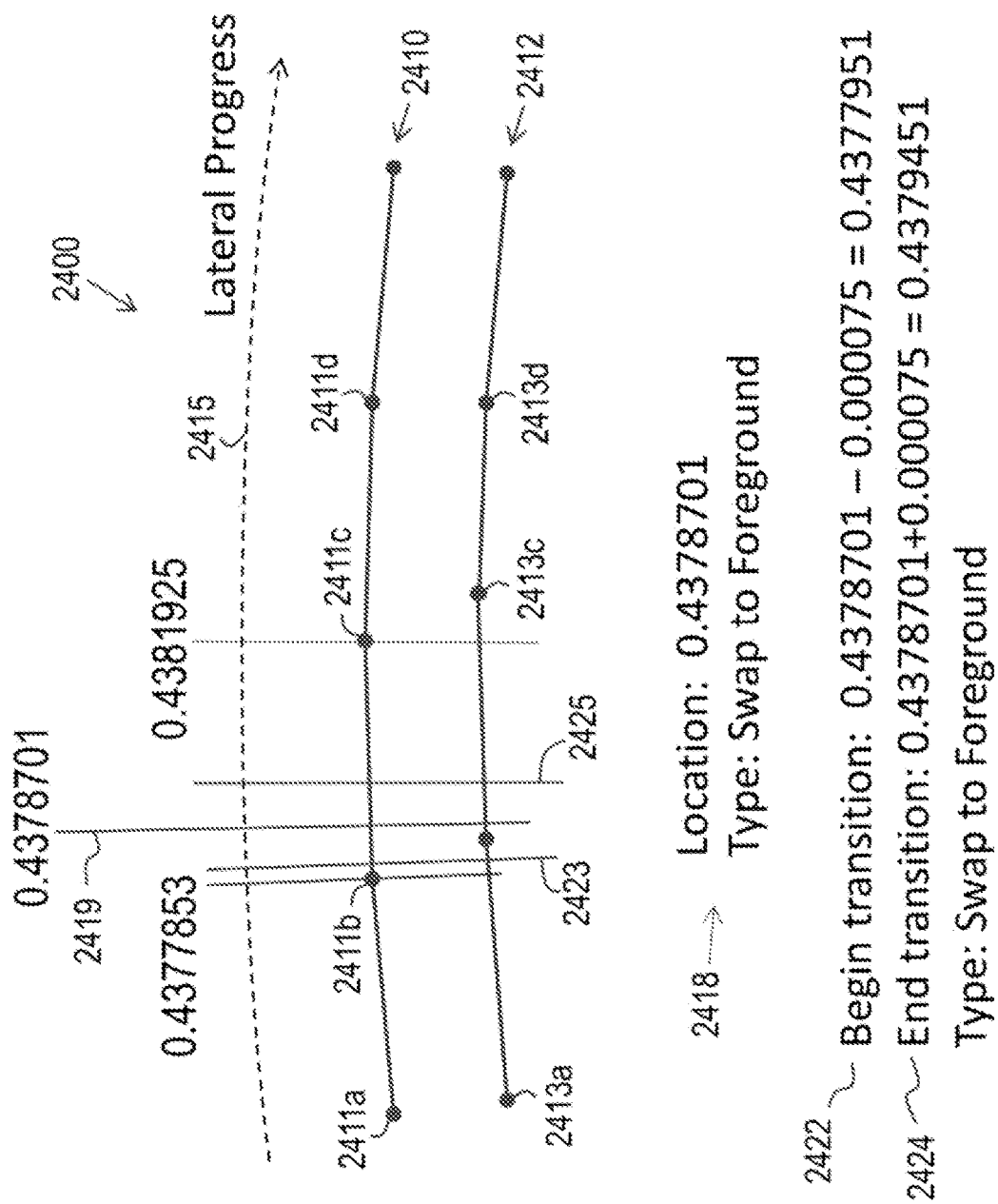

In FIG. 24B, plot 2400 is superimposed with two additional lines representing where a transition derived from image data compares to surface waypoints based on the common lateral progress coordinate used to both move through the waypoint sequence and to measure displacement across a scan line of image data. In this example, a transition may be listed in a data file or data structure that calls for particular graphics effect to take place on the surface of the object being constructed. In this case, a listed transition 2418 calls for a trace swapping effect of the type shown in FIG. 5C to take place where the lateral progress coordinate equals 0.4378701. The effect is to switch an extruded trace that is following toolpath 2410 to start following toolpath 2412 and vice versa. A first extruded trace that was following toolpath 2410 may be of one color considered a 'background' color, whereas a second extruded that was previously following toolpath 2412 may be of a color considered a 'foreground' color. Hence, the transition type is a swap that causes the foreground color to surface.

Plotted in terms of lateral progress, line 2419 shows where, in relation to the waypoints of toolpath 2410, the transition should appear on the surface of the object. In preparation for planning the transposition of extruded traces to create this effect, the nominal location of the transition is first split into two separate events located on either side of the nominal location. This provides turning points (see turning points 2015 and 2052 in FIG. 20) for the extruded traces so they cross one another at approximately right angles and result in a better appearance than if they were to both deposit material over the same perpendicular jump path between the toolpaths. To create an approximately 45 degree diversion away from one toolpath and onto the next, the interval between toolpaths is divided by the total outer perimeter length (explained in FIG. 24A) to calculate a delta value expressed in terms of a normalized progress value for the outer perimeter. Next, a begin-transition value 2422 and an end-transition value 2424 are calculated by subtracting and by adding the delta value. The positions indicated by these two values are indicated on plot 2400 by lines 2423 and 2425, respectively. These lines may be said to create a 'window' within which the swapping of traces will be accomplished.

Figure 24C:
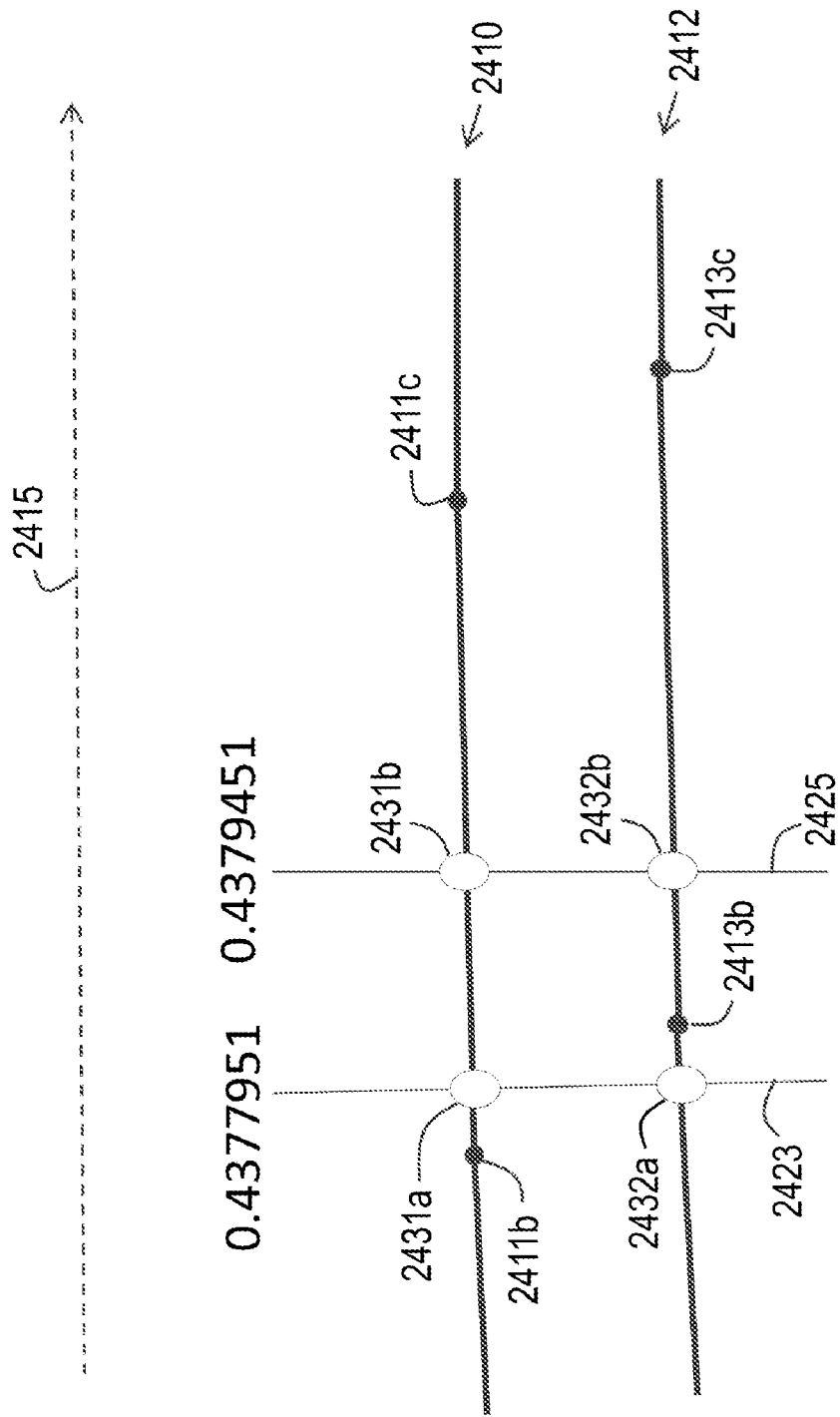

Next, as shown in FIG. 24C, the begin-transition and end-transition progress values are projected onto the segment between waypoints 2411b and 2411c by interpolation, resulting in synthesized waypoints 2431a and 2431b. These are two of the added waypoints at which extruded traces will divert onto or way from toolpath 2410 to implement the specified transition at the desired surface location. Another two new waypoints, 2432a and 2432b are also calculated to serve as turning points along toolpath 2412 but these must be calculated in a somewhat different manner, by perpendicular construction of points 2431a,b as explained previously.

Waypoints and cumulative circumferential distances along toolpath 2412 might not be the same as for a directly-above points along toolpath 2410. For each interpolated waypoint 2431a and 2431b, a nearest perpendicular point is calculated along toolpath 2412. As seen here, the nearest perpendicular point along toolpath 2412 'underneath' waypoint 2431a, is where a third waypoint 2432a is located. (Note that that nearest point on the adjacent toolpath does not fall between waypoints 2413b and 2413c but rather within the previous segment.) A similar process is used to calculate the XY coordinates of a fourth waypoint 2432b as the nearest corresponding point to waypoint 2431b.

At this point, XY coordinates for all four of the required turning points have been determined. However, one additional measure must be exercised. As a result of the trace-swapping transition being planned, one extruded trace must follow a waypoint sequence of 2411a, 2411b, 2431a, 2432b, 2413c, 2413d, etc. and a second extruded trace will be directed along a complementary sequence of 2413a, 2432a, 2431b, 2411c, 2411d, etc. Waypoint 2413b, which would normally be appropriate for a trace continuing along toolpath 2412 in a build without graphics effects, becomes extraneous and would only create problems if included in either of the extrusion paths. In general, any waypoints that were in the original shape-defining toolpaths but which fall within a transition zone (between lines 2423 and 2425) may simply be discarded. This is true for waypoints along any of the graphics-involved perimeters, not just the outermost perimeter.

Figure 24D:
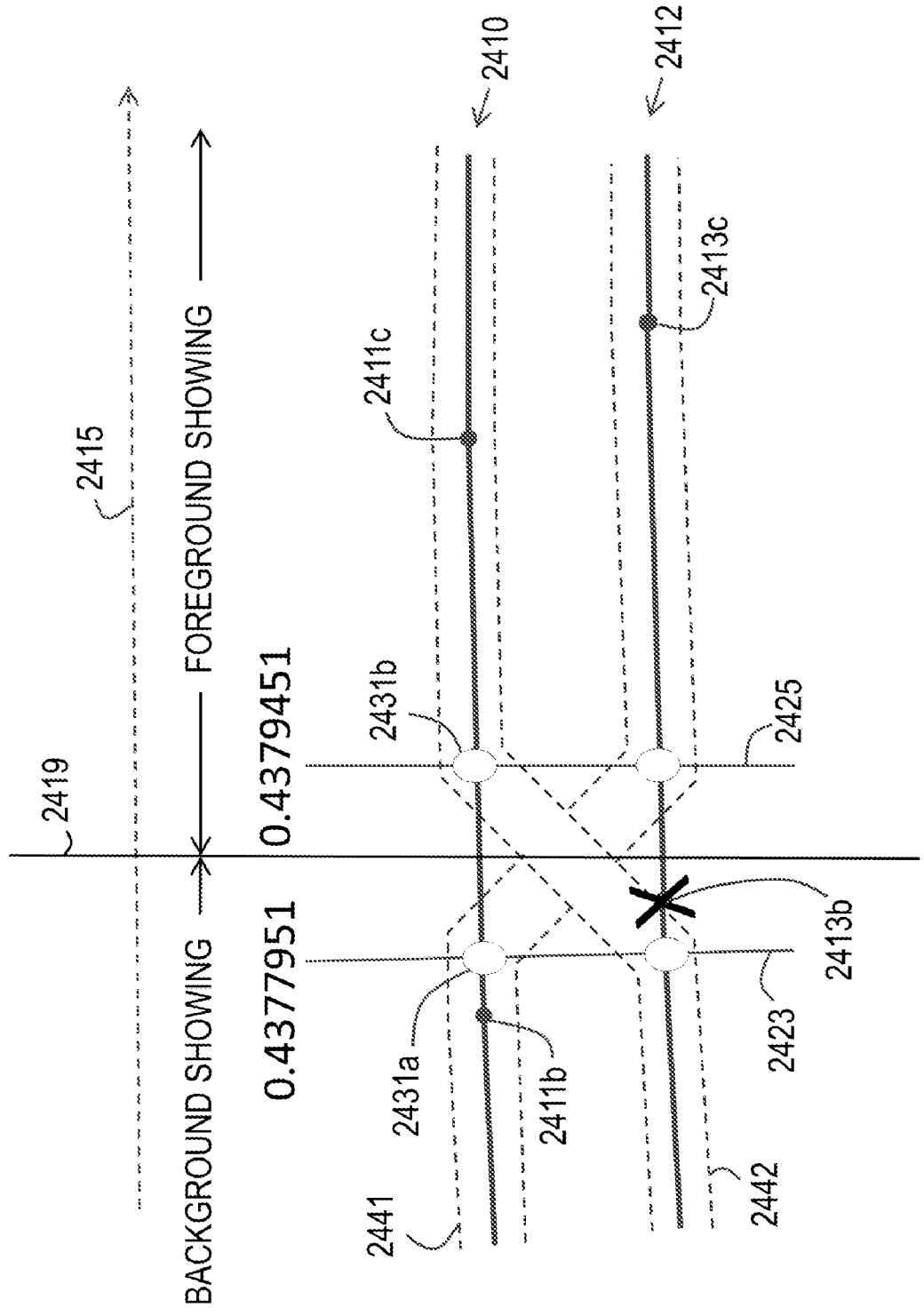

FIG. 24D reflects the elimination of the extraneous waypoint 2413b and is shown overlaid with the final extrusion pathways responsive to the specified transition type and location. First extruded trace 2441 and second extruded trace 2442 are deposited so as to effectively trade positions and present a visual transition at a specified location (see line 2419) on the surface of the object.

Figure 24E:
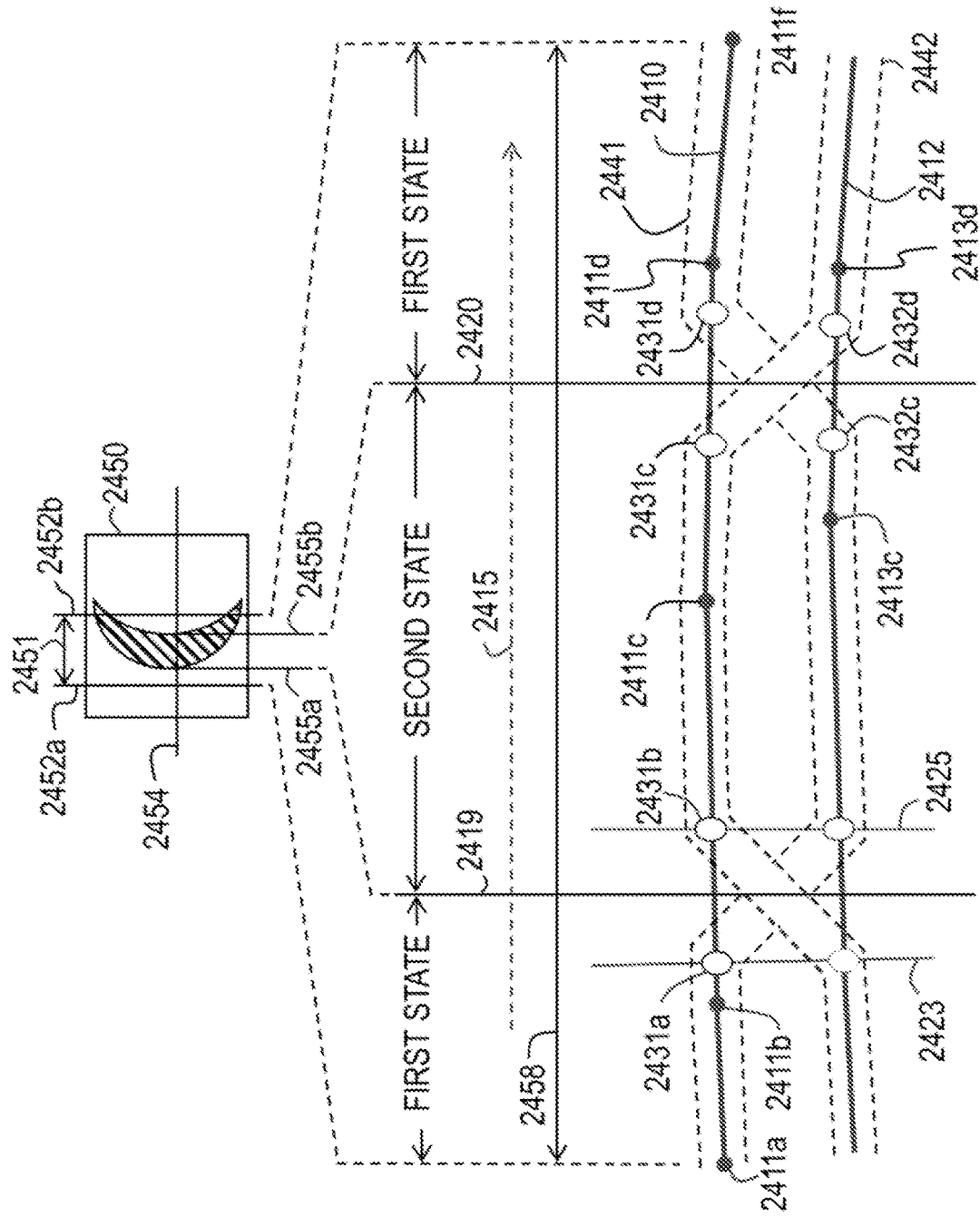

FIG. 24E expands upon the actions shown in FIGS. 24A-24D, demonstrating that, in addition to a first graphic transition indicated by line 2419, a complementary second transition in graphic state, indicated by line 2420, may be detected at a location further along progress axis 2415. The first graphic transition arises as graphical pattern data is examined along line 2454 and transitions from a light state to a dark state, the horizontal location which is indicated by line 2455a. The second graphic transition arises where graphical pattern data changes from a dark state to a light state, corresponding to line 2455b. The locations of the first and second transitions in terms of coordinates (which maybe normalized relative the overall width of graphical pattern 2450) define a graphical range of coordinate values 2451 over which the graphic pattern remains in a dark state. In the lower part of FIG. 24E, depicting shape-dependent perimeter toolpaths 2410 and 2412, an interval 2458 is shown (in parallel with progress axis 2415) to be bracketing by the positional coordinates of perimeter waypoint 2411a and 2411e. As shown here, this range of positional coordinates in the perimeter waypoints is mapped to a range of graphical coordinate values within pattern data 2450, denoted by lines 2452a and 2452b. Thus, any graphical coordinate value within interval 2451 may be directly mapped to a unique corresponding positional value along perimeter toolpath 2410. Likewise, any positional value along perimeter toolpath 2441 within interval 2458 can be correlated to a unique point within interval 2451 across graphic pattern 2450. This monotonic mathematical relationship may simply be linear and the interconversion between graphical coordinates in interval 2451 and positional values in interval 2458 may be by linear interpolation. Other, non-linear monotonic mathematical relationships are possible while still allowing direct interconversion. In FIG. 24E, interval 2451 is shown as a subset of coordinate values less than the full width of pattern data 2450. Interval 2458 is depicted as spanning only a small set of way points within a longer perimeter toolpath that may fully span an object's circumference and actually comprise hundreds of waypoints. The concept of establishing a mathematical mapping between the intervals shown is equally applicable to smaller intervals, such as between two adjacent toolpath waypoints, and to larger sets, such as when the entire circumference spanned by a perimeter toolpath is mapped to the entire width of a graphical pattern.

Interval 2460 over which the graphic pattern data 2450 is in the dark state, may be described as a graphically defined interval of coordinate values over which the graphical pattern data values correspond to the dark state. Based upon locations of the transitions that bound this interval (see lines 2455a, 2455b), a corresponding interval 2462 expressed in perimeter waypoint positional values can be calculated and may be referred to as a 'toolpath diversion range' as this is the vicinity at which waypoints within a toolpath are not included in a final toolpath and, instead, alternative waypoints are introduced that cause the nozzle to markedly deviate from an original perimeter toolpath, such as toolpath 2410. The numerical values expressing the locations of transitions (lines 2455a, 2455b) may be encoded as high-resolution values. As described earlier, graphical pattern 2450 may be expressed, encoded or received in terms of a finite number of row-wise lists, each list describing a series of transition locations using a notation capable of representing a far greater number of possible values than needed to address the finite row count along an orthogonal dimension of the graphical pattern data.

The act of including, within a final nozzle toolpath, one or more waypoints from a first perimeter toolpath that have positional values falling outside of a toolpath diversion range, as well as alternative waypoints that did not lie along the first perimeter toolpath and are at locations that would correspond to positional values within the toolpath diversion range, is apparent in FIG. 24E by following the finalized composite toolpath of extruded trace 2441. This same observation is characteristic of each of the example effect types presented in FIG. 5C and FIGS. 15A-15D. In some cases, as in FIG. 5C, FIG. 15A, and FIG. 24E, alternative waypoints are present as waypoints, or as interpolated points along segments therebetween, that have already been calculated in association with a different parallel perimeter toolpath. The positional values of these alternative waypoints along a progress axis are known or are calculable as described earlier. In other cases, such as in FIGS. 15B-15D, alternative waypoints deviate from the first perimeter toolpath but may not strictly adhere to any existing perimeter toolpath. Alternative waypoints deviate from the first perimeter toolpath in the sense of abruptly changing direction of nozzle travel or by shifting away from the first perimeter toolpath by a distance greater than about half of the width of an extruded bead or roughly half of the diameter of a nozzle through which material is discharged. The general effect is that, in one form or another, the graphical pattern data will have affected finalized toolpaths that will direct an extrusion deposition system printer, causing the graphical pattern to be visually apparent in some manner at the surface of the object when the object has been completely formed.

Returning to FIG. 24E, finalized toolpaths, which will direct the motion of one or more nozzles to deposit beads of material, are shown as paired dotted lines in which a first extruded trace 2441 is shown to follow a sequence of waypoints 2411a, 2411b, 2431a, 2432a, 2431b, 2411c, 2431c, 2432d, and 2413d. Over interval 2458, perimeter toolpath 2410 is shown to comprise waypoints 2411a-e. In intervals 2461 and 2463, where graphic pattern 2450 exhibits data values that indicate a first state, (and, conversely, outside of interval 2462 over which the graphical values are of a second state) the finalized toolpath for first extruded trace 2441 is shown to include waypoints that lied along perimeter toolpath 2410, such as waypoint 2411*c*. Within interval 2462, corresponding to the toolpath diversion range that was defined where graphical data indicated a second state, waypoints from perimeter toolpath 2410 are not included in the finalized toolpath. Instead, alternative waypoints such as 2432*b* and 2413*c* are introduced and have calculable positional values (in reference to progress axis 2415) that place them between the positional values indicated by lines 2419 and 2420. Some alternative waypoints may lie along another perimeter toolpath, in which case the path of the nozzle seems to temporarily 'switch tracks' in a sense.

A similar effect is evident in FIG. 20 as well, wherein an interval at which a data values in a graphical pattern are in a given state, shown in plot 2010, are reflected in the way that extruded trace 2041*c* selectively includes or excludes a complement of waypoints that originally lied along perimeter toolpaths 2031*b* and 2013*c*.

There may be wide variability in distances between successive waypoints, even within a single given perimeter toolpath. In some instances, there may be multiple graphics transitions mapping within single segment between shape-template waypoints or there may be many waypoints over a range of progress in which a graphic effect remains in a fixed state. The processes described in FIGS. 25-28 are designed or may be readily adapted to encompass all of these situations.

Figure 25:
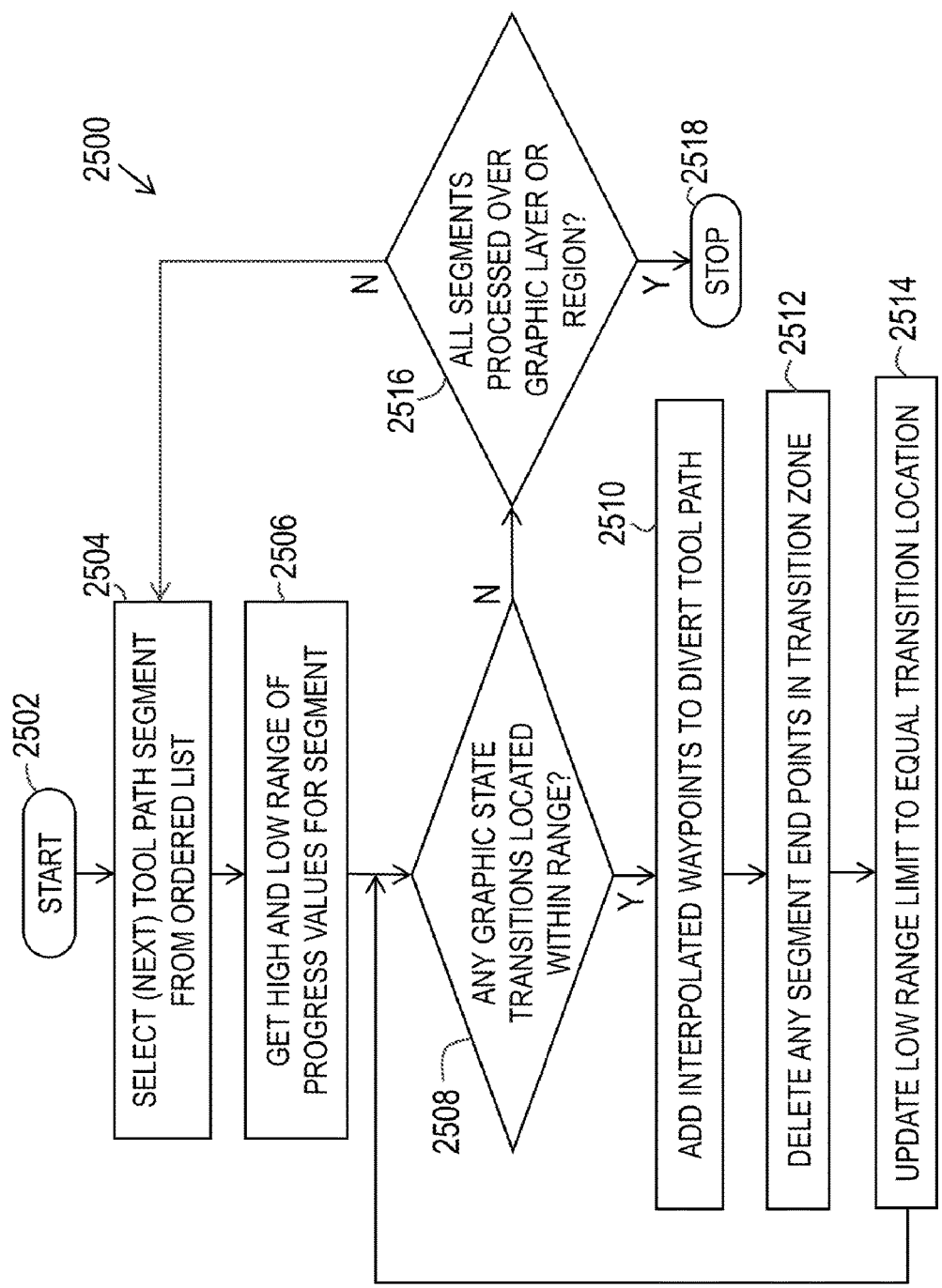
FIG. 25 is a flowchart of a process for sequencing through toolpath waypoints and applying image-driven modifications in accordance with exemplary embodiments of the present teachings.

FIG. 25 is a flowchart that more formally describes a process 2500 that was explained by way of an example scenario in FIGS. 24A-E. Process 2500 commences in step 2502 when the perimeters of a particular build layer are to be manipulated to implement a surface graphic effect that is specified by a listing of transitions with high-resolution location data. Execution immediately continues with step 2504 to select a particular segment (corresponding to one pair of adjacent waypoints) among the series of segments that form a complete perimeter cycle toolpath. As process 2500 proceeds for every segment, these will be taken in consistent ordering sequence, such as in order of increasing progress values as were explained in connection with FIG. 24A. Thus, once an initial starting segment has been selected, subsequent executions of step 2504 will select a 'next' toolpath segment that adjoins a previously process segment by sharing one waypoint and introduces a new waypoint that has a higher progress value than the previous segment's waypoints.

Using as a context the specific segment or pair of waypoints selected in step 2504, step 2506 is carried out to identify the lowest and highest progress values encompassed by the segment. A first-encountered waypoint will have already been encoded with a normalized progress value that will represent the low limit of the range, assuming that segments are being processed in order of increasing progress values. Likewise, the very next waypoint should have a higher progress value that establishes the highest progress value encompassed by the chosen segment.

Having determined the range of progress values currently under consideration, step 2508 is performed to search the transition locations listed for a row of image data and determine if any transition locations listed for the row fall within the low and high values obtained in step 2508. Using the earlier example, this action corresponds to detecting that transition 2418 had a location value between the respective location values of waypoints 2411*b* and 2411*c* (or within segment 2428 defined by these waypoints).

If, in step 2508, it is found that at least one transition location falls within the established range, then step 2510 is next performed to add waypoints, where needed, which may be offset on either side of the nominal location as indicated by lines 2423 and 2425. (A new waypoint may not be needed if an existing waypoint is already at the right location to serve as a turning point.)

Following step 2510, step 2512 is undertaken to delete any extraneous waypoints that fall within a transition zone, such as the zone between lines 2423 and 2425 in FIG. 24B. Recall that, in FIG. 24D, waypoint 2413*b* could be eliminated under these conditions.

After step 2512, step 2514 is performed to increase the low limit of the range of considered progress values up to equal the transition location identified in step 2508. This effectively allows the search for graphical transitions occurring within the segment to be reiterated while disregarding the one or more transitions that have already been noted and processed. Repeating the search for next transitions by returning the flow of execution to step 2508, while also shifting the low range upward as transitions are found, ensures that multiple transitions within a single segment range are detected and are processed in correct order. This looping continues until all transitions within the span of a segment have been processed and step 2508 becomes a false condition.

When the determination of step 2508 is negative, then execution proceeds to step 2516, where it is determined whether all segments in the outer toolpath (or at least all within a designated graphics-applicable range) have been processed as needed to create graphic features by rerouting of extrusion paths. If all appropriate segments have not been processed, then execution continues with step 2504 to select a next segment as a context for steps 2504 through 2514, already described. Alternatively, if, in step 2516, it is found that all segments have been processed, process 2500 is concluded in step 2518. Once process 2500 has acted upon sets of toolpath waypoints in combination with image transition data, then, in generating output movement commands for controlling extruder nozzles, any nozzle that moves from left to right along waypoint 2411*a* will execute the inward transition shown in FIG. 24D and any complementary extruder path passing through waypoint 2413*a* will cross over to an outward toolpath and pass through waypoints 2411*c,d*.

As described above, a graphic feature may be described in terms of finite rows of data, each row comprising an ordered listing of transitions along the row with locations indicated using a high precision digital representation. The breadth of an image, such as graphic pattern 4400 shown earlier, maybe indexed by a normalized value ranging from 0.00 on the leftward extreme to 1.00 on the rightward extreme. This may be regarded as a measure of horizontal progress as one coordinate to describe the location of an edge feature within the graphic pattern.

The surface of an object being constructed may also have, for example, a form of lateral progress measurement. One form of referencing location across an object may be a normalized circumference value described earlier. It is important to acknowledge that the traversal in progress from 0.00 to 1.00 within image data may or may not correspond to full traversal of the circumference of the object. If a graphic feature is intended to fully wrap the circumference of the object, then a direct mapping is workable. For example, an edge in the image data that is at a normalized location of 0.25000 will appear at a point that is one quarter of the way around the perimeter of the object.

Alternatively, a graphic pattern may be scaled and offset so that only affects a portion of the object's surface, such as a 25 mm square logo might be applied to the side of a cylindrical canister that is 300 mm in circumference. The canister may have a seam or side handle where graphics are unnecessary and these features may correspond to reference starting and ending points for a circular toolpath forming the walls of the canister. Assuming that the graphic is to appear exactly opposite the seam or handle, then the logo's horizontal progress might be 're-normalized' to span from 0.458 as the far left coordinate and 0.542 for the far right. The logo graphic pattern will effectively have been horizontally scaled by to fit within 25 mm, or 0.083 times the overall object circumference, and to be positioned to start at 0.458 times the object circumference, causing the center of the logo to occur midway around the object.

Vertical positioning and scaling may also be applied but are implemented differently. The lowest point on an object's surface at which a graphic effect begins to appear is simply controlled by how many layers are printed before beginning to apply the lowest row of image data to the diverting of extruded traces. This amounts to controlling vertical offset. Where a graphic pattern is presented in a vector format, the graphic may simply be scaled to match its final size before it is sampled by horizontal scan lines that each correspond to a vertical increment or build layer.

In all of the examples presented herein, a combination of scaling and offsetting may be applied to control where a graphic effect is applied to an object's surface. Where a 1:1 proportioning between fully traversing the width of an image and fully circumnavigating an object's surface at a given build height has been shown for simplicity, this should not be construed to limit implementations of the present teachings to a 1:1 proportioning.

As the comparison of lateral progress values between graphics data and object toolpaths occurs (as in step 2508) scaling and offsetting may be applied.

Figure 26:
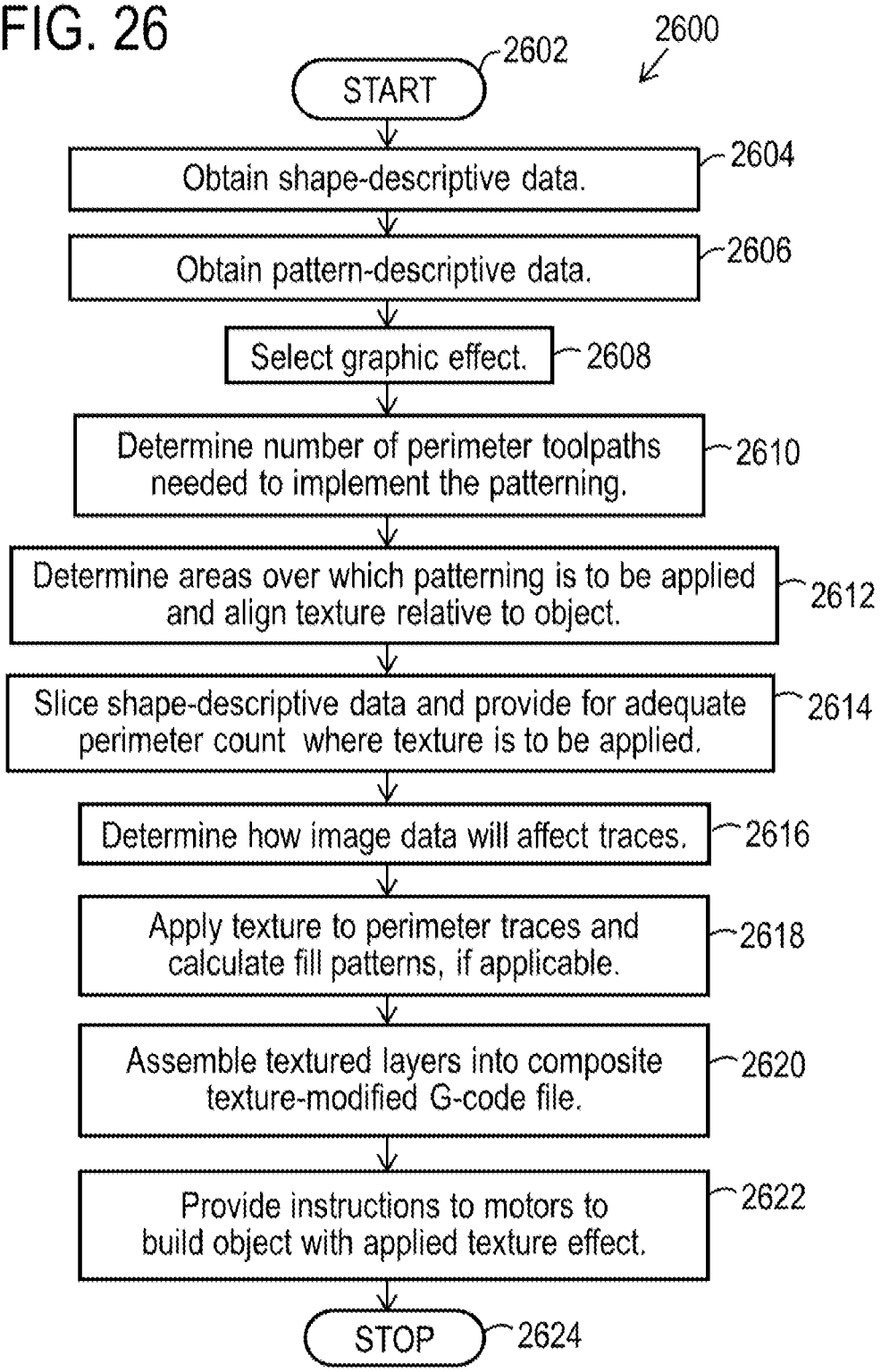
FIG. 26 is a flowchart of a process for applying image data while a slicing engine processes model data to forming toolpath instructions in accordance with exemplary embodiments of the present teachings.

FIG. 26 is a flowchart of process 2600 applying image data with shape descriptive data model in the course of a slicing operation, consistent with the scenario depicted as a block diagram in FIG. 99A. Process 2600 is not typical of existing slicer applications but rather applies to a slicer that has been modified, equipped or adapted to implement image-modulated perimeter toolpaths and other measures as taught herein.

Process 2600 commences with step 2602 upon the need to create toolpath instructions for forming an object with included surface graphics effects. Execution then proceeds directly to obtaining shape-descriptive data, in step 2604, and pattern-descriptive data, in step 2606. The shape-descriptive file may be in the form of, for example, an STL data file or the like. The pattern-descriptive data may be in the form of, for example, a bitmap file, a vector graphics file or an alternative form having high horizontal resolution as was described earlier in connection with FIG. 22. The act of obtaining pattern-descriptive data may optionally include procuring data that describes a mask shape corresponding to mask 1815 or mask data 1915 introduced earlier. The actions in steps 2604 and 2606 may be performed in any order and together establish the context of particular shape-descriptive and pattern-descriptive data sets that are to be combined in subsequent steps of process 2600.

Shown by way of example to be next in execution, step 2608 relates to selecting from among different types of surface graphics effects, such as the effects depicted in FIG. 5C and in FIGS. 15A-15D. In step 2610, the quantity of perimeters needed to implement the selected surface graphics effect is determined, such as by table lookup. Note that different graphics effects may have different requirements for minimum perimeter counts. The transposing of traces shown in FIG. 5C may be applied among as few as two perimeter toolpaths whereas the subtexturing effect shown in FIG. 15A ideally works with four or more perimeter toolpaths as candidate toolpaths for routing a lesser number of deposited traces.

Step 2612 pertains to establishing a position and scaling of the pattern graphics and applicable masks relative to the object model. (Refer to the view shown on workstation 1730 shown earlier.) This establishes a graphics-implementing region or 'multiple extrusion region' as described earlier. In some implementations, the requirement for sufficient perimeter count and provision for graphics features may only be applicable over a limited region of the object surface. Alternatively, the entire object surface may be graphics-defined, though the outer surface may be largely unaffected while the graphic pattern data remains in a single state. In the case of a trace-swapping graphics technique shown in FIG. 5C, the majority of the circumference of an object may simply be encoded as SWAP BACKGROUND state, meaning that the background color remains prominent and the foreground color remains submerged until graphics are to appear. The foreground color may also be selectively deposited over less than the entire circumference of the object and more selectively across a lateral span where graphics are applicable.

Shown next in execution order, step 2614 may be performed to slice the model file in a conventional manner, with consideration for the minimum number of outer perimeters determined in step 2606. An outer wall perimeter count is a user-selectable parameter in many existing slicer applications. Step 2614 is shown to be performed after step 2612 but could be performed before then, at any time after the required perimeter count has been established as in step 2610.

Step 2614 preferably produces raw candidate toolpaths comparable to those shown in FIG. 24A. Note that step 2614 need only calculate toolpaths assuming a single extruder will be used. Later processing steps will augment the resulting toolpath commands to appropriately handle multiple extruder nozzles with assignments to specific extruded traces.

Shown by way of example to be executed next, step 2616 involves assigning specific ones of the extruded traces from multiple extrusion nozzles to specific roles in whichever graphics-rendering scheme was selected in step 2608. For example, where a trace-swapping surface graphics effect as in FIG. 5C is to be used, a first nozzle will deposit a background color corresponding to trace 532 and a second nozzle will deposit a foreground color corresponding to trace 530. In another example, an image file may control the movement of extruded traces to implement a subsurface graphic effect and various values in graphics pattern image data may control the inward and outward shifts of each trace. Ranges of scalar values in image data or separate values in tuples such as RGB values may control the outward protrusion state of traces 1510a and 1510b in FIG. 15B. Step 2616 may also involve assigning a polarity or sense in which a light-dark value in image data causes either a light/dark or dark/light appearance in the finished object.

Upon completing step 2616, step 2618 is undertaken, involving a process such as that shown in FIGS. 24A-E and FIG. 25, to combine the shape-defining candidate toolpaths with the image data. Once slicing and image-driven modification of toolpaths has occurred for a plurality of build layers, the resulting modified toolpaths are re-assembled in step 2620 to form a complete set of toolpath instructions for forming the modeled object. A slicer application adapted to perform one or more of the processes taught herein, may combine or integrate the above steps in various ways, resulting in a final assembly of toolpath commands (G-code) to create the finished part with surface graphics. In the course of 'restacking' the toolpaths for each layer after modification applied in step 2618, it may be necessary to recalculate extruder control commands and to insert extruder-changing commands that would not have been relevant in the single extruder slicing done in step 2614.

The final substantive step 2622 represents providing the instructions from step 2620 to an additive manufacturing device and performing a build process to create the solid object based on the shape-describing data, the image data and the settings determined in step 2608, 2612 and 2616. The instructions may be provided to a point of manufacture directly and immediately or they may be communicated remotely or stored. The complement of instructions may be distributed to multiple machines or may be provided to a given machine in multiple instances over time. After preparing the instructions in steps 2604-2620 and optionally transmitting or storing the instructions, process 2600 concludes in step 2624.

Figure 27:
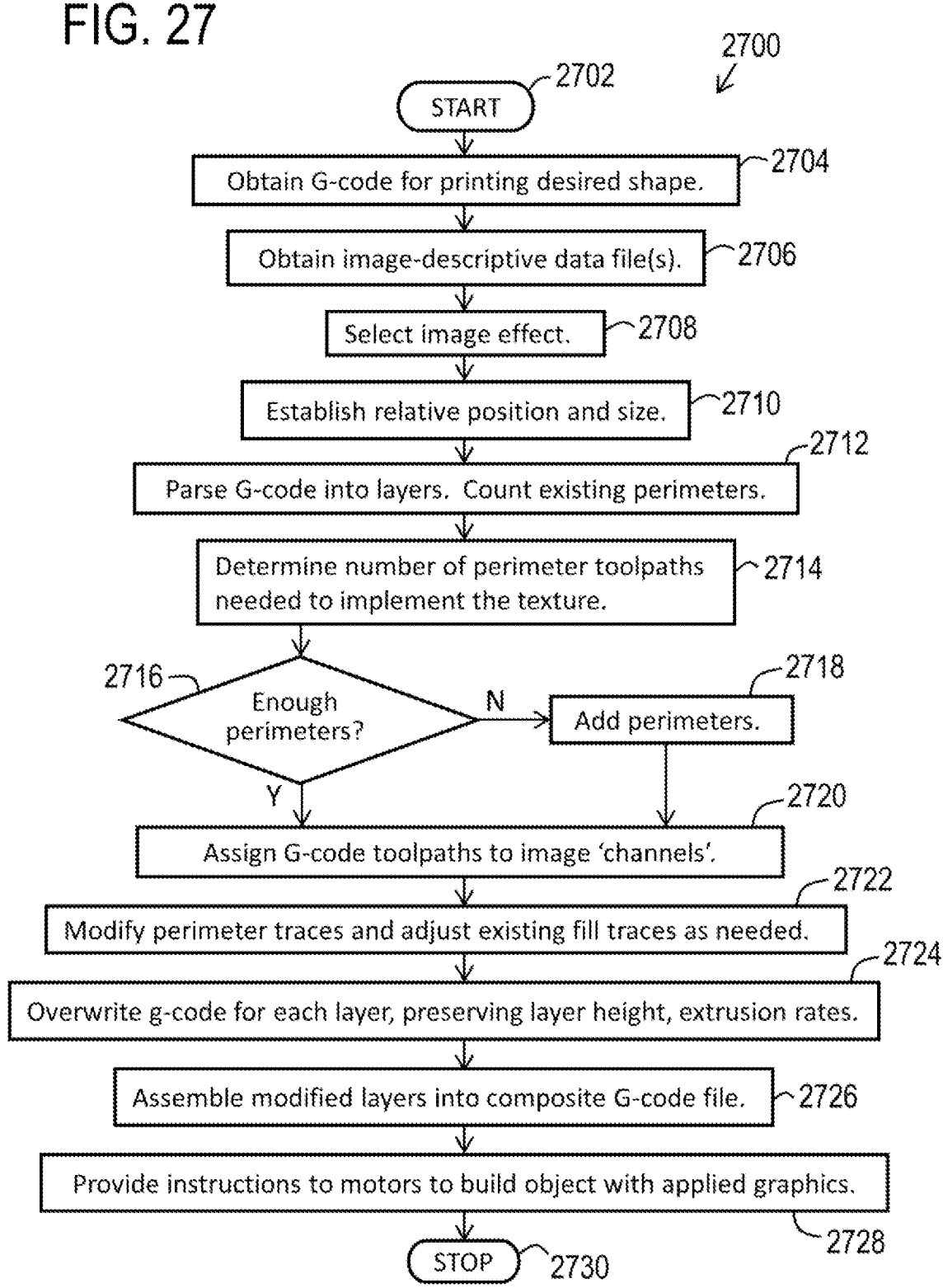
FIG. 27 is a flowchart of a process for applying image data to modify toolpath instructions that have been generated by a slicing engine in accordance with exemplary embodiments of the present teachings.

FIG. 27 is a flowchart of process 2700 combining image data with a shape descriptive data model by manipulating a set of motion instructions that have already been produced by a slicing operation, consistent with the scenario that was depicted as a block diagram in FIG. 19B. Process 2700 enables changeable graphics to be applied to an object without revisiting the slicing process.

Process 2700 begins, as signified by step 2702, upon the need to apply a graphics effect to a body of data comprising toolpaths by which an additive process will form a three-dimensional object. Execution proceeds immediately to step 2704 to obtain the toolpath data, such as in the form of a G-code file that has been produced, for example, by slicer application 1930 in FIG. 19B.

Step 2706 represents obtaining one or more image-descriptive graphics files which may serve as a complete self-contained images to appear on the object's surface or may comprise textural and mask image components to be combined as described in FIG. XXX.

In step 2708, a particular graphics effect is selected from among, for example, the perimeter transposing effect of FIG. 5C or the various other effects depicted in FIGS. 15A-15D. Step 2708 may involve user intervention to select a graphic effect or may simply be a preprogrammed or default effect type. The selection of a graphic effect type may be modal, meaning that, once it has been set, it may persist over several invocations of process 2700, such as when a given shape is to be constructed multiple times but with varying surface designs.

Although steps 2704, 2706 and 2708 may be depicted in one possible sequence as shown in FIG. 27, it is important to recognize that these actions are not strictly ordered or dependent upon one another. However, steps 2704 and 2706 must have been done early enough to set a context for step 2710 and step 2708 must be performed (or at least the graphic effect type must be somehow established or hard coded) in preparation for step 2714.

Step 2710 corresponds to establishing a position and scaling factor to control where a graphic effect will appear relative to the object model. This may be adjusted by use of a user interface as depicted in FIG. 17 or may be fixed or adjusted by numerical input, such as by data values in a configuration file. In some cases, an image descriptive file may be sized or automatically scaled to completely encircle an object model, in which case the positioning and scaling are taken to be inherent. In yet other instances, data that accompanied the original model file that was sliced may express the locations of graphics-eligible regions on the model.

Step 2712 pertains to dividing the G-code instruction data from step 2704, which is organized in a sequence of layers from bottom-to-top, into separate layers and, for the toolpaths within each layer, identifying those toolpaths that form outer wall perimeters. The quantity of outer wall perimeters is either determined or, if already known, is provided as input to process 2700.

Depicted next, step 2714 pertains to determining the number of perimeters required to implement the graphics effect types that was selected in step 2708. As evident in FIG. 15, different effect types operate with different numbers of outer perimeters. In step 2716, the count of existing perimeters from step 2712 is compared to the required number of perimeters from step 2714. If more perimeters are required than are already present, then execution proceeds to step 2618 to add perimeters, such as by a process explained in connection with FIG. 16.

Once an adequate number of perimeters are present, either as deemed initially by step 2716 or by the adding of perimeters in step 2718, then execution continues with step 2720, as necessary to configure how data values image data will be mapped to different possible perimeter manipulations. For example, if a graphic effect is involves transposing traces as depicted in FIG. 5C and image data is expressed in terms of a binary state, such as light or dark areas, then the light image data values may signify where a background-colored extruded trace should be the outermost and dark image data values may signify where foreground-colored extruded trace should form the object surface. Step 2720 may correspond to choosing between this sense and an opposite sense wherein light image data causes a foreground colored trace to surface. Step 2720 may also apply to more complex mappings, such as when an effect depicted in FIG. 15B involves multiple, independently controlled perimeter diversions. Step 2720 may correspond to assigning specific ranges in a scalar pixel value to differentiate when one or two traces are displaced outward or, alternatively, to assigning 'channels' in RGB-encoded data such that the 'R' byte controls displacement of an outermost trace and the 'G' byte controls protrusion of a next-inward extruded trace.

Performed next, step 2722 involves modifying the toolpaths followed by extruded traces as was explained in FIG. 20 and elsewhere. This step is essentially applying the image data to the existing toolpath points and repeating this process for each graphics-involved build layer. Step 2722 may also involve adjustments to fill paths (see FIG. 16B) caused by image data, if any. For example, although the effect depicted in FIG. 15C is shown with a recommended inward perimeter that parallels the outer contour, it is possible to create the effect when only a single perimeter is used. If a sparse infill is also being used, then any image-driven inward excursions would necessitate modifying any contacting infill traces.

In step 2724, processing each layer-wise set of toolpath points for the outer perimeters and infill as just described creates a derivative set of G-code XY coordinates to replace the original ones. The layer height and extrusion rates in the original G-code (step 2704) can be carried over in the replacement G-code, whereas the incremental extruder position values must generally be recalculated based on the newly generated XY movement commands.

Next, in step 2726, the replacement G-code sets are assembled into a complete bottom-to-top command sequence capable of directing an extrusion 3D printer to build the object with the graphics effects included. This is generally just an in-order concatenation of the layer-wise G-code commands processed in step 2724 but with extruder change commands, extruder re-initialization and feed rates added where necessary.

Finally, step 2728 represents providing the instructions from step 2726 to an additive manufacturing device and performing a build process to create the solid object based on the shape-describing data, the image data and the settings determined in step 2708, 2710 and 2720. The instructions may be provided immediately or may be communicated or stored. The complement of instructions may be distributed to multiple machines may be provided to a given machine in multiple instances over time. After preparing the instructions in steps 2704-2726 and optionally transmitting or storing the instructions, process 2700 concludes in step 2730.

Figure 28:
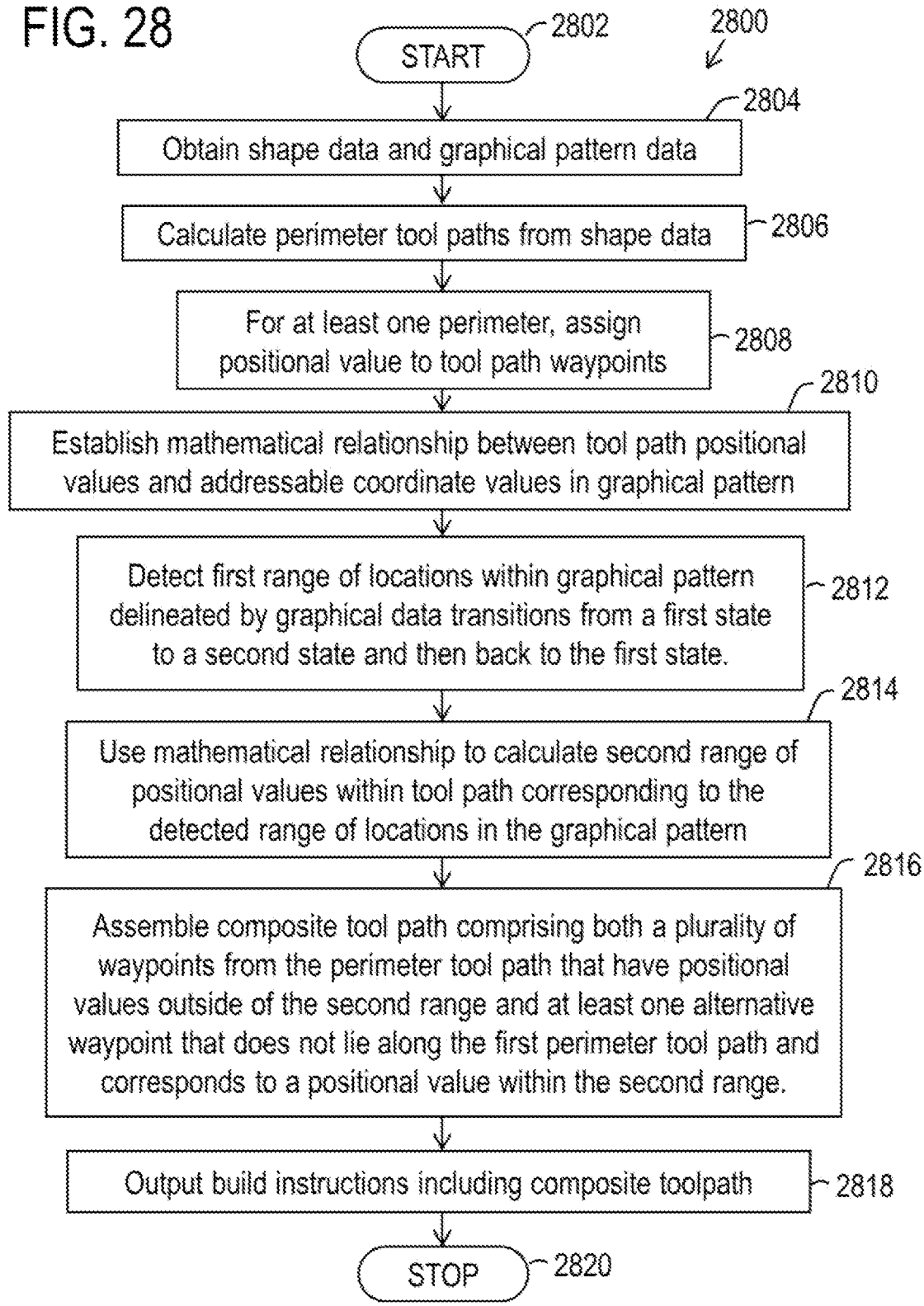
FIG. 28 is a flowchart of a process for producing a composite toolpath having alternative waypoints responsive to detecting an interval within a graphic pattern data set in accordance with exemplary embodiments of the present teachings.

Turning to FIG. 28, a flowchart for process 2800 is presented for combining shape data and graphic pattern data in a manner related to processes 2500, 2600, 2700 but set forth in terms of intervals delineated by paired transitions as depicted in FIG. 24E. Process 2800, for preparing additive manufacturing build instructions, may be applied in the context of an extrusion deposition modeling process for constructing a solid object by depositing successive layers of material upon a build plate, to be performed by a system comprising at least one extrusion nozzle for extruding the material and a plurality of motors for creating relative motion between the extrusion nozzle and the build plate.

Similar to process 2600, process 2800 is initiated at step 2802 upon the need to create toolpath instructions for forming an object with included surface graphics effects. Execution immediately continues with step 2804 to obtain, as a first data set, shape data, such as an STL file or other digital data model describing the shape of the object in three dimensions. Step 2804 also involves obtaining graphical pattern data as a second data set to be processed.

Next, in step 2806, a slicing software application in a computing environment may be used to perform a slicing operation upon the first data set to calculate, for a build layer, one or more perimeter toolpaths paralleling an outer contour according to the shape information represented in the first data set, each perimeter toolpath comprising an ordered set of waypoints, and segments defined therebetween, arranged for moving an extrusion nozzle to deposit material in compliance with the shape information. In an alternative implementation, the calculation of perimeter toolpaths may take place externally to process 2800 and step 2806 may represent the act of receiving the perimeter toolpaths, such as in the form of G-code instructions or the like.

Once perimeter toolpaths have been calculated, extracted from a G-code list, or otherwise obtained, step 2808 is executed to assign unique positional values to perimeter toolpath waypoints. As mentioned previously, one way to assign a positional value to a given waypoint is to maintain a cumulative sum of the lengths of segments traversed in moving sequentially through previous waypoints along the toolpath. In this manner, the positional value relates to a circumferential progress in following the contour of the object. Consequently, a positional value does not necessarily equate to either the X or Y build space coordinate for a given waypoint and should not be confused as such.

Executed next, step 2810 involves establishing a mathematical relationship between toolpath positional values assigned in step 2808 and addressable coordinate values in along at least one addressing dimension of the graphical pattern data. For example, a range of normalized positions along a horizontal dimension of a graph pattern spanning from 0.2500 to 0.7500 may be mapped to a portion of a perimeter toolpath bounded by positional values spanning from 0.4620 to 0.5632. Upon setting up a linear, monotonic relationship between these two ranges (one spatial and one graphical), a transition in the graphical pattern data that is located at 0.5000 horizontal position (halfway between 0.2500 and 0.7500) may be determined, by proportioning or interpolation, as uniquely corresponding to 0.5126 in positional value (halfway between 0.4620 and 0.5632) measured along the toolpath.

Establishing a mathematical relationship is significant because the graphic file coordinates and perimeter toolpath positional values are not inherently coordinated or predictably related. These data sets are of divergent types, and likely from different sources and times of creation. Furthermore, circumferential-type positional values may start at an arbitrary location on an object and are generally selected by an end user or designer upon matching a graphical pattern to a shape. A user or designer may, by placing and scaling a graphic onto an object as shown in FIG. 18, effectively establish a mathematical relationship that is memorialized during computation in a computing environment as either a scale factor paired with an offset value or as the set of explicit range endpoints in each domain. Actions such as writing into locations in a computer's data memory the limit values for each range or, alternatively, a scale factor and offset value to implement an equivalent conversion formula, or the invocation of a conversion function call, or otherwise demonstrating an ability to compare values and interconvert between the values in either range signifies the presence of a mathematical relationship. The ability to interconvert, even if the full range of one domain spans the full range of the other, signifies that a mathematical relationship exists (at least as to directional sense) where none previously existed. Step 2810 need not include an invocation or confirmation of the interconversion. The interconversion may be proven to have been made calculable as other processing steps, such as in process 2500, indeed call for the interconversion relying on range limit data or the like mentioned above.

Once a mathematical relationship allows for conversion between graphical transition location and perimeter toolpath positional values, then step 2812 is performed (and possibly repeated within a row as a graphical pattern data changes states numerous times) to detect transitions among first and second states of graphical data and more particular to identify intervals over which the graphical data is in a second state. Where a graphical pattern depicts binary data values arranged to be addressable in two dimensions (such as pixel values are arranged in a 2-color bitmap), a first state may simply correspond to a data value of false and a second state may correspond to a data value of true. However, not all graphical patterns hold simple binary values. If a graphical pattern encodes data values as 8-bit numerical values, a range of data values, such as 0-127 decimal may be interpreted as a first state whereas values of 128-255 decimal may indicate the second state. The threshold between a first state and a second state may be arbitrarily set by a user and may even be reversed in sense. A graphical pattern may be provided as an 8-bit grayscale image and the user may adjust the threshold that distinguishes first and second states to achieve a desired visual effect. Still other schemes are possible for defining state transitions based on graphical pattern data values, such as interpreting transitions from only one 8-bit color 'channel' within a 24-bit RGB color representation. Thus, transitions in graphical data detected in step 2812 are not limited to being just any change in numerical data values nor are the first and second states limited to being represented by two specific numerical values in graphical pattern data. The result of performing step 2812 is determining, within the graphical range of values, at least one first graphical pattern transition location as a coordinate value at which data values transition from a first state to a second state and at least one second graphical pattern transition location as a coordinate value at which data values transition from the second state to the first state, the first and second graphical pattern transition locations defining the endpoints of a graphically-defined interval of coordinate values over which the graphical pattern data values correspond to the second state.

In step 2814, the transition locations defining the graphically-defined interval of coordinate values as determined in step 2812 are mapped to positional values based upon the mathematical relationship that was established or made calculable in step 2810. In other words, step 2814 involves applying the monotonic mathematical relationship to determine what may be termed a 'toolpath diversion range' as a range of positional values along the spatial range that correspond to the graphically-defined interval that was determined in step 2812.

Depicted next, step 2816 relates to assembling a composite toolpath, as build instructions to be dispatched to an extrusion deposition machine, that comprises a plurality of points that lie along a first perimeter toolpath (see step 2808) and have positional values outside of the toolpath diversion range, and, for positional values that fall within the toolpath diversion range, comprises at least one first alternative waypoint that does not lie along the first perimeter toolpath. The earlier discussion of FIG. 24E sets forth an example of a finalized toolpath causing an extruded trace to follow some waypoints from a first perimeter toolpath 2441 and to include alternative waypoints subject to changes in graphical pattern data states. Once a finalized composite toolpath has been assembled in step 2816, then step 2818 involves including the composite toolpath, along with possibly other similarly assembled hybrid toolpaths, into an output data set comprising motion instructions for directing a machine to build the object according to the shape information in the first data set. By virtue of the actions of steps 2812, 2814, 2816, these instructions will cause the manufactured object to be shaped according to the shape data while also including surface graphics effects as a function of the graphical pattern data.

In the preceding description, various exemplary embodiments have been described with reference to the accompanying drawings. It will be evident, however, that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. In an extrusion deposition modeling process for constructing a solid object by depositing successive layers of material upon a build plate, performed by a system comprising at least one extrusion nozzle for extruding the material and a plurality of motors for creating relative motion between the extrusion nozzle and the build plate, a method comprising the steps of:
   obtaining, as a first data set, motion instructions, calculated from shape data about the object and comprising, for at least one layer to be deposited, one or more perimeter toolpaths paralleling an outer contour according to the shape information, the perimeter toolpaths comprising an ordered set of waypoints, and segments defined therebetween, arranged for moving an extrusion nozzle to deposit material in compliance with the shape information for the object;
   obtaining a second data set describing a graphical pattern of data values as a function of at least two dimensions;
   establishing a unique positional value for at least two points that lie along at least one perimeter toolpath;
   establishing a monotonic mathematical relationship between a spatial range of positional values of points that lie along the first perimeter toolpath and a graphical range of values of a coordinate along at least one dimension of the graphical pattern;
   determining, within the graphical range of values, at least one first graphical pattern transition location as a coordinate value at which data values transition from a first state to a second state and at least one second graphical pattern transition location as a coordinate value at which data values transition from the second state to the first state, the first and second graphical pattern transition locations defining the endpoints of a graphically-defined interval of coordinate values over which the graphical pattern data values correspond to the second state;
   applying the monotonic mathematical relationship to determine a toolpath diversion range as a range of positional values along the spatial range that correspond to the graphically defined interval within the graphical range;
   assembling a finalized toolpath that comprises a plurality of points that lie along the first perimeter toolpath and have positional values outside of the toolpath diversion range, and, for positional values that fall within the toolpath diversion range, comprises at least one alternative waypoint that does not lie along the first perimeter toolpath; and
   outputting a third data set comprising motion instructions for building the object according to the shape information in the first data set and including the finalized toolpath.

2. The method of claim 1 further comprising:
   assembling a second finalized toolpath that comprises a plurality of points that lie along a second perimeter toolpath calculated during the slicing operation and that have positional values outside of the toolpath diversion range, and, for positional values that fall within the toolpath diversion range, comprises at least one second alternative waypoint that does not lie along the second perimeter toolpath; and
   including the second finalized toolpath in the third data set.

3. The method of claim 2 wherein the first alternative waypoint lies along the second perimeter toolpath and the second alternative waypoint lies along the first perimeter toolpath.

4. The method of claim 2 wherein the first finalized toolpath pertains to controlling motion of a first extrusion nozzle and the second finalized toolpath pertains to controlling motion of a second extrusion nozzle.

5. The method of claim 1 wherein the inclusion of the first alternate waypoint in accordance with the second data file results in a portion of the graphical pattern being visually apparent at the surface of the object when the object has been completely formed.

6. The method of claim 1 wherein the first data set and the second data set are provided in separate data files obtained from different sources.

7. The method of claim 1 wherein at least one of the first and second data sets is obtained from a publicly accessible internet repository.

8. The method of claim 1 wherein the first data file includes information describing the shape of the object and is devoid of information pertaining to the surface graphic.

9. The method of claim 1 wherein the second file includes information describing the surface graphic but is devoid of any object-specific shape information.

10. The method of claim 1 wherein the positional values of points that lie along the first perimeter toolpath are calculated as a cumulative sum of traversal distances along the segments defined by the ordered waypoints.

11. The method of claim 1 wherein the positional value for a point is calculated as a projected position along a line.

12. The method of claim 1 wherein the positional values of points that lie along the first perimeter toolpath are calculated as relative angular positions with respect to an axis that is non-coplanar with any subset of two or more of the points.

13. The method of claim 1 wherein the alternative waypoint causes a diversion of the direction of the extrusion nozzle motion away from first perimeter toolpath by at least half of an exit diameter of the extrusion nozzle.

14. The method of claim 1 wherein the alternative waypoint lies along a second perimeter toolpath.

15. The method of claim 1 wherein the second data set comprises a plurality of transition lists, with at least one specific transition list being addressable by an index value along a first dimension of the graphical pattern and said transition list representing zero or more locations at which transitions among data values within the graphical pattern, with the location of each transition expressed as a high-resolution value normalized to a range of coordinate values along a second dimension of the graphical pattern.

16. The method of claim 15 wherein the number of possible values that can be represented by the high-resolution value is greater than one thousand times a maximum value of the index value for a given graphical pattern.

17. The method of claim 1 wherein the first data file describes at least three perimeter toolpaths forming an outer wall of the object, enumerable as an outermost first toolpath conforming to the outer contour of the object, a second toolpath paralleling the first toolpath but offset inwardly towards an interior of the object, a third toolpath paralleling the second toolpath but further offset inwardly towards the interior of the object and the method further comprises:
  generating a composite toolpath that follows the former second toolpath responsive to the data location in the second data file equaling a first value and follows the former third toolpath responsive to the data location in the second data file equaling the second value; and
  including the first toolpath and the composite toolpath in the third data set.

18. The method of claim 1 further comprising:
  providing, as a fourth data set, a digital data model describing shape information for the object to be constructed;
  performing a slicing operation upon the fourth digital data set to obtain the first data set.

19. The method of claim 18 wherein the data for the fourth data set and the second data set are provided in a common file and the second data set is obtained from surface-descriptive data within the common file.

* * * * *